US012585173B2

(12) United States Patent
Mori et al.

(10) Patent No.: US 12,585,173 B2
(45) Date of Patent: Mar. 24, 2026

(54) LENS BARREL

(71) Applicant: FUJIFILM Corporation, Tokyo (JP)

(72) Inventors: Yasuhiro Mori, Saitama (JP); Hajime Fukushima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 42 days.

(21) Appl. No.: 18/896,536

(22) Filed: Sep. 25, 2024

(65) Prior Publication Data

US 2025/0013126 A1 Jan. 9, 2025

Related U.S. Application Data

(63) Continuation of application No. 18/146,862, filed on Dec. 27, 2022, now Pat. No. 12,130,542, which is a
(Continued)

(30) Foreign Application Priority Data

Jul. 30, 2020 (JP) ................................. 2020-128982

(51) Int. Cl.
*G03B 5/00* (2021.01)
*G03B 17/14* (2021.01)
(Continued)

(52) U.S. Cl.
CPC .............. *G03B 17/14* (2013.01); *G03B 5/00* (2013.01); *H02K 41/0356* (2013.01); *H04N 23/54* (2023.01); *G03B 2205/0069* (2013.01)

(58) Field of Classification Search
CPC .. G03B 17/14; G03B 5/00; G03B 2205/0069; H02K 41/0356; H04N 23/54; G02B 7/04
See application file for complete search history.

(56) References Cited

U.S. PATENT DOCUMENTS

| | | | |
|---|---|---|---|
| 6,434,331 B1 | 8/2002 | Araoka et al. | |
| 2009/0202233 A1* | 8/2009 | Byon .................... | G03B 17/00 |
| | | | 348/208.11 |

(Continued)

FOREIGN PATENT DOCUMENTS

| | | |
|---|---|---|
| JP | 2004-334099 A | 11/2004 |
| JP | 2008-185749 A | 8/2008 |

(Continued)

OTHER PUBLICATIONS

International Search Report issued in PCT/JP2021/027445; mailed Oct. 12, 2021.
(Continued)

*Primary Examiner* — Mekonnen D Dagnew
(74) *Attorney, Agent, or Firm* — Studebaker Brackett PLLC

(57) ABSTRACT

Provided is a lens barrel with which it is possible to suppress the influence of a disturbance magnetic field on a magnetic sensor. A coil that surrounds an outer periphery of a lens frame, magnetic force applying members that are disposed at a plurality of positions around the lens frame, and a magnetic sensor that detects an amount of movement of the lens frame are provided. In a plane orthogonal to an optical axis, the magnetic force applying members that are disposed on both sides adjacent to the magnetic sensor are disposed in postures in which a first angle ($\theta 1$, $\theta 2$) formed between a first straight line (L1) and a second straight line (L2) is smaller than 45°, the first straight line (L1) being a straight line passing through the magnetic sensor and the optical axis and the second straight line (L2) being a straight line orthogonal to surfaces of a first yoke and a second yoke of the magnetic force applying member that face each other.

13 Claims, 32 Drawing Sheets

Related U.S. Application Data continuation of application No. PCT/JP2021/027445, filed on Jul. 26, 2021.

(51) Int. Cl.
 H02K 41/035 (2006.01)
 H04N 23/54 (2023.01)

(56) References Cited

U.S. PATENT DOCUMENTS

| | | | | |
|---|---|---|---|---|
| 2009/0251552 | A1* | 10/2009 | Homme | H04N 23/68 |
| | | | | 348/208.4 |
| 2015/0062408 | A1* | 3/2015 | Yano | G03B 5/00 |
| | | | | 348/335 |
| 2019/0064472 | A1 | 2/2019 | Ishibashi | |
| 2019/0064475 | A1 | 2/2019 | Kobayashi | |
| 2019/0379266 | A1 | 12/2019 | Takizawa et al. | |
| 2021/0088748 | A1 | 3/2021 | Otsuka et al. | |
| 2023/0350275 | A1* | 11/2023 | Ayukawa | H05K 1/189 |

FOREIGN PATENT DOCUMENTS

| | | | |
|---|---|---|---|
| JP | 2013-156283 | A | 8/2013 |
| JP | 2020-046693 | A | 3/2020 |
| WO | 2017/169979 | A1 | 10/2017 |
| WO | 2017/187933 | A1 | 11/2017 |
| WO | 2020/022025 | A1 | 1/2020 |
| WO | 2020/090166 | A1 | 5/2020 |

OTHER PUBLICATIONS

International Preliminary Report On Patentability (Chapter I) and Written Opinion of the International Searching Authority issued in PCT/JP2021/027445; issued Jan. 31, 2023.

"Notice of Reasons for Refusal" Office Action issued in JP 2024-066241; mailed by the Japanese Patent Office on May 1, 2025.

* cited by examiner

MAGNETIC
FLUX DENSITY
[T]

2.20

1.65

1.10

0.55

0.00

MAGNETIC
FLUX DENSITY
[T]

2.20

1.65

1.10

0.55

0.00

270Vd
270Va
270Vb
270Vc

270V

270Ha
270Hb
270Hc
270Hd

270H

LENS BARREL

CROSS-REFERENCE TO RELATED APPLICATIONS

The present application is a Continuation of U.S. patent application Ser. No. 18/146,862 filed on Dec. 27, 2022, which is a Continuation of PCT International Application No. PCT/JP2021/027445 filed on Jul. 26, 2021, claiming priority under 35 U.S.C § 119(a) to Japanese Patent Application No. 2020-128982 filed on Jul. 30, 2020. Each of the above applications is hereby expressly incorporated by reference, in its entirety, into the present application.

BACKGROUND OF THE INVENTION

1. Field of the Invention

The present invention relates to a lens barrel.

2. Description of the Related Art

A lens barrel in which a lens is driven by means of a voice coil motor (VCM) is known. In addition, a technique, in which the position of a lens is detected by means of a magnetic sensor in a lens barrel in which the lens is driven by means of a voice coil motor, is known (for example, JP2008-185749A, WO2017/187933A, and the like).

SUMMARY OF THE INVENTION

One embodiment according to the present disclosed technology provides a lens barrel with which it is possible to suppress the influence of a disturbance magnetic field on a magnetic sensor.

(1) A lens barrel including a first shaft and a second shaft that are disposed along an optical axis, a lens frame that includes a first sliding portion sliding along the first shaft and a second sliding portion sliding along the second shaft and that is supported to be movable along the optical axis, a coil that is mounted to the lens frame and that surrounds an outer periphery of the lens frame, magnetic force applying members that are disposed at a plurality of positions around the lens frame and that apply magnetic forces to the coil, and a magnetic sensor that detects an amount of movement of the lens frame, in which the magnetic force applying member includes a flat plate-shaped first yoke and a flat plate-shaped second yoke that are disposed inside and outside the coil to face each other with the coil interposed therebetween and a magnet that is provided at the first yoke and/or the second yoke, and, in a plane orthogonal to the optical axis, the magnetic force applying members that are disposed on both sides adjacent to the magnetic sensor are disposed in postures in which a first angle formed between a first straight line and a second straight line is smaller than 45°, the first straight line being a straight line passing through the magnetic sensor and the optical axis and the second straight line being a straight line orthogonal to surfaces of the first yoke and the second yoke of the magnetic force applying member that face each other.

(2) The lens barrel of (1), in which the first angle is equal to or smaller than 35°.

(3) The lens barrel of (1) or (2), in which, in the plane orthogonal to the optical axis, the magnetic force applying members that are disposed on both sides adjacent to the magnetic sensor are symmetrically disposed with respect to the first straight line.

(4) The lens barrel of any one of (1) to (3), in which, in the plane orthogonal to the optical axis, the magnetic sensor is disposed at a position at which the first straight line and a third straight line cross at a right angle, the third straight line being a straight line passing through the first shaft and the optical axis.

(5) The lens barrel of (4), in which, in the plane orthogonal to the optical axis, the plurality of magnetic force applying members are symmetrically disposed with respect to the third straight line.

(6) The lens barrel of any one of (1) to (5), in which, in the plane orthogonal to the optical axis, the magnetic force applying members that are disposed on both sides adjacent to the magnetic sensor are disposed at positions at which a second angle formed between the first straight line and a fourth straight line is equal to or larger than 35° and smaller than 55°, the fourth straight line being a straight line passing through the magnetic force applying member and the optical axis.

(7) The lens barrel of (6), in which the first angle is smaller than the second angle.

(8) The lens barrel of any one of (1) to (7), in which, in the plane orthogonal to the optical axis, the first shaft and the second shaft are symmetrically disposed with respect to the first straight line.

(9) The lens barrel of any one of (1) to (8), in which the magnetic sensor is disposed within a disposition range of the magnet in a direction along the optical axis.

(10) The lens barrel of any one of (1) to (9), in which the first sliding portion includes a hole into which the first shaft is inserted, and the second sliding portion includes a groove to which the second shaft is fitted.

(11) The lens barrel of any one of (1) to (10), in which the first sliding portion is disposed inside the coil, and the second sliding portion is disposed outside the coil.

(12) The lens barrel of any one of (1) to (11), in which the first yoke and/or the second yoke has a width and/or a thickness corresponding to a magnetic flux density generated by the magnetic force applying member.

(13) The lens barrel of any one of (1) to (12), in which the lens frame includes a magnetic scale provided at an outer peripheral portion of the lens frame, and the magnetic sensor is disposed to face the magnetic scale and reads magnetic information of the magnetic scale to detect the amount of movement of the lens frame.

(14) A lens barrel including a first shaft and a second shaft that are disposed along an optical axis, a lens frame that includes a first sliding portion sliding along the first shaft and a second sliding portion sliding along the second shaft and that is supported to be movable along the optical axis, a coil that is mounted to the lens frame and that surrounds an outer periphery of the lens frame, magnetic force applying members that are disposed at a plurality of positions around the lens frame and that apply magnetic forces to the coil, and a magnetic sensor that detects an amount of movement of the lens frame, in which the magnetic force applying member includes a flat plate-shaped magnet that is disposed to face the coil, and a normal line from a flat surface portion of the magnet from the optical axis and a straight line passing through the optical axis and the flat surface portion of the magnet form an angle.

DESCRIPTION OF THE PREFERRED EMBODIMENTS

Hereinafter, a preferred embodiment of the present invention will be described in detail with reference to the attached drawings.

About Lens Barrel in Which Voice Coil Motor is Used

In a case where a voice coil motor is used to drive a lens, a configuration in which a coil is attached to surround an outer periphery of a lens frame and magnets are disposed at a plurality of positions around the lens frame is effective in obtaining large thrust while making the entire configuration compact. In this case, the larger the number of magnets installed is, the larger the thrust obtained is.

However, increasing the number of magnets installed causes a problem that a sensor and a magnet are disposed to be near to each other and the sensor is influenced by the magnet in a case where the position of the lens is detected by means of a magnetic sensor. Specifically, there is a problem that the output from the sensor is reduced because of the influence of a disturbance magnetic field.

In the following embodiment, a configuration for suppression of the influence of a disturbance magnetic field on a magnetic sensor in a lens barrel in which a lens is driven by means of a voice coil motor will be described.

Overall Configuration of Lens Barrel

Here, a case where the present invention is applied to an interchangeable lens of an interchangeable lens camera will be described as an example.

Figure 1:
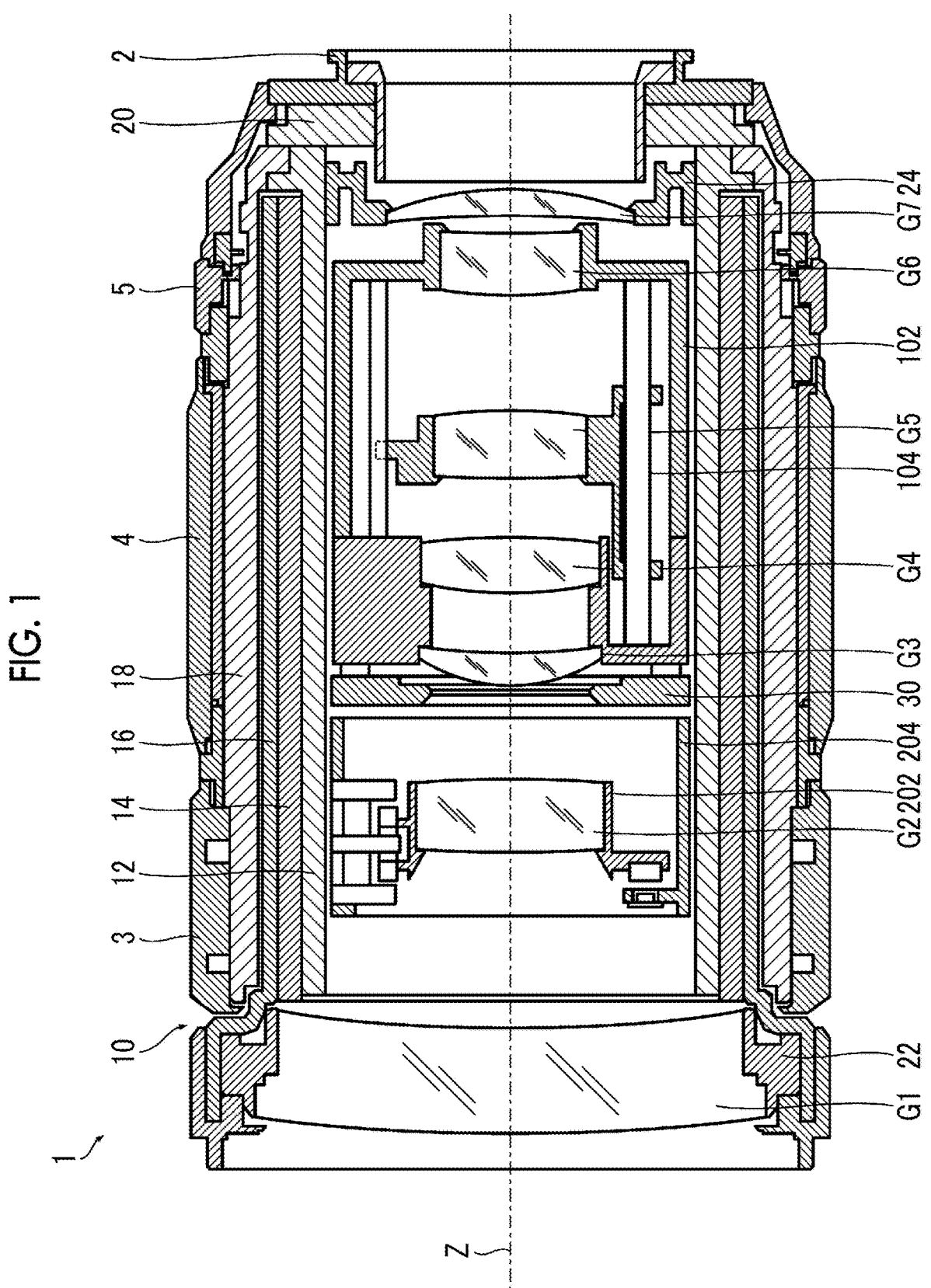
FIG. 1 is a cross-sectional view showing a schematic configuration of an interchangeable lens.

FIG. 1 is a cross-sectional view showing a schematic configuration of an interchangeable lens of the present embodiment.

An interchangeable lens 1 shown in the drawing is an interchangeable lens for a digital still camera including a focus mechanism, a zoom mechanism, and an optical image stabilizer (OIS). The interchangeable lens 1 is attachably and detachably mounted to a camera body (not shown) via a mount 2 provided at a proximal end portion.

As shown in FIG. 1, a lens barrel 10 of the interchangeable lens 1 of the present embodiment includes a first fixed cylinder 12, a cam cylinder 14, a moving cylinder 16, and a second fixed cylinder 18 arranged in this order from a radially inner side.

Both of the first fixed cylinder 12 and the second fixed cylinder 18 are fixed to a mount base member 20 at the proximal end portion (an end portion on an image side). The mount 2 is attached to the mount base member 20. A focus ring 3 for a focusing operation, a zoom ring 4 for a zooming operation, a stop ring 5 for a stop operation, and the like are provided on an outer periphery of the second fixed cylinder 18.

The cam cylinder 14 includes a cam groove (not shown). The cam cylinder 14 is fitted to an outer periphery of the first fixed cylinder 12 and is held to be rotatable around an optical axis Z. The cam cylinder 14 is connected to the zoom ring 4 via a connecting member (not shown). Therefore, in a case where the zoom ring 4 is rotated, the cam cylinder 14 is rotated.

The moving cylinder 16 is fitted to an outer periphery of the cam cylinder 14 and is held to be movable along the optical axis Z. In a case where the cam cylinder 14 is rotated, the moving cylinder 16 is moved forward and backward along the optical axis Z by a cam mechanism (not shown).

Inside the lens barrel 10, a first lens group G1, a second lens group G2, a third lens group G3, a fourth lens group G4, a fifth lens group G5, a sixth lens group G6, and a seventh lens group G7 are provided in this order from an object side (the left side in FIG. 1) along the optical axis Z. A stop is provided between the second lens group G2 and the third lens group G3. Each lens group is composed of at least one lens. The first lens group G1 to the sixth lens group G6 are lens groups that move in the case of zooming. The seventh lens group G7 is a lens group fixed in the case of zooming.

The first lens group G1 is held by a first lens group holding frame 22. The first lens group holding frame 22 is held by being fixed to a distal end of the moving cylinder 16. Therefore, the first lens group holding frame 22 is moved in the case of movement of the moving cylinder 16.

The second lens group G2 is a lens group that constitutes a camera shake-correction lens. The second lens group G2 is held by a first movable frame 202. The first movable frame 202 is held to be movable in a plane orthogonal to the optical axis Z with respect to a first base frame 204. A holding structure and a driving structure for the first movable frame 202 will be described later. The first base frame 204 is held to be movable along the optical axis Z at an inner peripheral portion of the first fixed cylinder 12. In a case where the cam cylinder 14 is rotated, the first base frame 204 is moved forward and backward along the optical axis Z by a cam mechanism (not shown).

The third lens group G3 to the sixth lens group G6 are held by a second base frame 102. The second base frame 102 is held to be movable along the optical axis Z at the inner peripheral portion of the first fixed cylinder 12. In a case where the cam cylinder 14 is rotated, the second base frame 102 is moved forward and backward along the optical axis Z by a cam mechanism (not shown).

Here, the third lens group G3, the fourth lens group G4, and the sixth lens group G6 are held by being fixed to the second base frame 102.

Meanwhile, the fifth lens group G5 is held to be movable along the optical axis Z in the second base frame 102. The fifth lens group G5 is a lens group that constitutes a focus lens. In the case of the interchangeable lens 1, focus adjustment is performed by moving the fifth lens group G5 forward and backward along the optical axis Z. The fifth lens group G5 is held by a second movable frame 104 and supported to be movable along the optical axis Z in the second base frame 102. In addition, the second movable frame 104 is moved by being driven by an actuator provided at the second base frame 102. A holding structure and a driving structure for the second movable frame 104 will be described later.

The seventh lens group G7 is held by a seventh lens group holding frame 24. The seventh lens group holding frame 24 is held by being fixed to a proximal end portion of the first fixed cylinder 12.

Regarding a stop, a stop unit 30 including the drive mechanism therefor is integrally attached to a distal end portion of the second base frame 102 and is disposed at a predetermined position.

Focus Unit

Holding Structure for Fifth Lens Group

A unit based on the second base frame 102 constitutes a focus unit 100 of the interchangeable lens 1.

Figure 2:
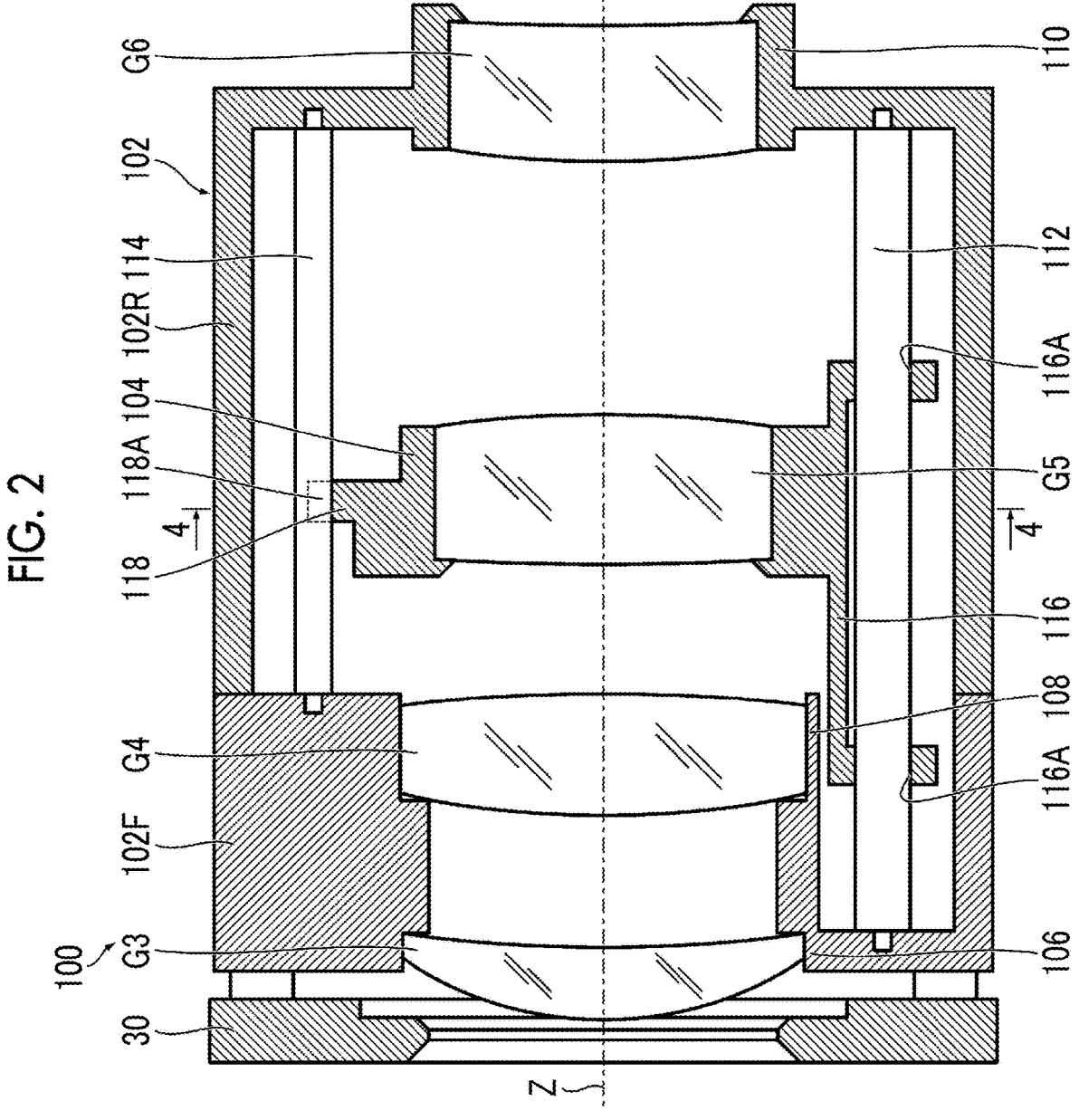
FIG. 2 is a side sectional view showing a schematic configuration of a focus unit.
Figure 3:
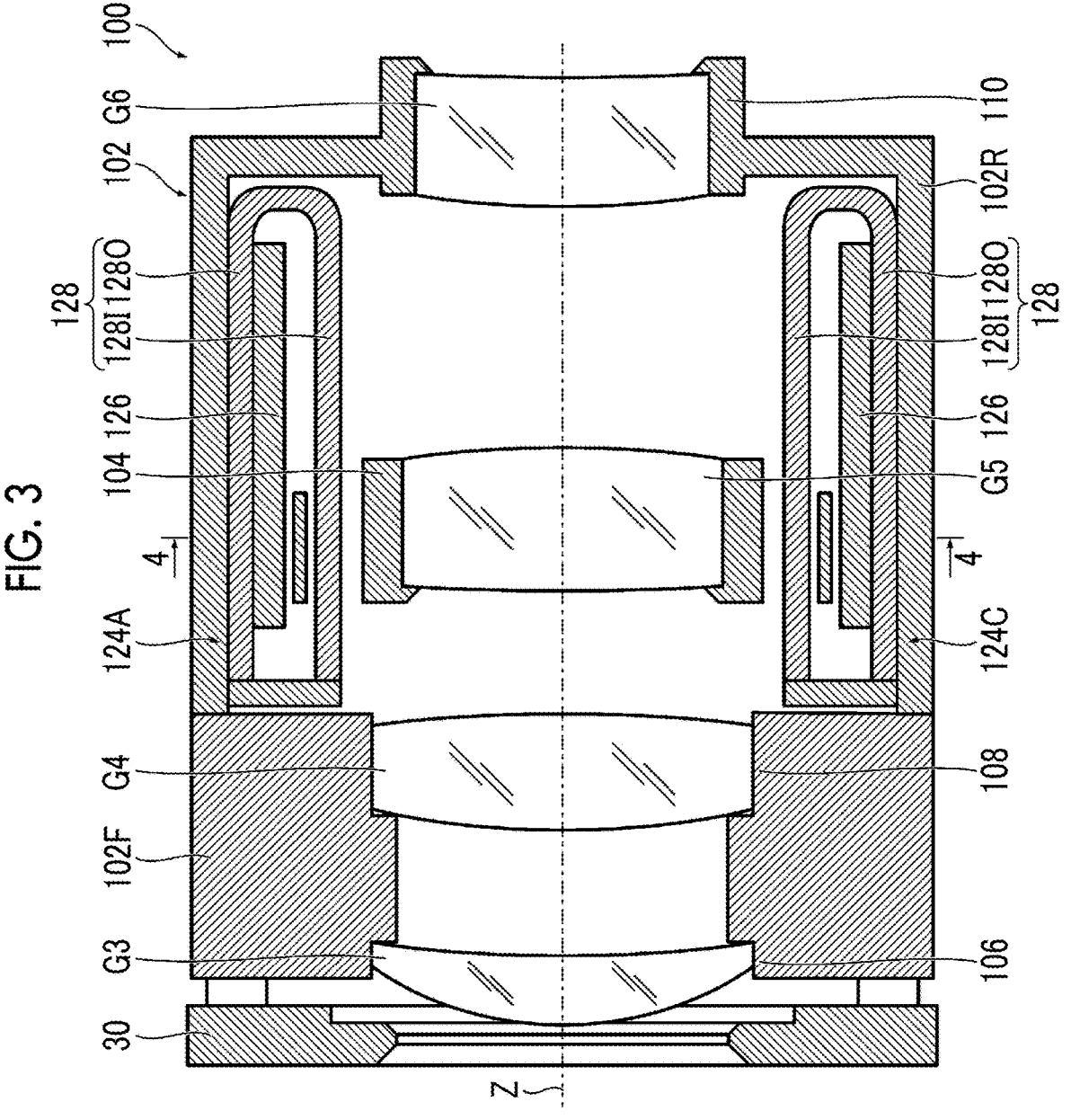
FIG. 3 is a side sectional view showing the schematic configuration of the focus unit.
Figure 4:
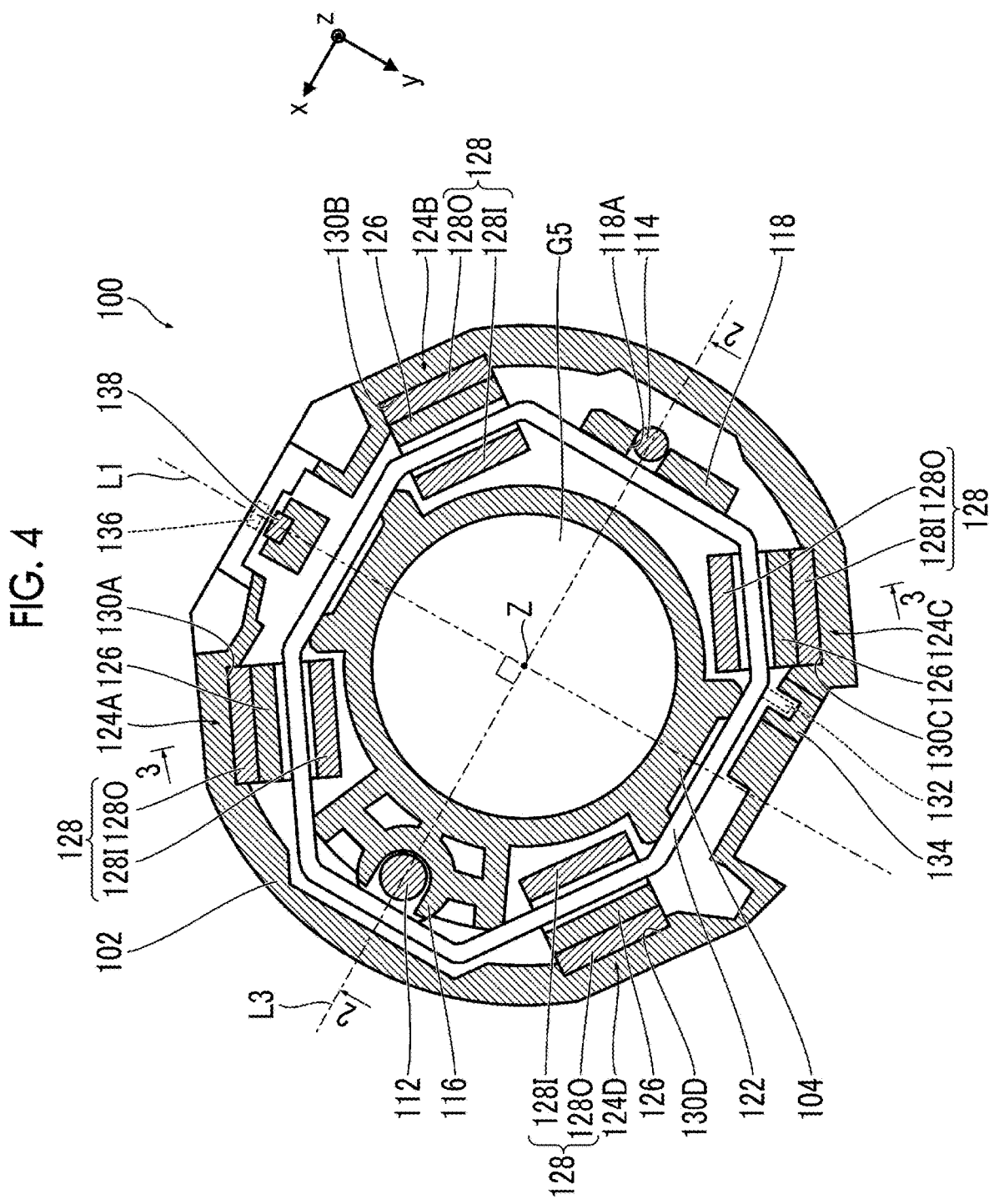
FIG. 4 is a front sectional view showing the schematic configuration of the focus unit.

FIGS. 2 and 3 are side sectional views showing a schematic configuration of the focus unit. FIG. 4 is a front sectional view showing a schematic configuration of the focus unit. FIG. 2 corresponds to a cross section taken along line 2-2 of FIG. 4. FIG. 3 corresponds to a cross section taken along line 3-3 of FIG. 4. FIG. 4 corresponds to a cross section taken along line 4-4 of FIGS. 2 and 3.

As shown in FIGS. 2 and 3, the second base frame 102 is composed of a second base frame front frame 102F and a second base frame rear frame 102R and is configured to be dividable in a front-rear direction. The second base frame front frame 102F and the second base frame rear frame 102R are connected and integrated with each other by means of a screw (not shown). The second base frame front frame 102F and the second base frame rear frame 102R integrated with each other are disposed coaxially.

The second base frame front frame 102F includes a third lens group holding portion 106 and a fourth lens group holding portion 108. The third lens group G3 is held by the third lens group holding portion 106. The fourth lens group G4 is held by the fourth lens group holding portion 108.

In addition, the second base frame front frame 102F includes cam pins (not shown) at three positions on an outer peripheral portion. The cam pins are fitted to a linear movement groove (not shown) that the first fixed cylinder 12 includes and a cam groove (not shown) that the cam cylinder 14 includes. Accordingly, in a case where the cam cylinder 14 is rotated, the second base frame 102 moves forward and backward along the optical axis Z.

In addition, the second base frame rear frame 102R includes a sixth lens group holding portion 110. The sixth lens group G6 is held by the sixth lens group holding portion 110.

As described above, the fifth lens group G5 is held by the second movable frame 104 and supported to be movable along the optical axis Z in the second base frame 102.

As shown in FIGS. 2 to 4, a main shaft 112 and a sub shaft 114 that guide the movement of the second movable frame 104 are provided in the second base frame 102. The main shaft 112 is an example of a first shaft. The sub shaft 114 is an example of a second shaft. The main shaft 112 and the sub shaft 114 are disposed along the optical axis Z. Further, the main shaft 112 and the sub shaft 114 are disposed on a straight line passing through the optical axis Z in a plane orthogonal to the optical axis Z.

Figure 5:
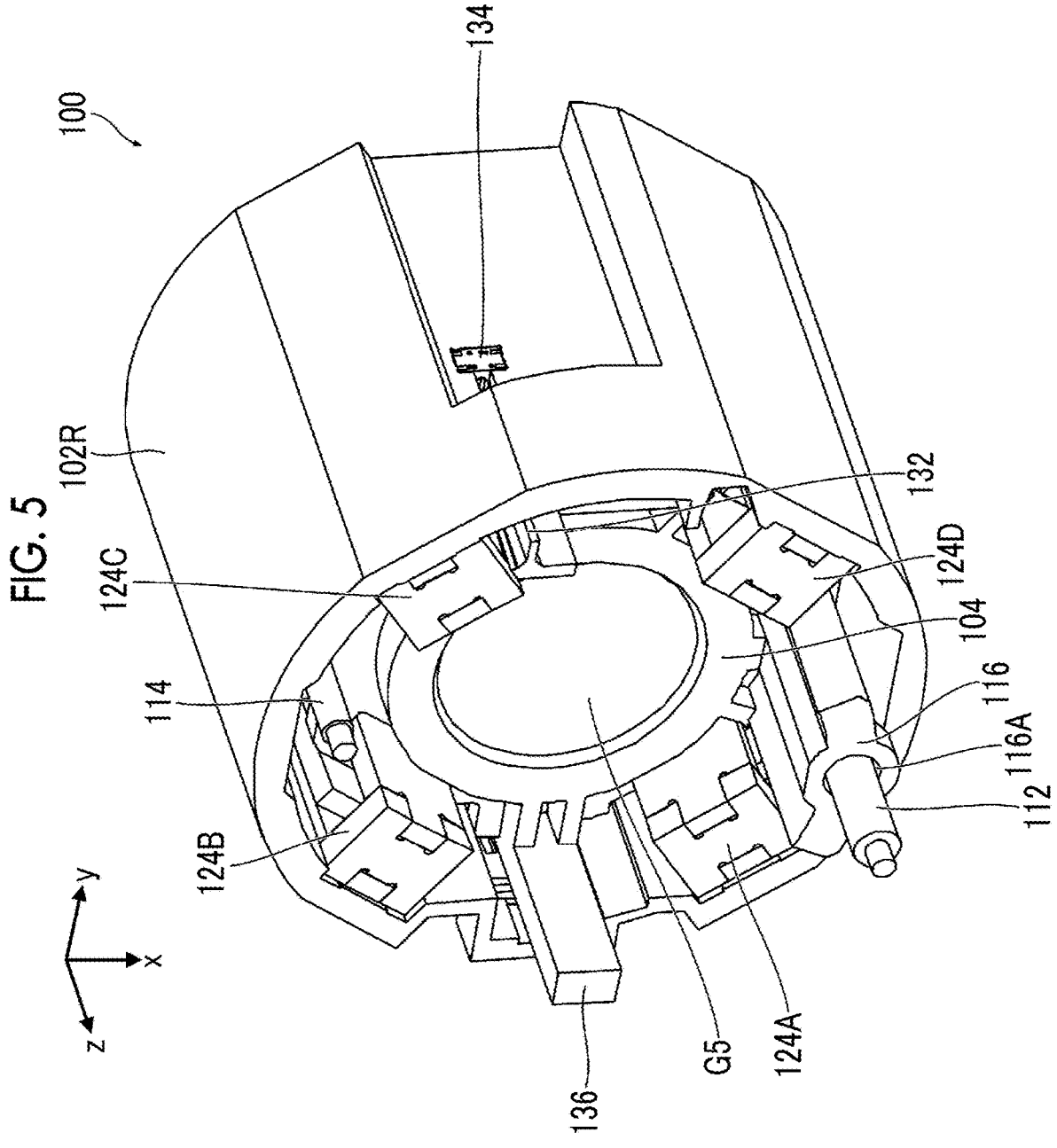
FIG. 5 is a perspective view showing a configuration of a second base frame rear frame.
Figure 6:
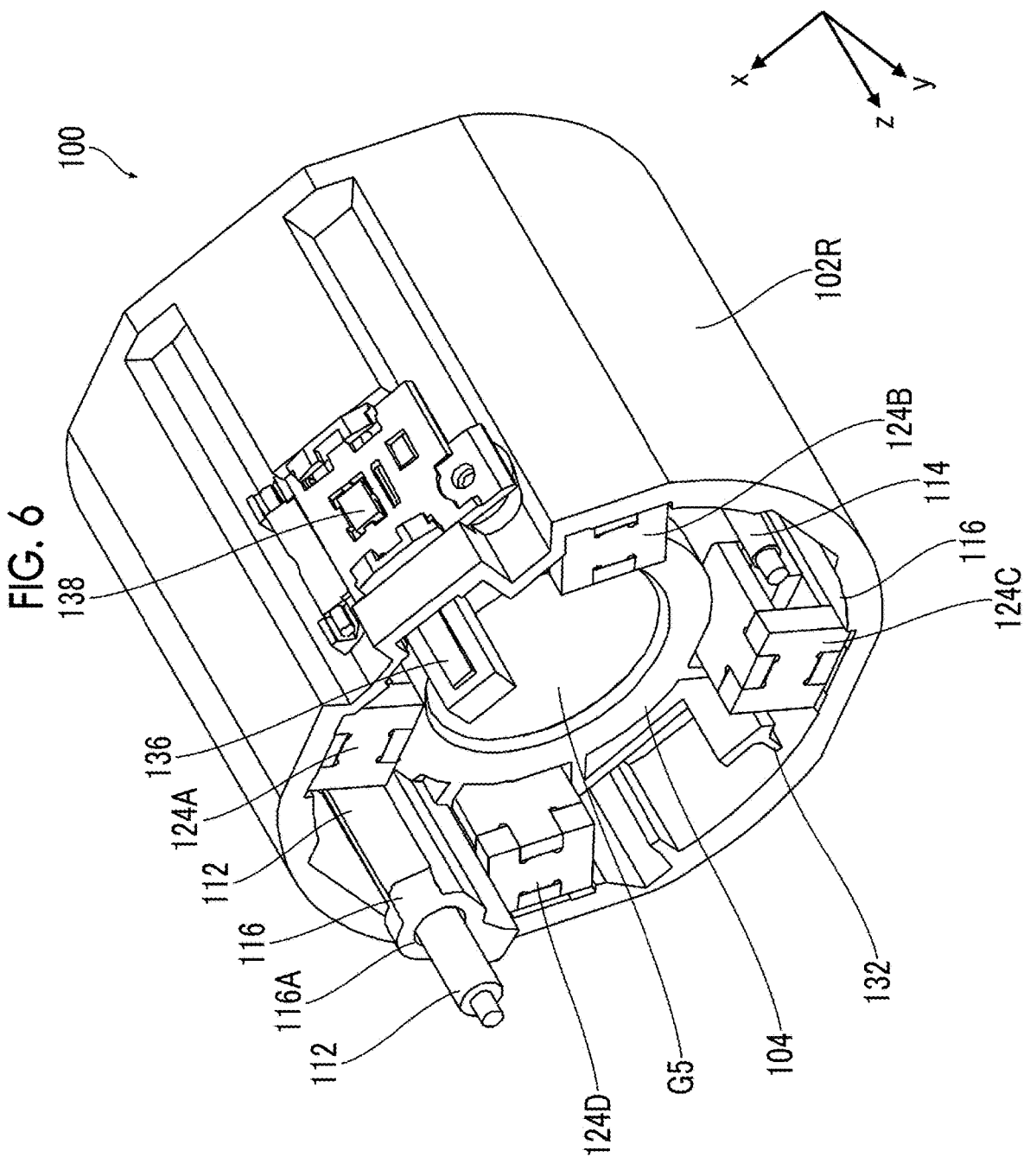
FIG. 6 is a perspective view showing the configuration of the second base frame rear frame.
Figure 7:
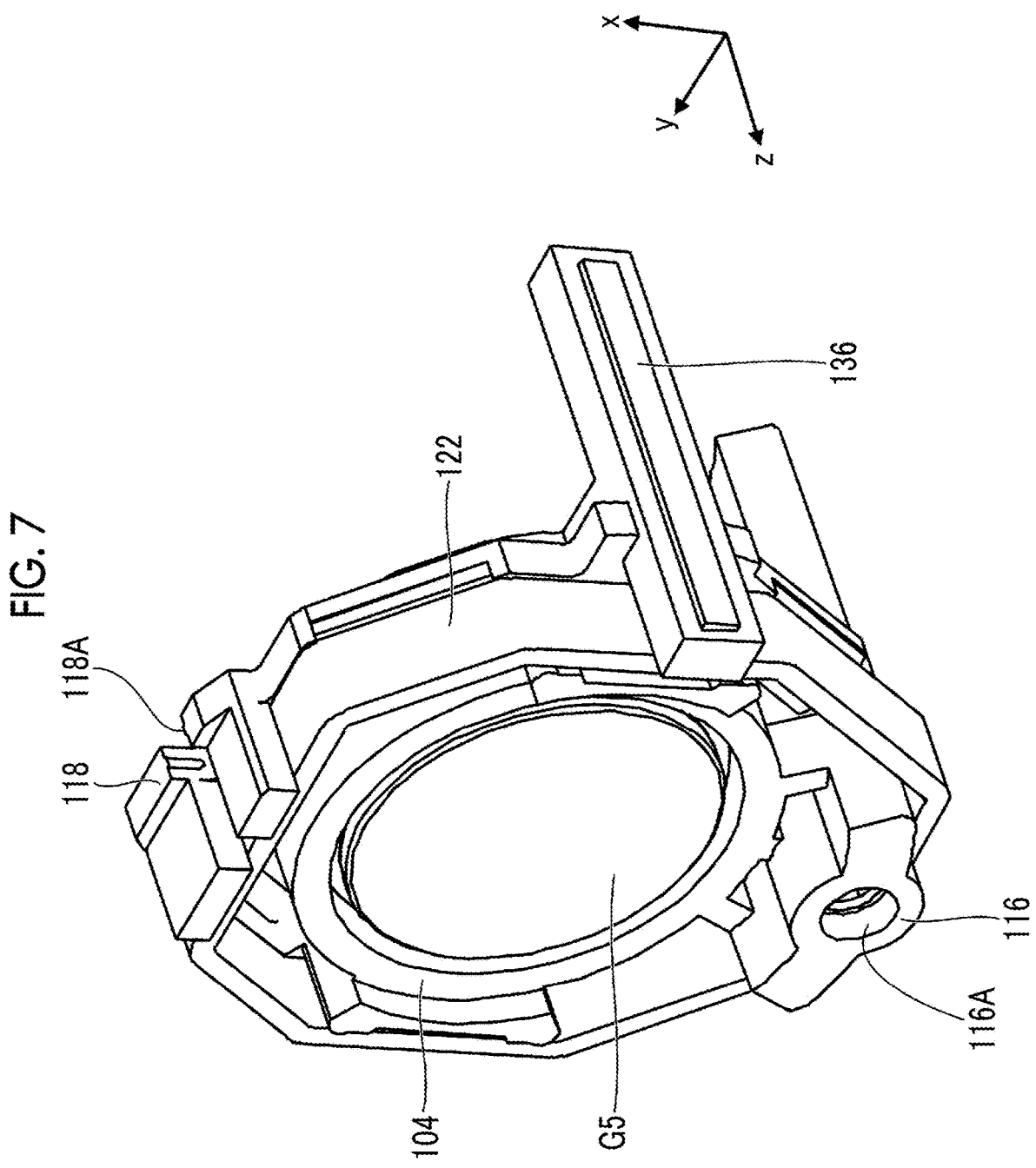
FIG. 7 is a perspective view showing a configuration of a second movable frame.

FIG. 5 and FIG. 6 are perspective views showing the configuration of the second base frame rear frame. In addition, FIG. 7 is a perspective view showing the configuration of the second movable frame.

The second movable frame 104 moves along the optical axis Z by sliding along the main shaft 112 and the sub shaft 114. The second movable frame 104 is an example of a lens frame. The second movable frame 104 includes a main sliding portion 116 that slides along the main shaft 112 and a sub sliding portion 118 that slides along the sub shaft 114. The main sliding portion 116 is an example of a first sliding portion. The sub sliding portion 118 is an example of a second sliding portion.

The main sliding portion 116 has a plate-like shape extending along the optical axis Z, and includes holes 116A into which the main shaft 112 is inserted at both ends in a direction along the optical axis Z. The main sliding portion 116 slides along the main shaft 112 with the main shaft 112 inserted into the holes 116A at both ends of the main sliding portion 116.

The sub sliding portion 118 includes a groove 118A to which the sub shaft 114 is fitted. The sub sliding portion 118 slides along the sub shaft 114 with the sub shaft 114 fitted to the groove 118A.

Regarding the second movable frame 104, stable guidance in an optical axis direction is realized mainly by the main sliding portion 116. For realization of the stable guidance, the main sliding portion 116 is configured to have a sufficient length along the optical axis Z. The sub sliding portion 118 mainly prevents the second movable frame 104 from moving or rotating (rotating about the main shaft) in a plane orthogonal to the optical axis Z.

Driving Structure for Second Movable Frame

In the case of the focus unit 100 according to the present embodiment, a voice coil motor 120 is used as an actuator for the purpose of driving the second movable frame 104.

The voice coil motor 120 according to the present embodiment is composed of a coil 122 and four magnetic force applying units 124A to 124D. The coil 122 is attached to the second movable frame 104. The four magnetic force applying units 124A to 124D are attached to the second base frame 102. That is, the voice coil motor 120 according to the present embodiment is composed of a moving coil type voice coil motor of which a coil side is movable.

Hereinafter, as necessary, the four magnetic force applying units 124A to 124D will be distinguished from each other with the magnetic force applying unit 124A being referred to as a first magnetic force applying unit, the magnetic force applying unit 124B being referred to as a second magnetic force applying unit, the magnetic force applying unit 124C being referred to as a third magnetic force applying unit, and the magnetic force applying unit 124D being referred to as a fourth magnetic force applying unit. The magnetic force applying units 124A to 124D are examples of magnetic force applying members.

As shown in FIGS. 4 and 7, the coil 122 is configured as a so-called all-around coil, is wound around the second movable frame 104, and is attached to surround the periphery of the second movable frame 104. Particularly, in the case of the focus unit 100 of the present embodiment, the coil 122 is wound along a path that passes through a position outward of the main shaft 112 and a position inward of the sub shaft 114 and the coil 122 is attached to the periphery of the second movable frame 104. Accordingly, the following effects are achieved.

One of the effects is that the strength of the second movable frame 104 can be improved. Since the coil 122 is disposed along the path that passes through the position outward (radially outward) of the main shaft 112, a space (a so-called notch) for passage of the coil 122 does not need to be provided between a lens holding portion (a holding portion of the fifth lens group G5) of the second movable frame 104 and the main sliding portion 116. Accordingly, it possible to provide a connecting portion, a reinforcing rib, or the like with respect to the main sliding portion 116 without an increase in size of the second movable frame 104. As a result, the strength of the second movable frame 104 is improved, and unnecessary resonance frequency in the case of driving the voice coil motor 120 can be made high.

The other one of the effects is that power consumption can be reduced. Since the coil 122 is disposed along the path that passes through the position inward of the sub shaft 114, the coil length can be set to the minimum necessary length. The sub sliding portion 118 is not required to have the same strength as the main sliding portion 116 because of the nature thereof. Therefore, a space (a so-called notch) for passage of the coil can be disposed between the sub sliding portion 118 and the lens holding portion. Accordingly, the path for the coil can be shortened and the coil length can be shortened. In addition, accordingly, resistance can be reduced and power consumption can be reduced.

Each of the magnetic force applying units 124A to 124D is configured as a unit in which a magnet 126 and a yoke 128 are integrated with each other. The configurations of the magnetic force applying units 124A to 124D are the same as each other.

Figure 8:
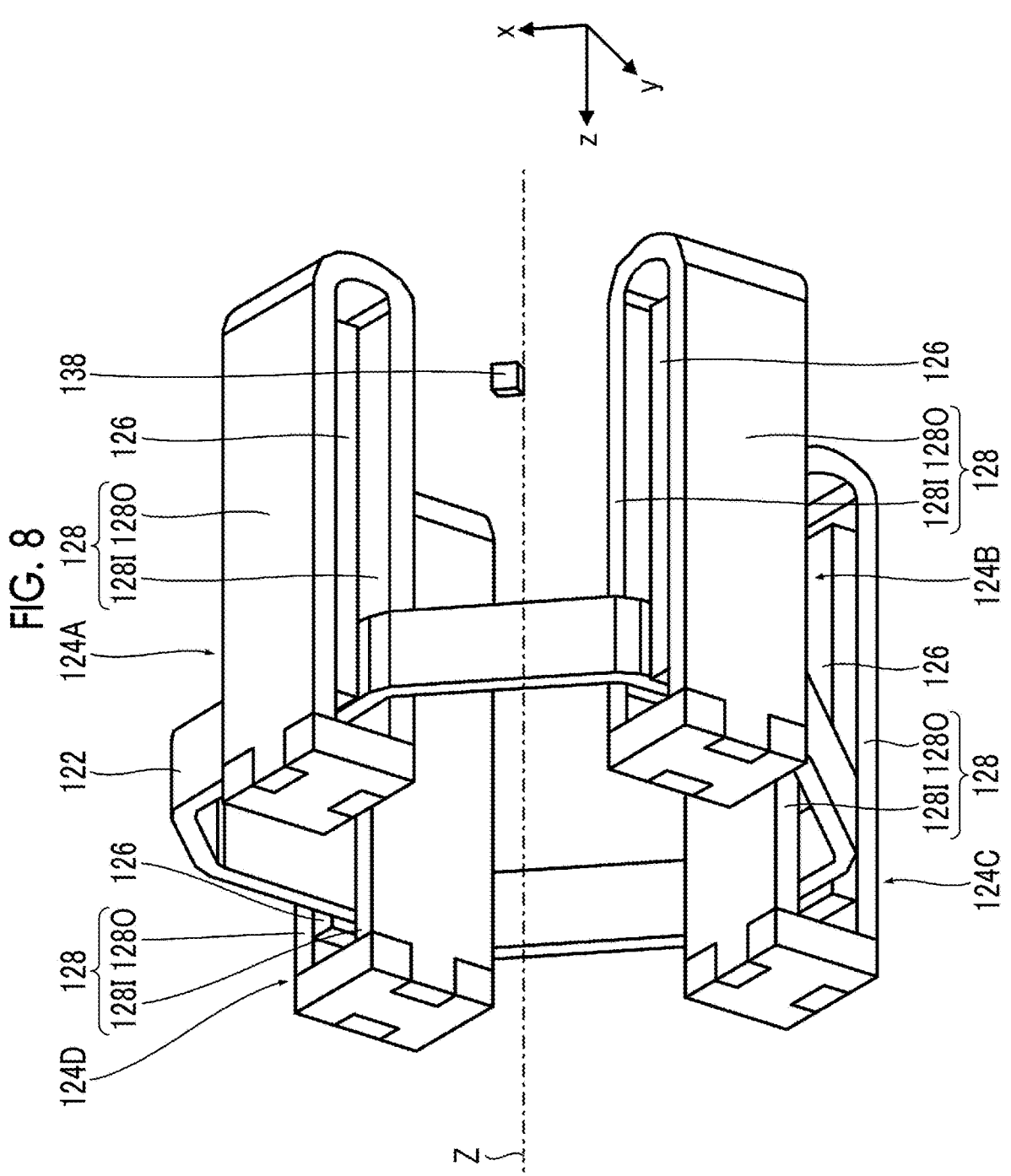
FIG. 8 is a perspective view showing configurations of magnetic force applying units.

FIG. 8 is a perspective view showing the configurations of the magnetic force applying units.

The yoke 128 is made of a magnetic material (for example, iron). The yoke 128 has a U-like shape and includes an inner yoke portion 128I that is disposed on an inner peripheral side in the case of attachment to the second base frame 102 and an outer yoke portion 128O that is disposed on an outer peripheral side. Each of the inner yoke portion 128I and the outer yoke portion 128O has a rectangular flat plate-like shape extending along the optical axis Z and the inner yoke portion 128I and the outer yoke portion 128O are disposed to face each other with a predetermined gap provided therebetween. The inner yoke portion 128I is an example of a first yoke. The outer yoke portion 128O is an example of a second yoke.

The magnet 126 has a rectangular flat plate-like shape extending along the optical axis Z and is integrally attached to an inner surface of the outer yoke portion 128O. By being attached to the outer yoke portion 128O, the magnet 126 is disposed such that the magnet 126 and the inner yoke portion 128I face each other with a predetermined gap provided therebetween.

As described above, the four magnetic force applying units 124A to 124D are attached to the second base frame 102. As shown in FIG. 4, on the inner peripheral portion of the second base frame 102, magnetic force applying unit holding portions 130A to 130D are provided at four positions in a circumferential direction. The magnetic force applying unit holding portions 130A to 130D are composed of recess portions to which the magnetic force applying units 124A to 124D are fitted. By being attached to the magnetic force applying unit holding portions 130A to 130D, the magnetic force applying units 124A to 124D are attached at predetermined positions in the second base frame 102 in predetermined postures. Accordingly, the magnetic force applying units 124A to 124D are attached at predetermined positions around the second movable frame 104 in the predetermined postures.

The positions at which the magnetic force applying units 124A to 124D are installed and the postures in which the magnetic force applying units 124A to 124D are installed are determined based on a relationship between the installation position of the main shaft 112 and the installation position of a magnetic sensor. This point will be described later.

As shown in FIG. 4, the coil 122 provided for the second movable frame 104 is disposed to pass through gaps between the inner yoke portions 128I and the magnets 126 of the magnetic force applying units 124A to 124D. The coil 122 passing through the gaps is disposed to be parallel to inner surfaces (surfaces facing the coil 122) of the magnets 126 that are configured in a flat plate-like shape. In other words, the magnets 126 are disposed to face the coil 122 and flat surface portions thereof that face the coil 122 are disposed to be parallel to the coil 122.

According to the above-described configuration, the second movable frame 104 moves along the optical axis Z in a case where a voltage is applied to the coil 122.

Position Detection Mechanism of Fifth Lens Group

The position of the second movable frame 104 with respect to the second base frame 102 is detected by a fifth lens group position detection mechanism. More specifically, the position with respect to the second base frame 102 is a position relative to a reference position (an origin position) set for the second base frame 102. The fifth lens group position detection mechanism includes a reference position detector that detects that the fifth lens group G5 is positioned at a reference position and a movement amount detector that detects the amount of movement (the amount of displacement) of the fifth lens group G5. The fifth lens group position detection mechanism detects that the fifth lens group G5 is positioned at the reference position by means of the reference position detector and detects the amount of movement from the reference position by means of the movement amount detector to detect the position of the fifth lens group G5 with respect to the second base frame 102.

The reference position detector is composed of a light screen 132 and a photo interrupter 134. The light screen 132 is provided at the second movable frame 104. The photo interrupter 134 is provided at the second base frame 102. The reference position detector detects that the fifth lens group G5 is positioned at the reference position by detecting the light screen 132 with the photo interrupter 134. Therefore, the installation positions of the light screen 132 and the photo interrupter 134 are adjusted such that the light screen 132 is detected at a time when the fifth lens group G5 is positioned at the reference position.

The movement amount detector is composed of a magnetic scale 136 and a magneto resistive sensor (MR sensor) 138 that detects magnetic information (the N pole and the S pole) of the magnetic scale 136. The MR sensor 138 is an example of a magnetic sensor.

The magnetic scale 136 has a bar-like shape, and has a structure (a magnetization sheet) in which N poles and S poles are magnetized at a constant pitch along a longitudinal direction. The magnetic scale 136 is provided on an outer peripheral portion of the second movable frame 104. The installation position of the magnetic scale 136 will be described later. The magnetic scale 136 is disposed along the direction of movement (a direction along the optical axis Z) of the second movable frame 104.

The MR sensor 138 is provided at the second base frame 102. The MR sensor 138 is disposed on a movement path of the magnetic scale 136. The MR sensor 138 is disposed to face the magnetic scale 136. The MR sensor 138 reads the magnetic information of the magnetic scale 136 and detects the amount of movement (the amount of displacement) of the second movable frame 104 including the magnetic scale 136.

The fifth lens group position detection mechanism configured as described above can detect that the fifth lens group G5 is positioned at the reference position by detecting the light screen 132 with the photo interrupter 134. In addition, the fifth lens group position detection mechanism can detect the position of the fifth lens group G5 with respect to the reference position by detecting, with the MR sensor 138, the amount of movement of the fifth lens group G5 that is made after the fifth lens group G5 is positioned at the reference position.

Installation Position of Magnetic Scale and MR Sensor

As described above, the MR sensor 138 is disposed to face the magnetic scale 136. Therefore, in a case where the installation position of the magnetic scale 136 is determined, the installation position of the MR sensor is also determined.

As shown in FIG. 4, in the focus unit 100 of the present embodiment, the magnetic scale 136 is disposed at a position that is 90 degrees out of phase with respect to the main shaft 112. That is, in a plane orthogonal to the optical axis Z, the magnetic scale 136 is disposed on a straight line that is orthogonal to a straight line passing through the main shaft 112 and the optical axis Z. In other words, the magnetic scale 136 is disposed on a position at which a first straight line L1 and a third straight line L3 cross at a right angle, the first straight line L1 being a straight line passing through the magnetic scale 136 and the optical axis Z and the third straight line L3 being a straight line passing through the main shaft 112 and the optical axis Z in the plane orthogonal to the optical axis Z. Note that, since the MR sensor 138 is disposed to face the magnetic scale 136, the straight line passing through the magnetic scale 136 and the optical axis Z has the same meaning as a straight line passing through the MR sensor 138 and the optical axis Z.

Generally, the magnetic scale 136 is provided at the main sliding portion 116 (at the position of the main shaft 112). However, in a case where the main sliding portion 116 includes the magnetic scale 136, there is a problem that the diameter of the unit is made large to secure an installation space for the MR sensor 138. In the case of the focus unit 100 of the present embodiment, the diameter of the unit can be made small since the magnetic scale 136 and the MR sensor 138 are installed to be offset from the main shaft 112. Particularly, in a case where the magnetic scale 136 and the MR sensor 138 are disposed at positions that are 90 degrees out of phase with respect to the main shaft 112 and the sub shaft 114, as in the case of the focus unit 100 of the present embodiment, it is possible to dispose the magnetic scale 136 and the MR sensor 138 while effectively using an empty space (a region where a member guiding movement of the second movable frame 104 is not present). Accordingly, the diameter of the unit can be made small.

Installation Position of Magnetic Force Applying Unit

As described above, the focus unit 100 according to the present embodiment includes the four magnetic force applying units 124A to 124D.

Figure 9:
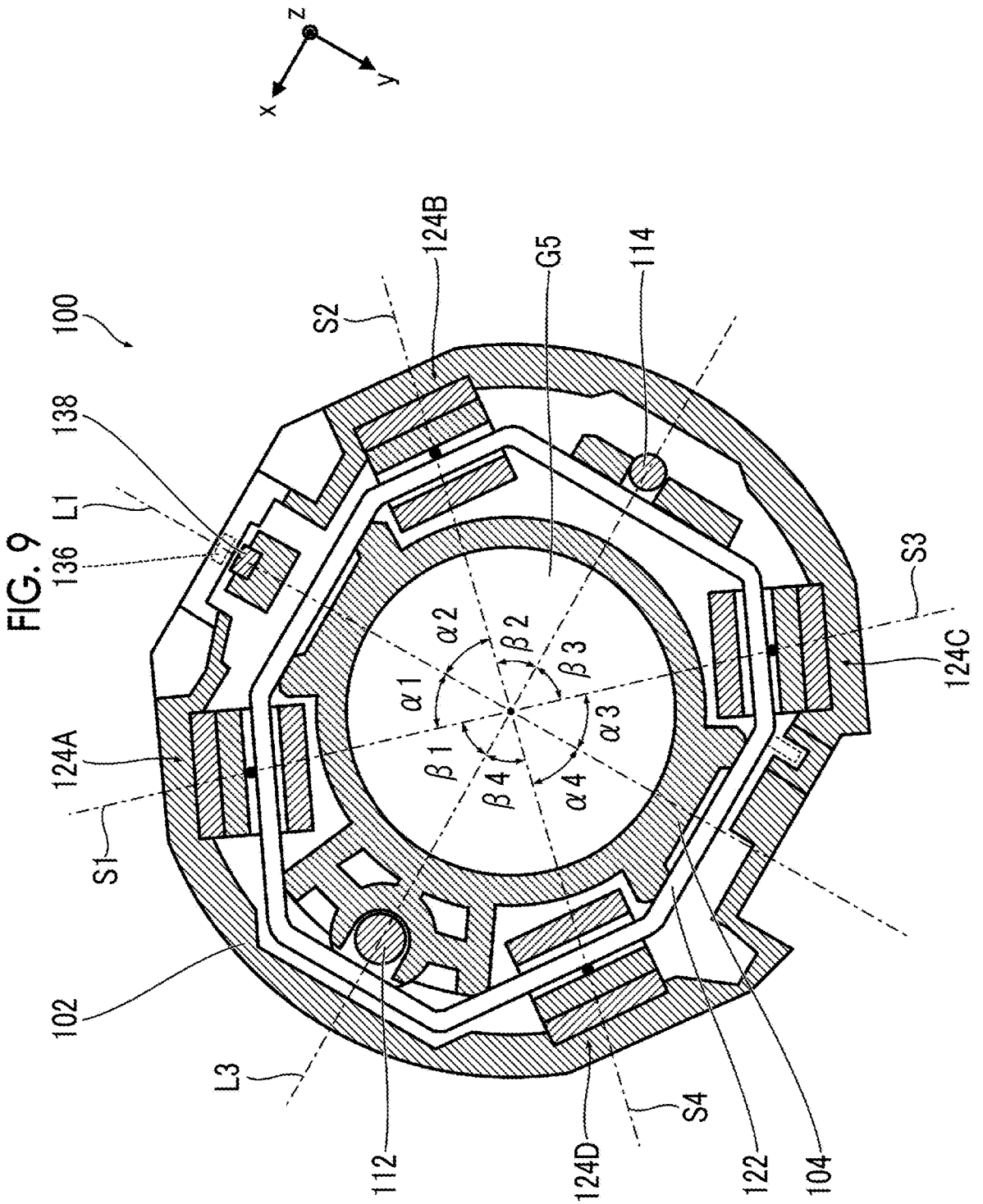
FIG. 9 is an explanatory view of the installation positions of four magnetic force applying units.

FIG. 9 is an explanatory view of the installation positions of the four magnetic force applying units.

As shown in the drawing, the four magnetic force applying units 124A to 124D are respectively disposed in four compartments separated by the first straight line L1 (the straight line passing through the magnetic scale 136 and the optical axis Z) and the third straight line L3 (the straight line passing through the main shaft 112 and the optical axis Z) in the plane orthogonal to the optical axis Z. That is, two magnetic force applying units are disposed on each of both sides separated by the first straight line L1 and two magnetic force applying units are disposed on each of both sides separated by the third straight line L3.

Particularly, in the case of the focus unit 100 of the present embodiment, the four magnetic force applying units 124A to 124D are disposed at positions as follows.

That is, as shown in FIG. 9, the first magnetic force applying unit 124A and the second magnetic force applying unit 124B are symmetrically disposed and the third magnetic force applying unit 124C and the fourth magnetic force applying unit 124D are symmetrically disposed with respect to the first straight line L1. Therefore, a disposition angle α1 and a disposition angle α2 are equal to each other in a case where a straight line passing through the first magnetic force applying unit 124A and the optical axis Z is a straight line S1, a straight line passing through the second magnetic force applying unit 124B and the optical axis Z is a straight line S2, an angle formed between the straight line S1 and the first straight line L1 is the disposition angle α1, and an angle formed between the straight line S2 and the first straight line L1 is the disposition angle α2. In addition, a disposition angle α3 and a disposition angle α4 are equal to each other in a case where a straight line passing through the third magnetic force applying unit 124C and the optical axis Z is a straight line S3, a straight line passing through the fourth magnetic force applying unit 124D and the optical axis Z is a straight line S4, an angle formed between the straight line S3 and the first straight line L1 is the disposition angle α3, and an angle formed between the straight line S4 and the first straight line L1 is the disposition angle α4.

In addition, the first magnetic force applying unit 124A and the fourth magnetic force applying unit 124D are symmetrically disposed and the second magnetic force applying unit 124B and the third magnetic force applying unit 124C are symmetrically disposed with respect to the third straight line L3. Therefore, a disposition angle β1 and a disposition angle β4 are equal to each other in a case where an angle formed between the straight line S1 and the third straight line L3 is the disposition angle β1, and an angle formed between the straight line S4 and the third straight line L3 is the disposition angle β4. In addition, a disposition angle β2 and a disposition angle β3 are equal to each other in a case where an angle formed between the straight line S2 and the third straight line L3 is the disposition angle β2, and an angle formed between the straight line S3 and the third straight line L3 is the disposition angle β3.

Note that, a straight line passing through the first magnetic force applying unit 124A refers to a straight line passing through the center or the centroid of the first magnetic force applying unit 124A. The same applies to the other magnetic force applying units.

For example, in the case of the focus unit 100 of the present embodiment, the magnetic force applying units 124A to 124D are disposed at positions at which the disposition angles α1, α2, α3, and α4 are 43° and the disposition angles β1, β2, β3, and β4 are 47°.

Note that, in the present embodiment, magnetic force applying units disposed on both sides adjacent to the MR sensor 138 are the first magnetic force applying unit 124A and the second magnetic force applying unit 124B. Therefore, the straight lines S1 and S2 are examples of a fourth straight line. In addition, the disposition angles α1 and α2 are examples of a second angle.

Installation Posture of Magnetic Force Applying Unit

The magnetic force applying units 124A to 124D are installed in postures as follows with respect to the second base frame 102.

Figure 10:
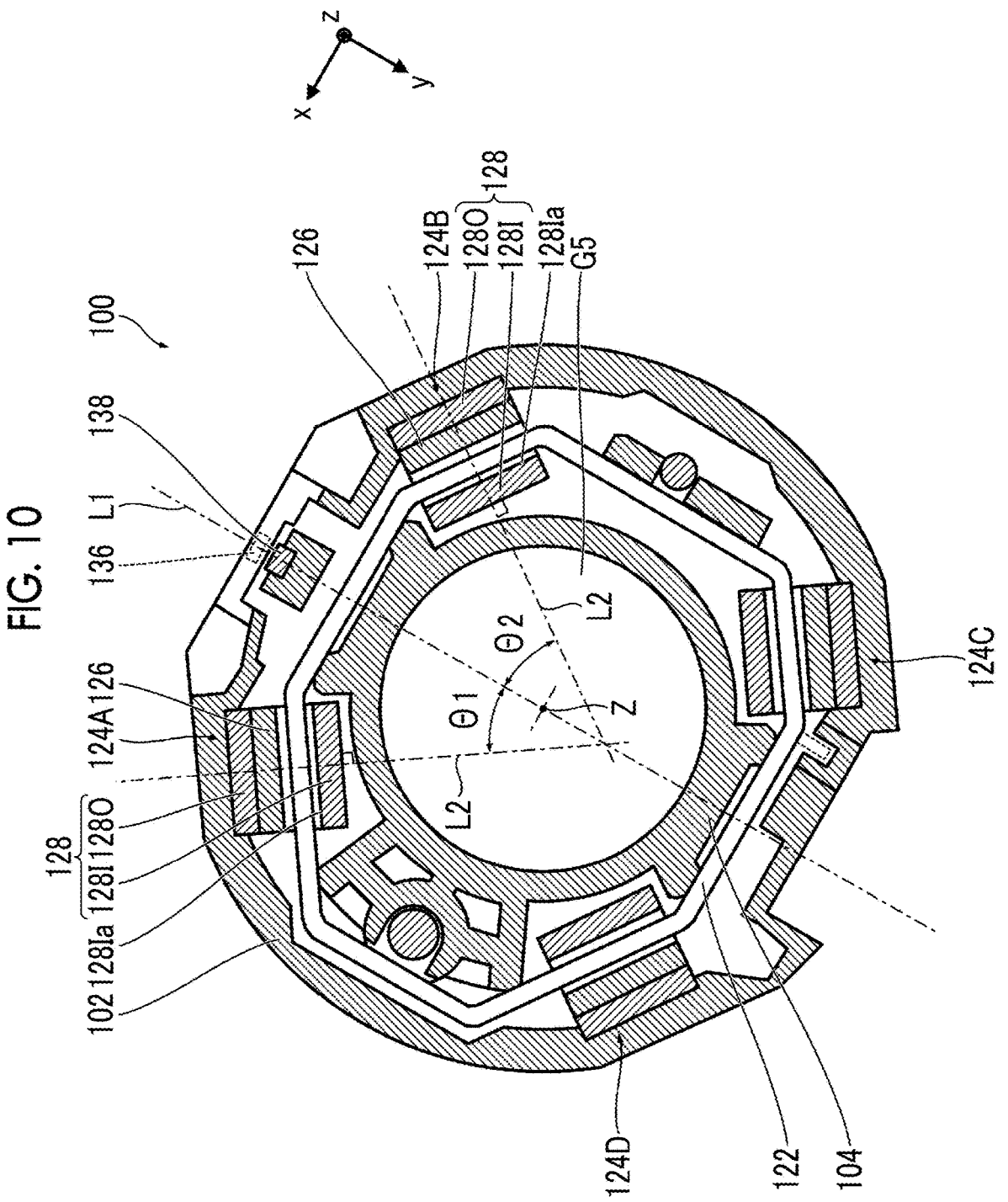
FIG. 10 is an explanatory view of the installation postures of the magnetic force applying units.

FIG. 10 is an explanatory view of the installation postures of the magnetic force applying units.

Regarding each of the magnetic force applying units 124A and 124B disposed on both sides adjacent to the MR sensor 138, a straight line orthogonal to surfaces of the inner yoke portion 128I and the outer yoke portion 128O that face each other will be referred to as a second straight line L2. The magnetic force applying units 124A and 124B disposed on both sides adjacent to the MR sensor 138 are disposed in postures in which an angle formed between the first straight line L1 and the second straight line L2 is smaller than 45°. In other words, disposition is performed such that a normal line from the flat surface portion of the magnet 126 from the optical axis Z and a straight line passing through the optical axis Z and the flat surface portion of the magnet 126 form an angle. Hereinafter, this point will be described in more detail.

In the focus unit 100 of the present embodiment, the magnetic force applying units 124A and 124B disposed on both sides adjacent to the MR sensor 138 are the first magnetic force applying unit 124A and the second magnetic force applying unit 124B.

The surfaces of the inner yoke portion 128I and the outer yoke portion 128O that face each other are surfaces at which the inner yoke portion 128I and the outer yoke portion 128O face the coil 122, and are surfaces parallel to each other. Such a surface is also a surface at which the magnet 126 faces the coil 122. A surface of the inner yoke portion 128I that faces the coil 122 will be referred to as a surface 128Ia. The second straight line L2 is a straight line orthogonal to the surface 128Ia.

Regarding the first magnetic force applying unit 124A, an angle formed between the second straight line L2 and the first straight line L1 will be referred to as an installation angle θ1. Regarding the second magnetic force applying unit 124B, an angle formed between the second straight line L2 and the first straight line L1 will be referred to as an installation angle θ2. The installation angles θ1 and θ2 are examples of a first angle.

The first magnetic force applying unit 124A is installed in a posture in which the installation angle θ1 is smaller than 45°. Similarly, the second magnetic force applying unit 124B is installed in a posture in which the installation angle θ2 is smaller than 45°.

In the case of the focus unit 100 of the present embodiment, since the first magnetic force applying unit 124A and the second magnetic force applying unit 124B are symmetrically disposed with respect to the first straight line L1, the installation angle θ1 and the installation angle θ2 are angles that are equal to each other (including angles within a range of angles that are acceptable as substantially the same angles as each other).

For example, in the case of the focus unit 100 of the present embodiment, the first magnetic force applying unit 124A and the second magnetic force applying unit 124B are installed in postures in which the installation angles θ1 and θ2 are 35°.

Since the magnetic force applying units 124A and 124B disposed on both sides adjacent to the MR sensor 138 are installed as described above, the influence of a disturbance magnetic field on the MR sensor 138 can be suppressed.

Figure 11:
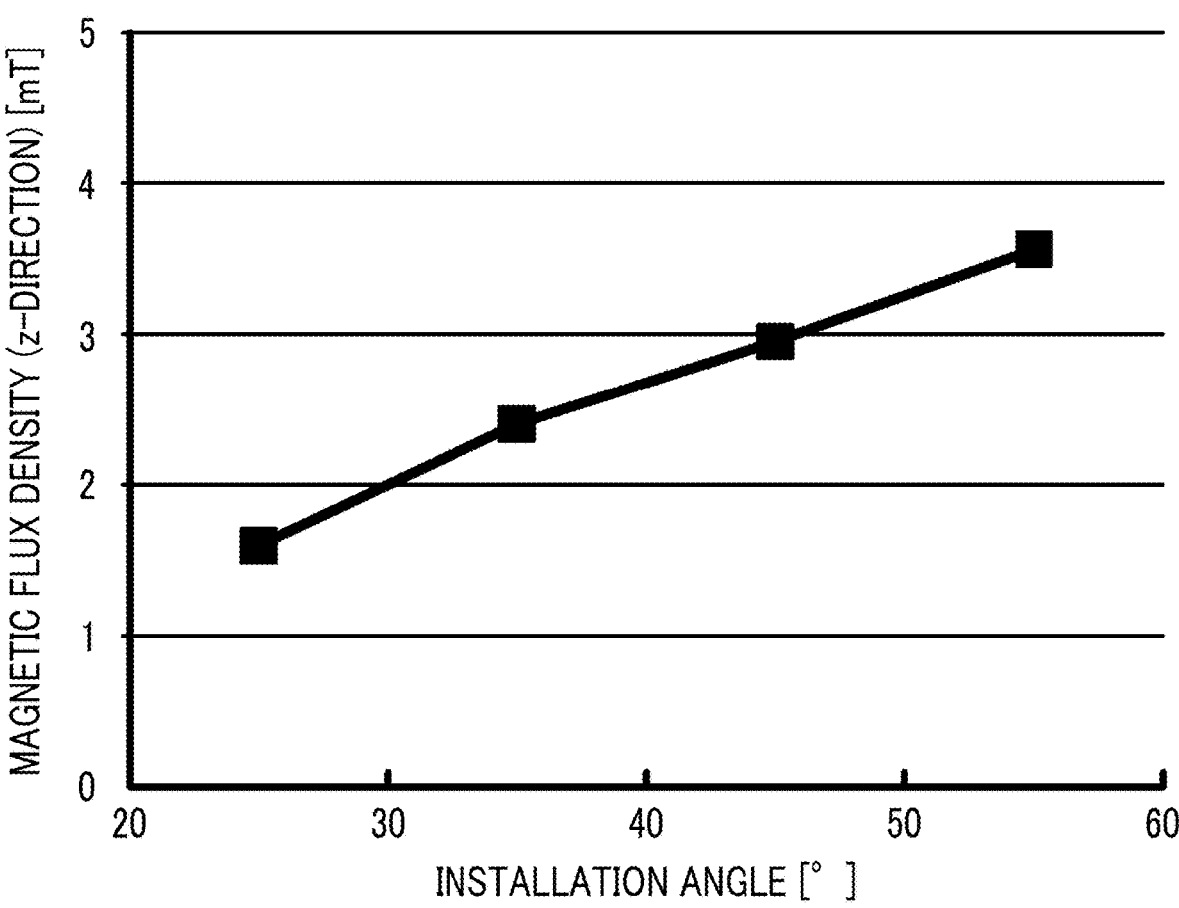
FIG. 11 is a graph showing a relationship between the installation angle of a magnetic force applying unit and a magnetic flux density.

FIG. 11 is a graph showing a relationship between the installation angle of a magnetic force applying unit and a magnetic flux density.

The drawing shows the way in which a magnetic flux density in a z-direction changes in a case where the installation angles θ1 and θ2 of the first magnetic force applying unit 124A and the second magnetic force applying unit 124B are changed within a range of 25° to 55°. The horizontal axis represents the installation angles θ1 and θ2 of the first magnetic force applying unit 124A and the second magnetic force applying unit 124B and the vertical axis represents the magnetic flux density in the z-direction. Here, the z-direction is a direction parallel to the optical axis Z as shown in FIG. 8. Note that, a y-direction is an inner diameter direction at the installation position of the MR sensor 138 in a plane orthogonal to the optical axis Z. In addition, an x-direction is a tangential direction (a direction orthogonal to the y-direction) at the installation position of the MR sensor 138.

Regarding the MR sensor 138, which is a magnetic sensor, a small amount of position information output is obtained mainly because of the influence of a disturbance magnetic field in the z-direction and the x-direction.

As shown in FIG. 11, it can be found that it is possible to reduce the magnetic flux density (the z-direction) by reducing the installation angles.

Therefore, it is preferable to install the first magnetic force applying unit 124A and the second magnetic force applying unit 124B such that the installation angles θ1 and θ2 are made as small as possible. As described above, in the present embodiment, the first magnetic force applying unit 124A and the second magnetic force applying unit 124B are installed in a posture in which the installation angles θ1 and θ2 are 35°.

Note that, in the focus unit 100 of the present embodiment, the MR sensor 138 is disposed at a position that is 90 degrees out of phase from the main shaft 112 so that compactness in a radial direction is achieved. Meanwhile, the MR sensor 138 is disposed close to the coil 122.

Figure 12:
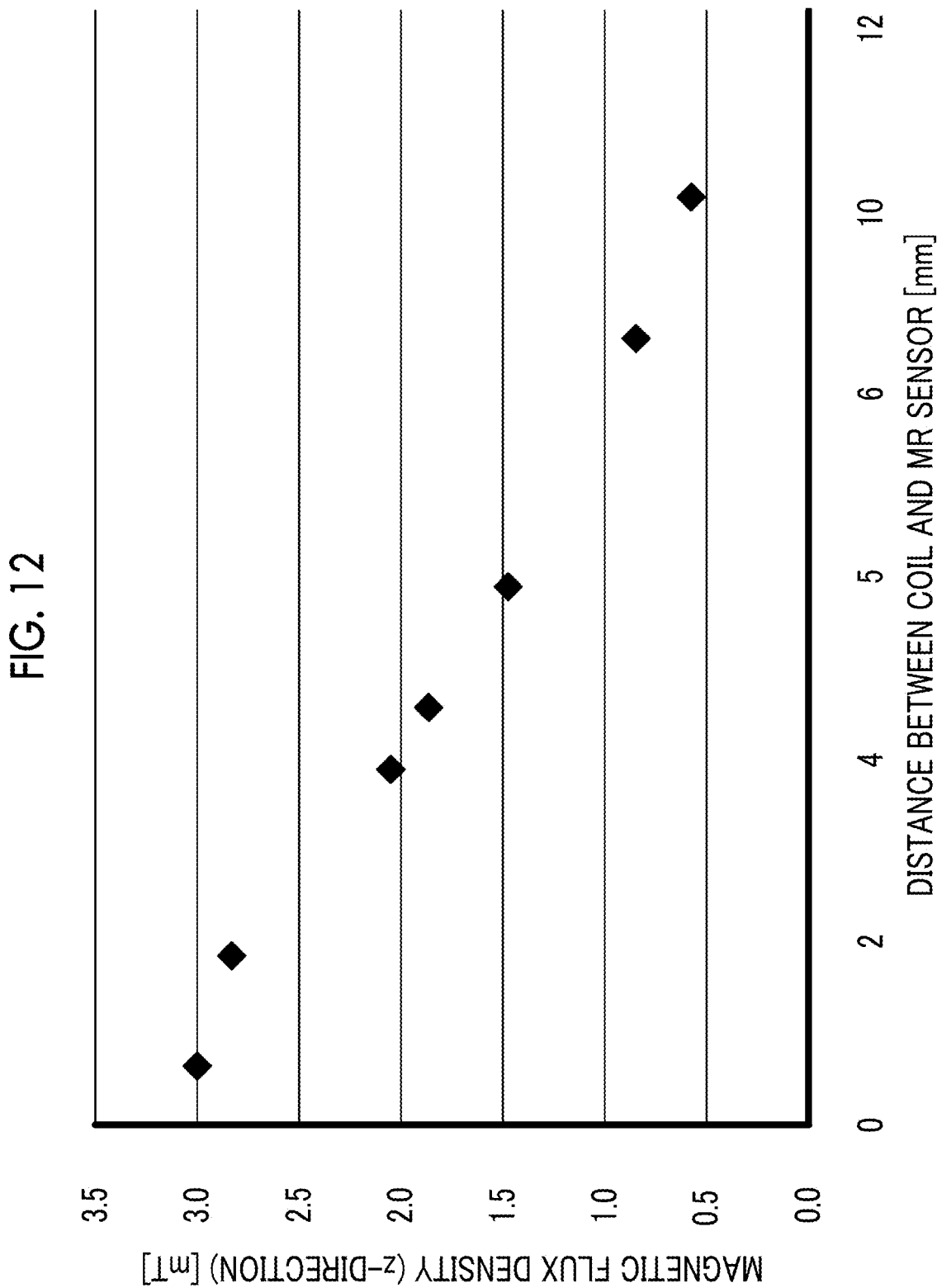
FIG. 12 is a graph showing a relationship between a distance between a coil and an MR sensor and a magnetic field in a z-direction.

FIG. 12 is a graph showing a relationship between a distance between the coil and the MR sensor and a magnetic field in the z-direction.

In the drawing, the horizontal axis represents a distance between the coil 122 and the MR sensor 138 in the radial direction and the vertical axis represents a magnetic field in the z-direction.

As shown in the drawing, as the distance between the coil 122 and the MR sensor 138 increases, the influence of the magnetic field decreases.

Regarding the magnetic force applying units 124A and 124B disposed on both sides adjacent to the MR sensor 138, the smaller the installation angles θ1 and θ2 thereof are made, the more the distance between the coil 122 and the MR sensor 138 can be increased. Therefore, making the installation angles θ1 and θ2 of the first magnetic force applying unit 124A and the second magnetic force applying unit 124B small also results in a decrease in influence of the magnetic field of the coil 122.

The installation angles of magnetic force applying units (in the present embodiment, the third magnetic force applying unit 124C and the fourth magnetic force applying unit 124D) other than the magnetic force applying units on both sides adjacent to the MR sensor 138 are not particularly limited. In the present embodiment, the third magnetic force applying unit 124C, the fourth magnetic force applying unit 124D, the first magnetic force applying unit 124A, and the second magnetic force applying unit 124B are symmetrically disposed with respect to the third straight line L3. Therefore, the third magnetic force applying unit 124C is installed at the same installation angle (including an installation angle within a range of installation angles that are acceptable as substantially the same installation angles) as the second magnetic force applying unit 124B and the fourth magnetic force applying unit 124D is installed at the same installation angle (including an installation angle within a range of installation angles that are acceptable as substantially the same installation angles) as the first magnetic force applying unit 124A.

Installation Position of MR Sensor

Figure 13:
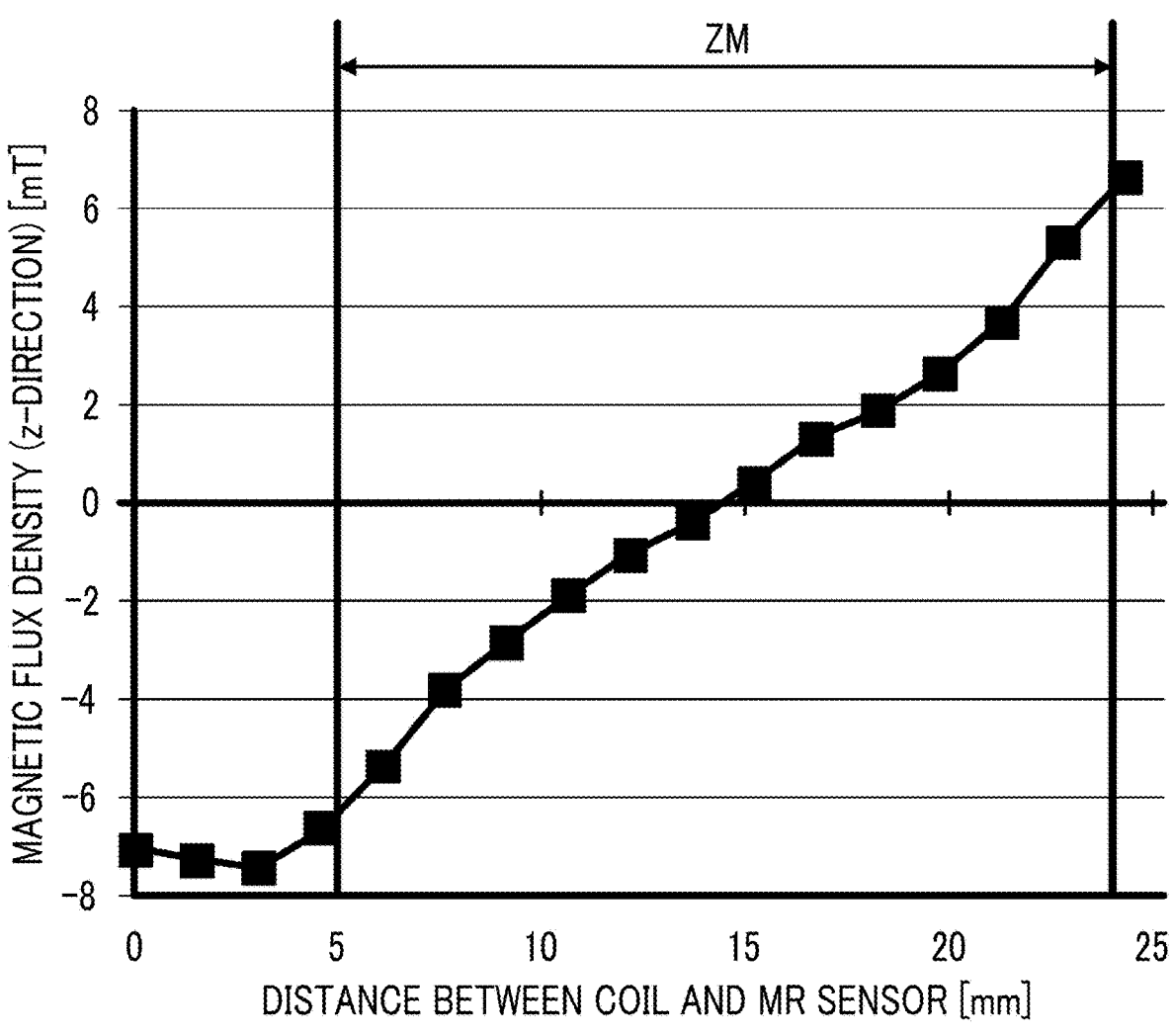
FIG. 13 is a graph showing a relationship between the installation position of the MR sensor with respect to the magnetic force applying unit in the z-direction and a magnetic flux density in the z-direction.

FIG. 13 is a graph showing a relationship between the installation position of the MR sensor with respect to the magnetic force applying unit in the z-direction and the magnetic flux density in the z-direction. In the drawing, the horizontal axis represents the installation position of the MR sensor with respect to the magnetic force applying unit in the z-direction, and the vertical axis represents the magnetic flux density in the z-direction. The reference numeral "ZM" indicates the disposition range of the magnets 126.

Figure 14:
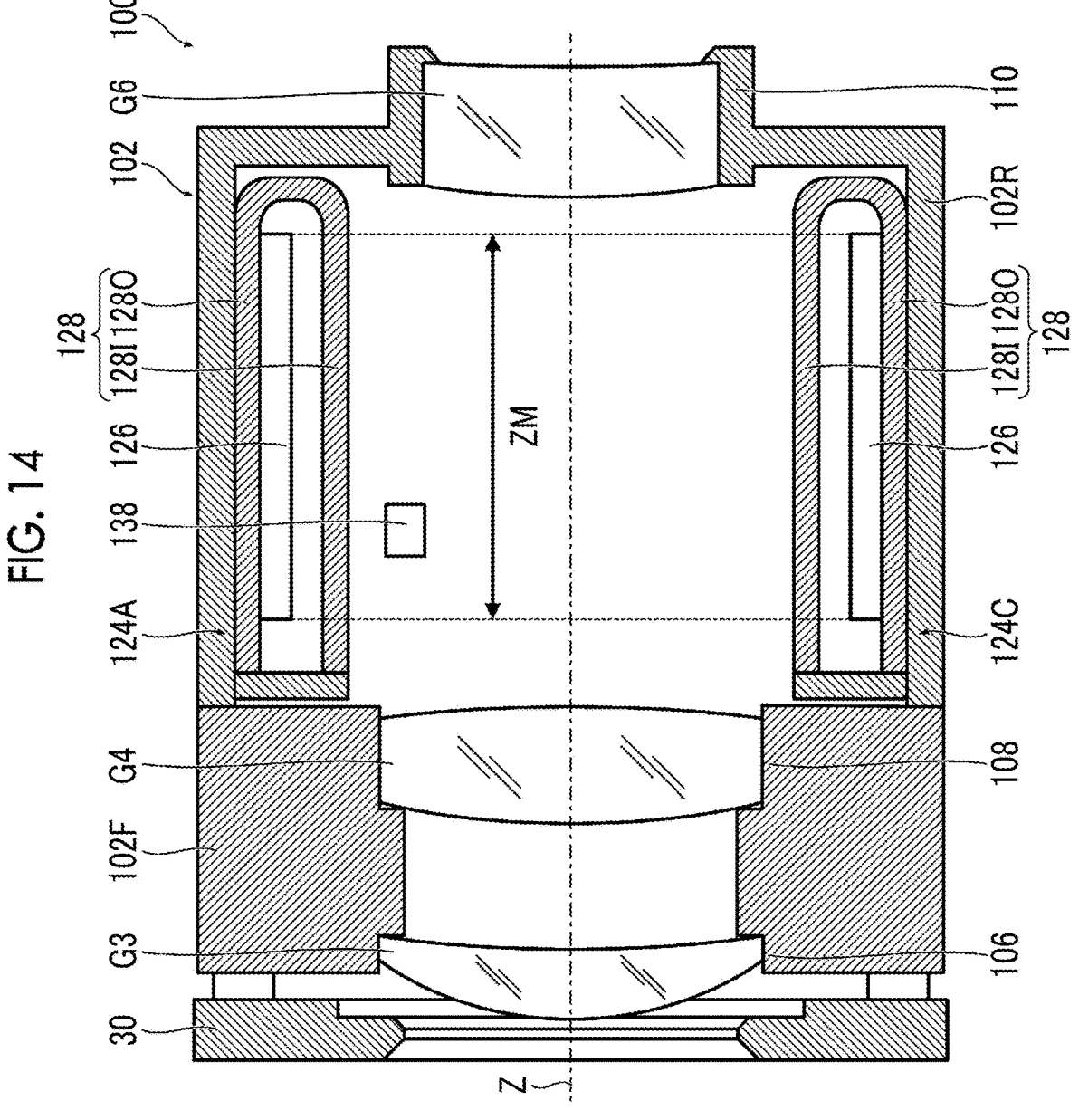
FIG. 14 is an explanatory view of the disposition range of magnets and the installation position of the MR sensor.

FIG. 14 is an explanatory view of the disposition range of the magnets and the installation position of the MR sensor.

As shown in the drawing, a disposition range ZM of the magnet 126 is a range within which the magnets 126 of the magnetic force applying units 124A to 124D attached to the second base frame 102 are disposed in the optical axis direction (the z-direction).

As shown in FIG. 13, the closer a position is to the centers of the magnets 126, the smaller the magnetic flux density in the z-direction is at the position. Therefore, the closer the MR sensor 138 is disposed to the centers of the magnets 126, the less likely the MR sensor 138 is influenced by a disturbance magnetic field.

Meanwhile, in a case where the MR sensor 138 is disposed close to the centers of the magnets 126, the MR sensor 138 protrudes in the optical axis direction of the magnetic scale 136 corresponding to closeness, which results in a problem that the degree of freedom in design in the optical axis direction decrease or the size of a unit in the optical axis direction is made large.

Therefore, it is preferable to install the MR sensor 138 in consideration of the disposition of the magnetic scale 136. In this case, it is preferable to install the MR sensor 138 within the range of the magnets 126.

In addition, in a case where the MR sensor 138 is installed at a position distant from the centers of the magnets 126, the influence of a disturbance magnetic field is made large corresponding to distantness. However, in a case where the magnetic force applying units 124A and 124B disposed on both sides adjacent to the MR sensor 138 are installed as described above, the influence of the disturbance magnetic field can be reduced.

As described above, regarding the focus unit 100, since the installation angles θ1 and θ2 of the magnetic force applying units 124A and 124B disposed on both sides adjacent to the MR sensor 138 are made smaller than 45°, it is possible to reduce the influence of a disturbance magnetic field on a sensor and to stably detect the position of the fifth lens group G5, which is a focus lens, with high accuracy.

In addition, since the MR sensor 138 is disposed to be offset from the position of the main shaft 112, it is possible to make a unit compact in diameter. Particularly, since the MR sensor 138 is disposed at a position that is 90 degrees out of phase from the main shaft 112, it is possible to effectively achieve compactness.

In addition, since the MR sensor 138 is disposed at a position that is 90 degrees out of phase from the main shaft 112 particularly at an intermediate position between the main shaft 112 and the sub shaft 114, effects as follows can also be achieved. For example, in a case where the second base frame 102 is inclined in a plane including the main shaft 112 and the sub shaft 114 and the MR sensor 138 is disposed at the main shaft 112 or at a position close to the main shaft 112, the inclination causes an error between a lens position on the optical axis and a sensor detection position. Meanwhile, in a case where the MR sensor 138 is disposed at a position that is 90 degrees out of phase from the main shaft 112, the influence of inclination can be minimized even in a case where there is inclination.

Modification Example of Focus Unit

About Installation Posture of Magnetic Force Applying Unit

As described above, the magnetic force applying unit 124A and the magnetic force applying unit 124B disposed on both sides adjacent to the MR sensor 138 are installed in postures in which the installation angles (first angles) $\theta 1$ and $\theta 2$ thereof are smaller than 45°, more preferably, equal to or smaller than 35°.

About Installation Position of Magnetic Force Applying Unit

In the above-described embodiment, the magnetic force applying unit 124A and the magnetic force applying unit 124B disposed on both sides adjacent to the MR sensor 138 are disposed at positions at which the disposition angles (second angles) $\alpha 1$ and $\alpha 2$ thereof are 43°. However, the disposition angles $\alpha 1$ and $\alpha 2$ are not limited thereto. However, in consideration of compactness of the unit and the like, it is preferable that the disposition angles $\alpha 1$ and $\alpha 2$ are within a range of equal to or larger than 35° and smaller than 55°.

In addition, the installation angles (the first angles) $\theta 1$ and $\theta 2$ of the magnetic force applying unit 124A and the magnetic force applying unit 124B disposed on both sides adjacent to the MR sensor 138 are preferably set to be smaller than the disposition angles (the second angles) $\alpha 1$ and $\alpha 2$ thereof ($\theta 1$, $\theta 2 < \alpha 1$, $\alpha 2$).

About Number of Magnetic Force Applying Units Installed

In the above-described embodiment, the number of magnetic force applying units constituting the voice coil motor 120 is four. However, the number of magnetic force applying units is not limited thereto. It is sufficient that at least two magnetic force applying units are provided.

Shape of Yoke

In the above-described embodiment, the shape of each of the inner yoke portions and the outer yoke portions is a rectangular flat plate-like shape. However, with a configuration as follows, the efficiency of the magnetic force applying units with respect to the volume (mass) of the yokes can be maximized.

Figure 15:
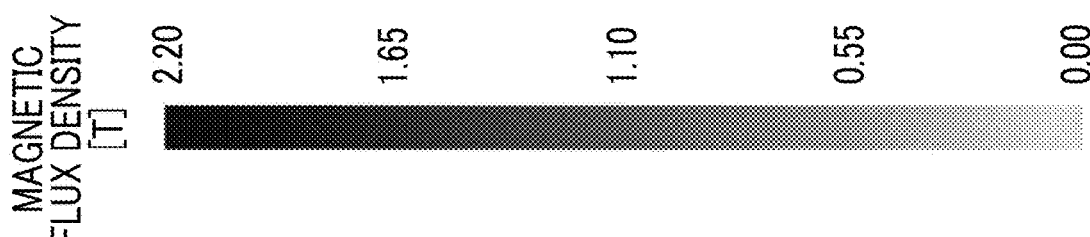
FIG. 15 is a contour diagram of the magnetic flux density of the magnetic force applying units.
Figure 15:
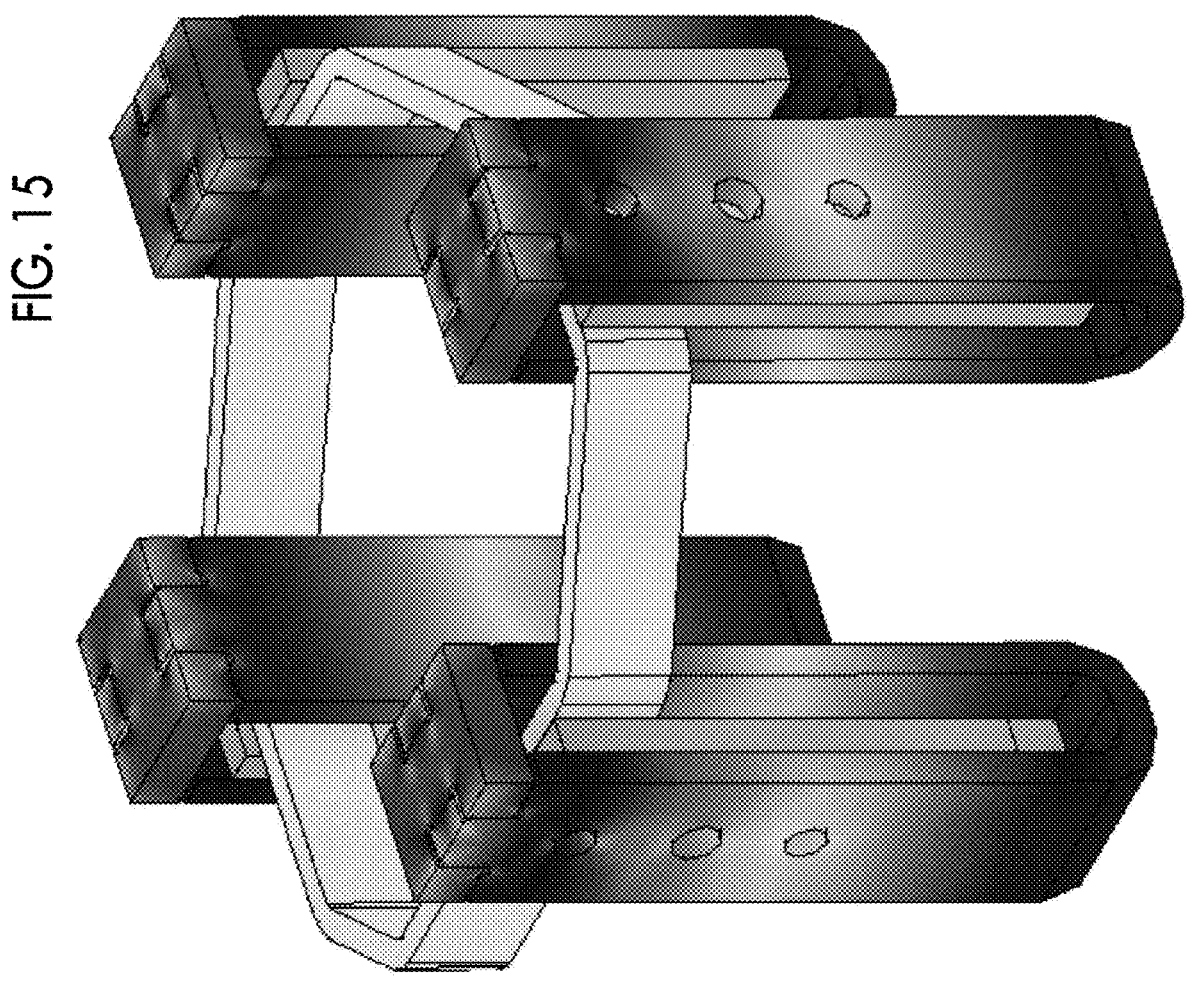

FIG. 15 is a contour diagram of the magnetic flux density of the magnetic force applying units. In addition, FIG. 16 is an enlarged view of a portion of FIG. 15.

Figure 16:
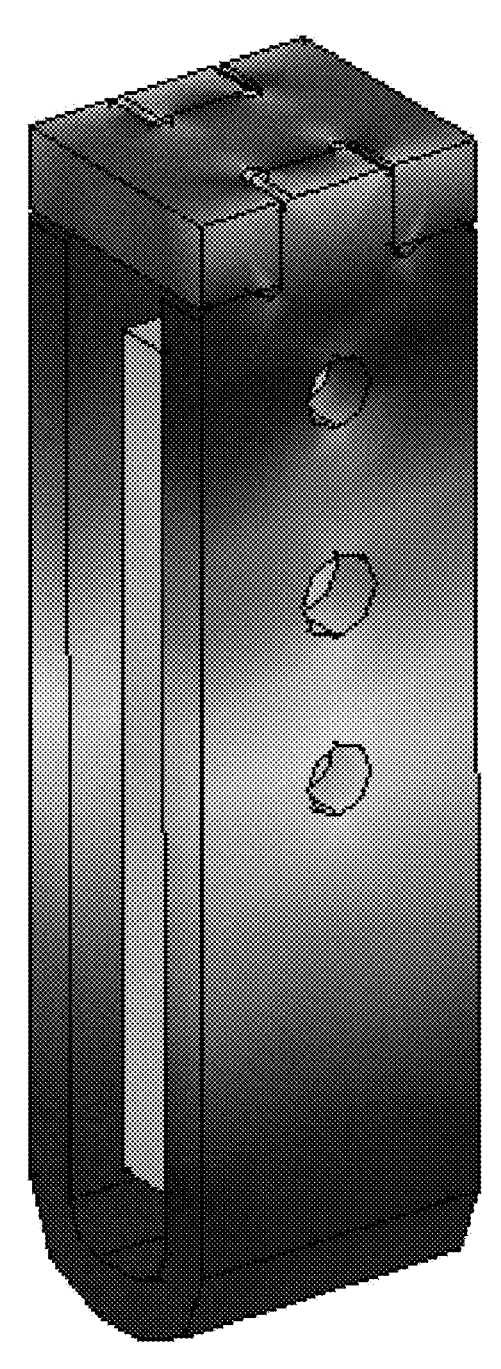
FIG. 16 is an enlarged view of a portion of FIG. 15.
Figure 16:
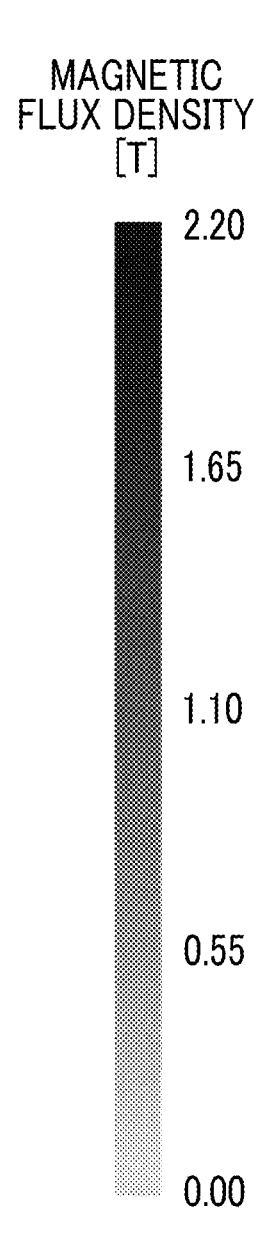

As shown in FIGS. 15 and 16, the distribution of the magnetic flux density in one magnetic force applying unit is not uniform. The magnetic flux density is lowest at the center in the longitudinal direction (the optical axis direction) and the magnetic flux density increases toward both ends.

Therefore, in a case where the yokes are configured in accordance with the distribution of the magnetic flux density, the efficiency of the magnetic force applying units with respect to the volume (mass) of the yokes can be maximized. Specifically, only the width of a portion of a yoke at which the magnetic flux density is high (a portion saturated with magnetic flux density) is made large. Meanwhile, the width of a portion of the yoke at which the magnetic flux density is low is made small.

Figure 17:
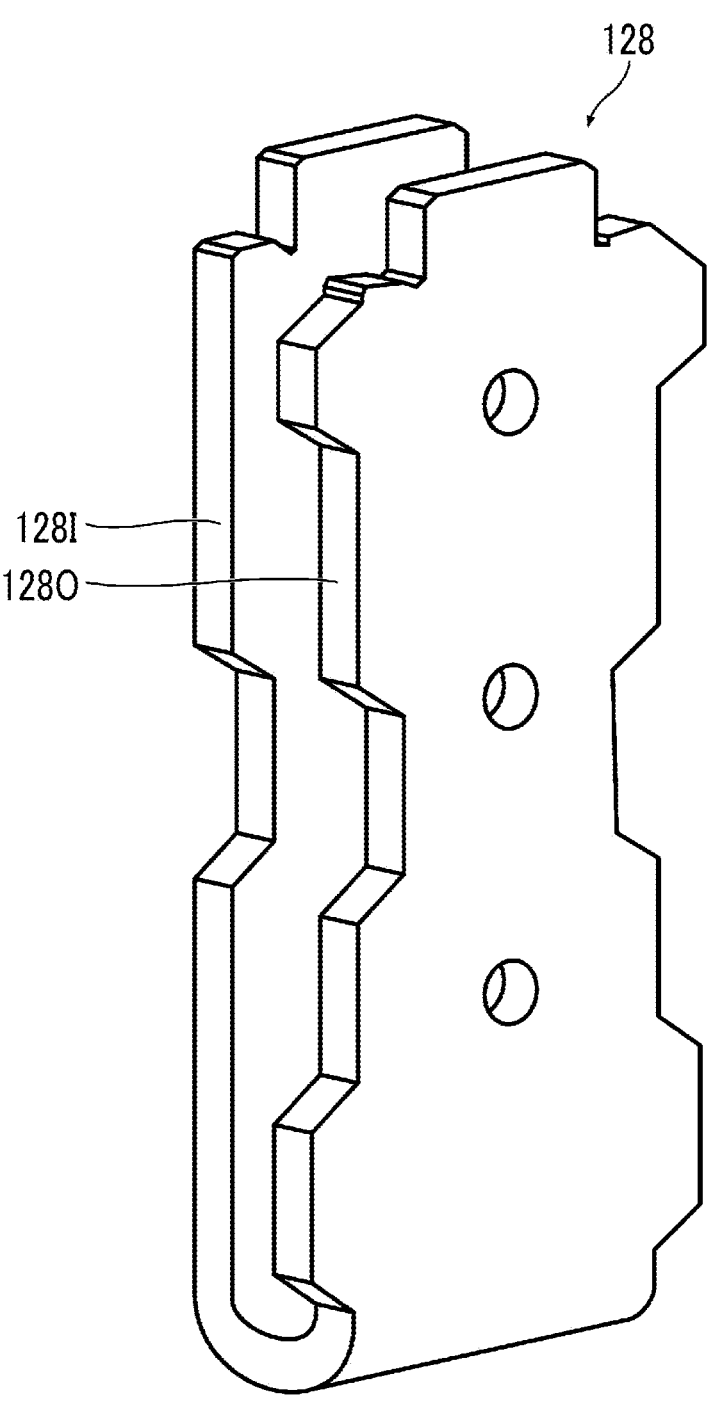
FIG. 17 is a perspective view showing an example of a yoke of which the width is adjusted in accordance with the distribution of the magnetic flux density.

FIG. 17 is a perspective view showing an example of a yoke of which the width is adjusted in accordance with the distribution of the magnetic flux density.

In an example shown in the drawing, in accordance with the distribution of the magnetic flux density of the magnetic force applying unit shown in FIG. 16, the widths of portions (both end portions) at which the magnetic flux density is high are made large and the width of a portion (the central portion) at which the magnetic flux density is low is made small. The efficiency of the magnetic force applying units with respect to the volume (mass) of the yokes can be maximized. In addition, accordingly, the weight of the unit can be reduced.

Note that, in the above-described example, the widths of the yokes are adjusted in accordance with the distribution of the magnetic flux density. However, the same effect can also be achieved through adjustment of the thicknesses thereof. In addition, both the widths and the thicknesses can also be adjusted in accordance with the distribution of the magnetic flux density.

About Magnetic Sensor

In the above-described embodiment, a case where the MR sensor is used as the magnetic sensor has been described as an example. However, examples of the magnetic sensor are not limited thereto. A configuration in which another magnetic sensor (for example, a hall sensor or the like) is used to detect the amount of movement or the position of the fifth lens group G5 can also be adopted.

OIS Unit

A unit based on the first base frame 204 constitutes an OIS unit 200 of the interchangeable lens 1. That is, the unit constitutes a camera shake-correction device in the interchangeable lens 1.

Figure 18:
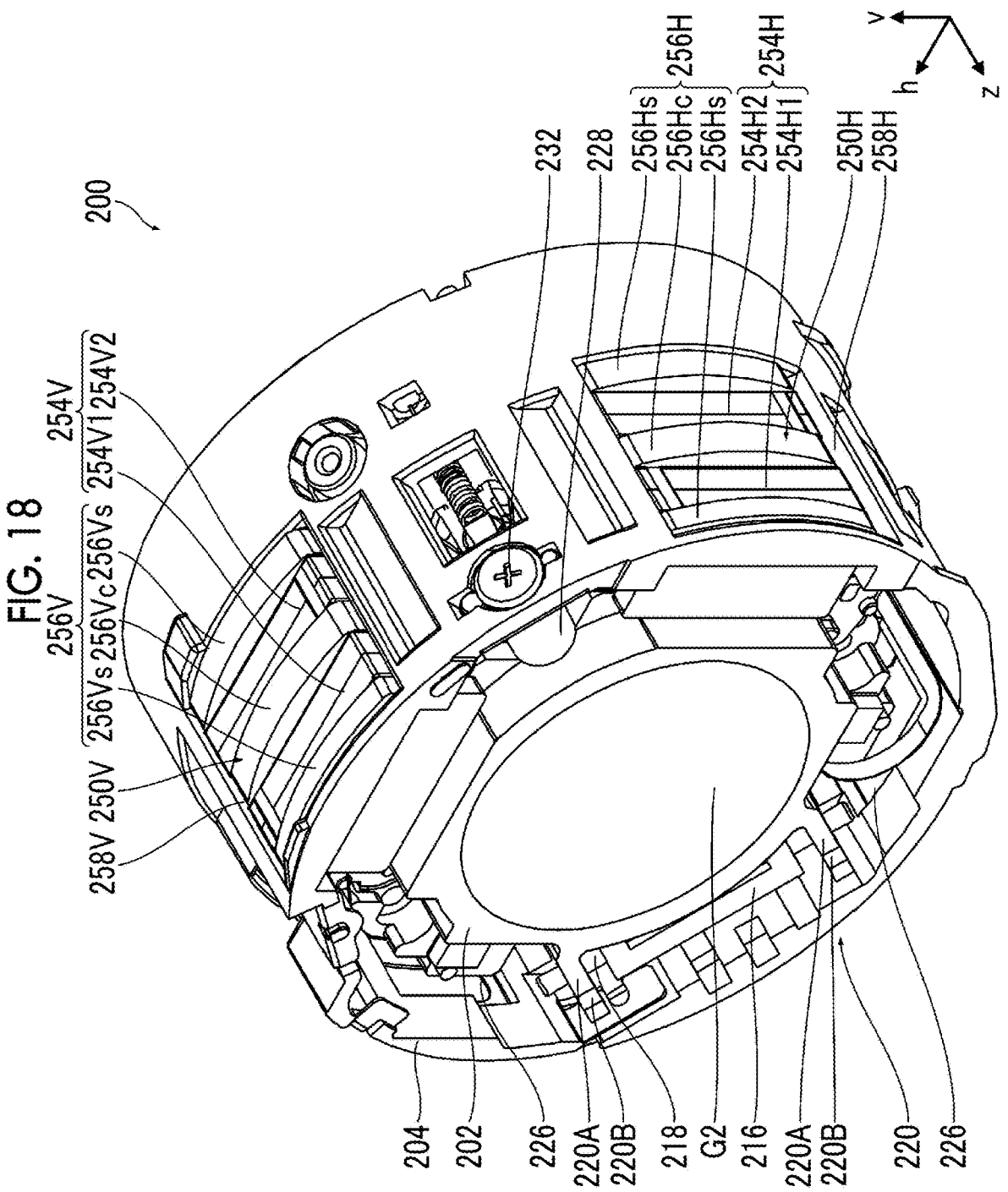
FIG. 18 is a perspective view showing a schematic configuration of an OIS unit.
Figure 19:
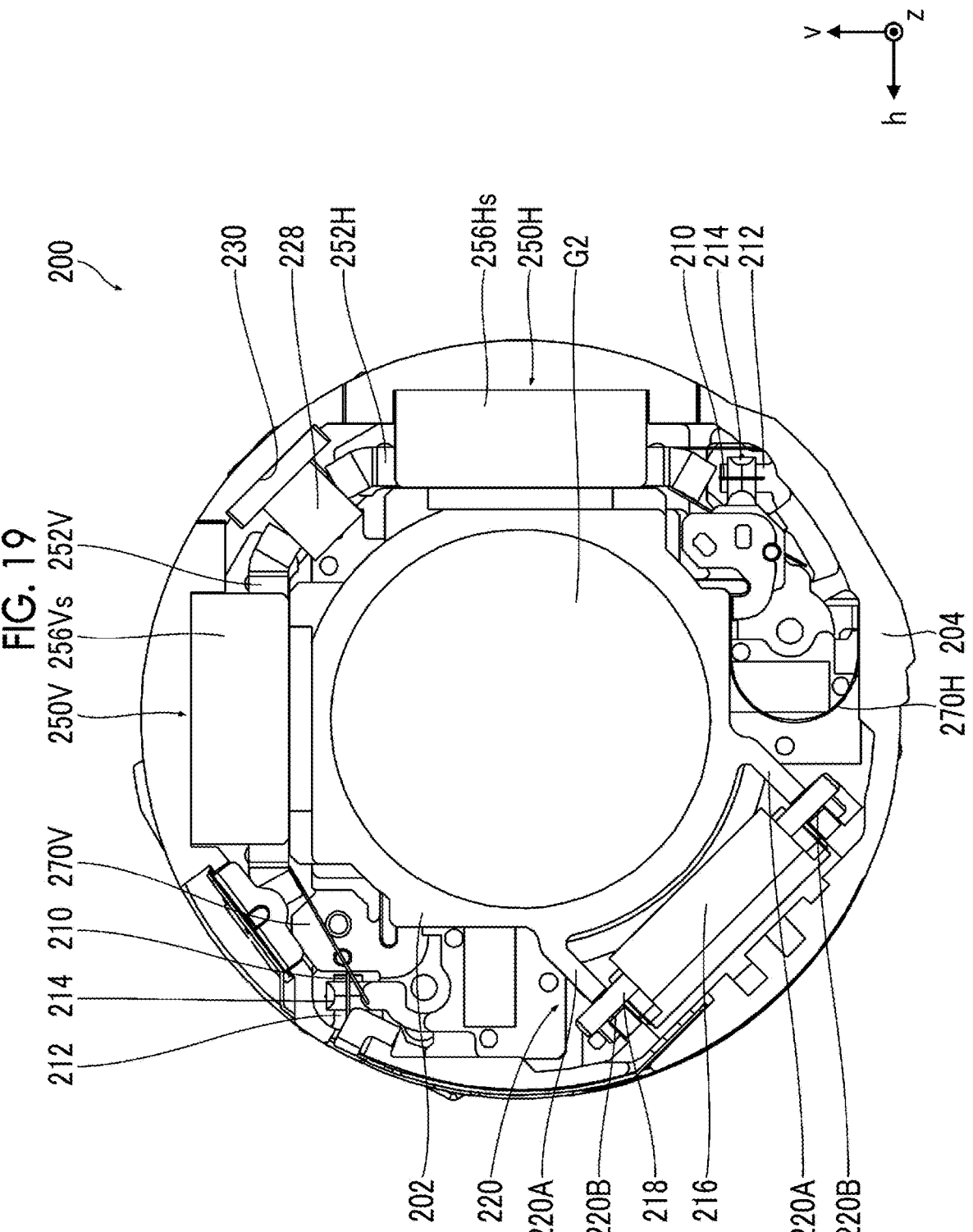
FIG. 19 is a front view of the OIS unit shown in FIG. 18.
Figure 20:
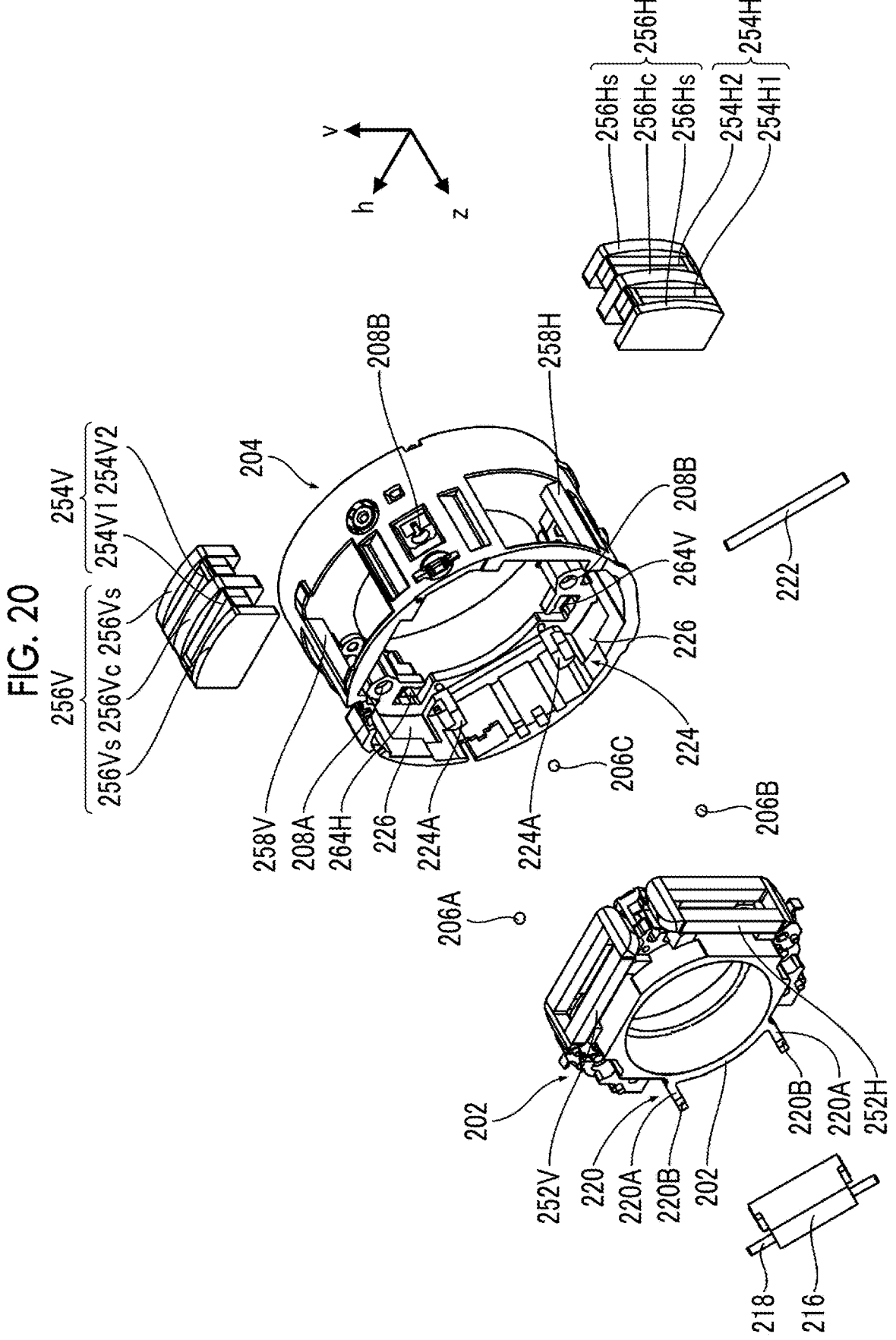
FIG. 20 is an exploded perspective view of the OIS unit shown in FIG. 18.

FIG. 18 is a perspective view showing a schematic configuration of the OIS unit. FIG. 19 is a front view of the OIS unit shown in FIG. 18. FIG. 20 is an exploded perspective view of the OIS unit shown in FIG. 18.

Figure 21:
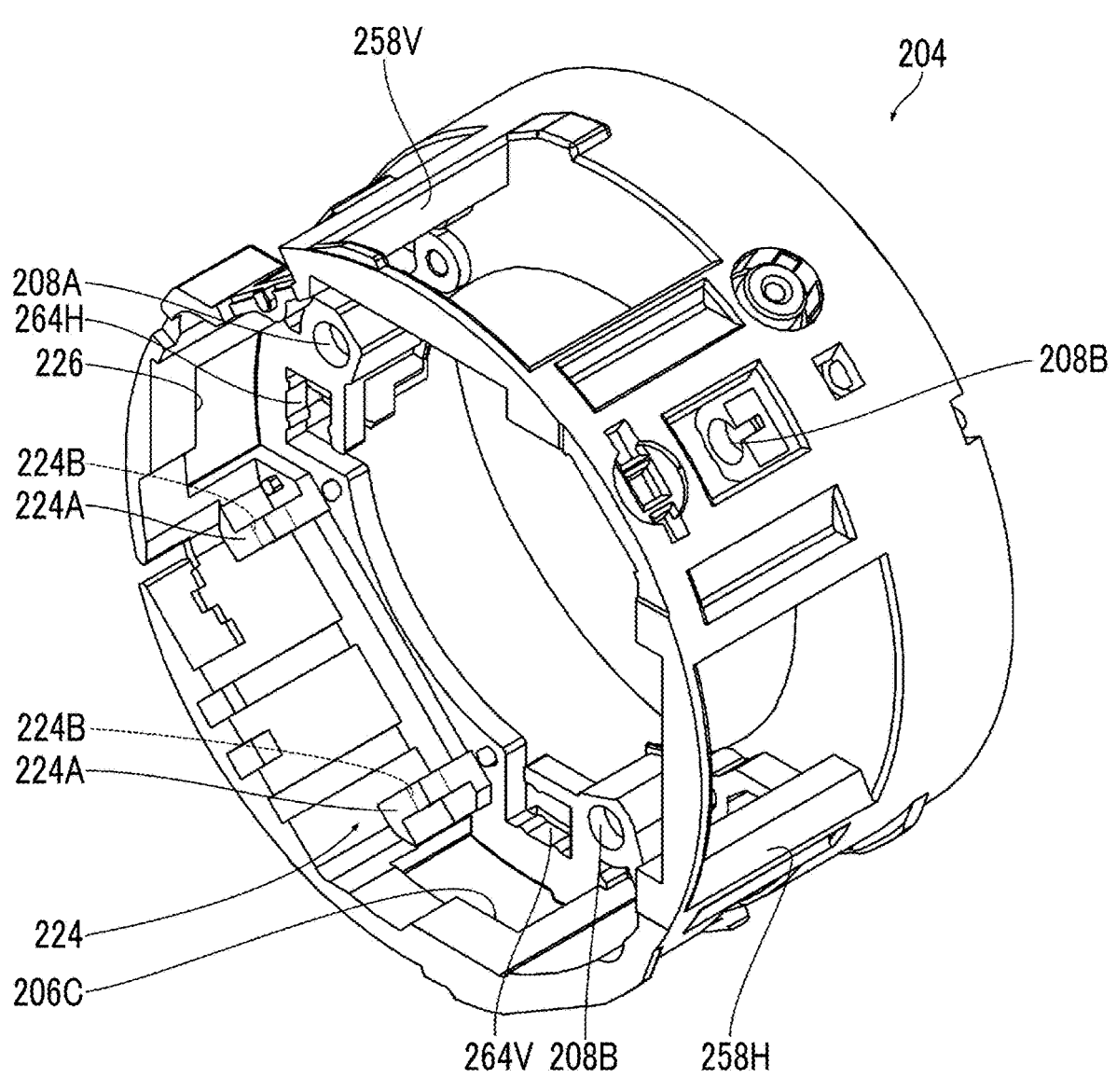
FIG. 21 is a perspective view showing a configuration of a first base frame.
Figure 22:
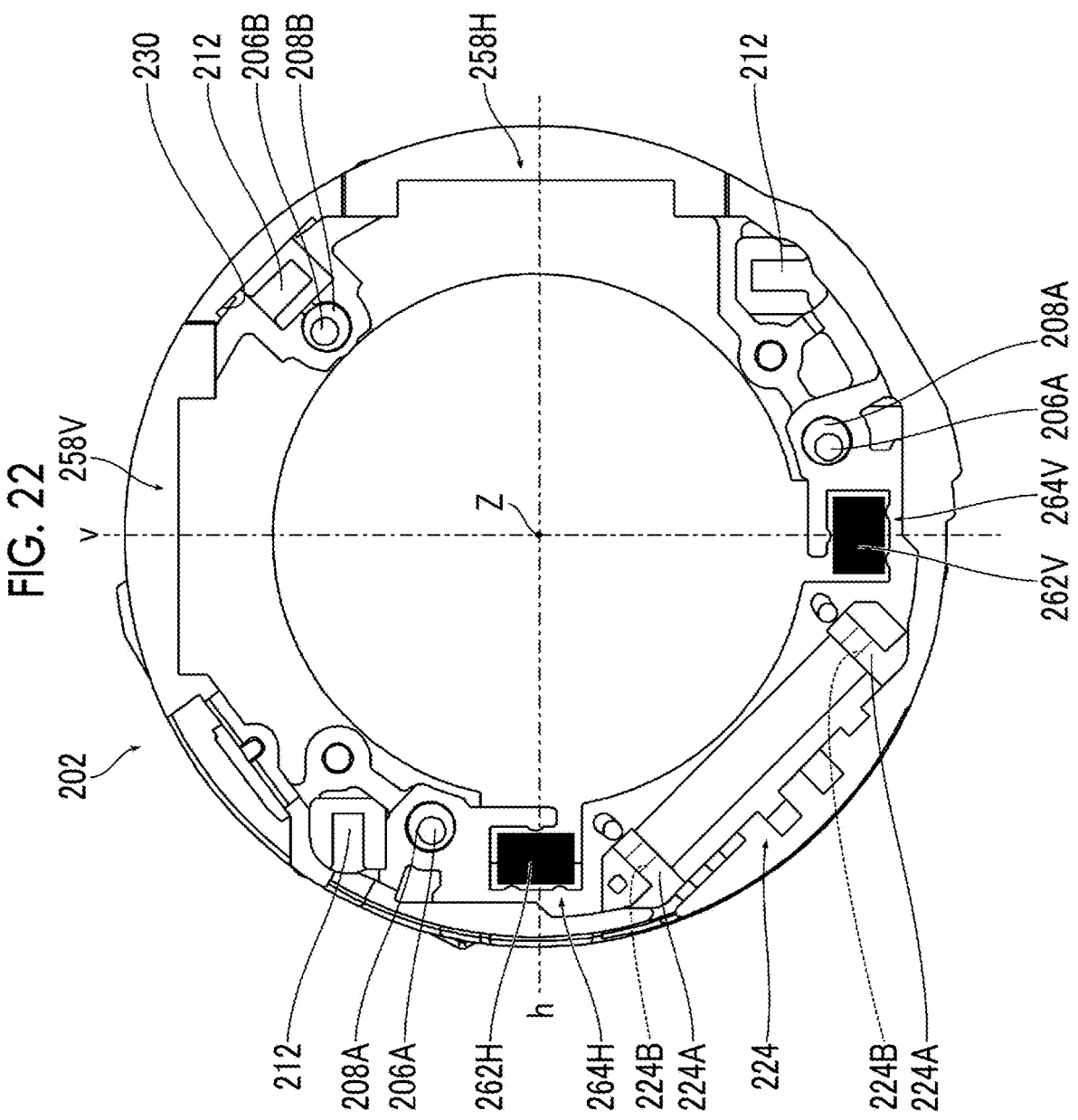
FIG. 22 is a front view of the first base frame.
Figure 23:
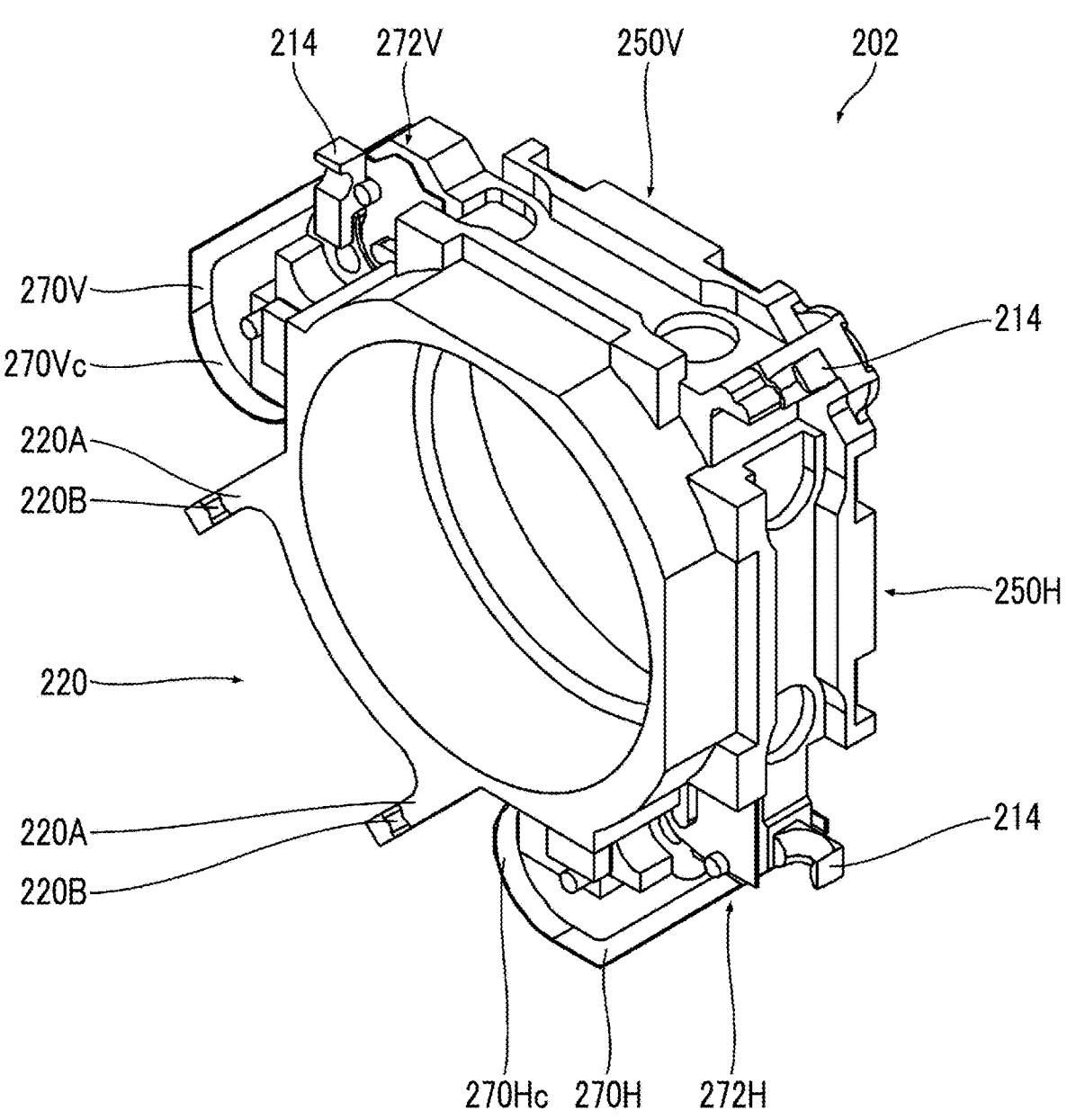
FIG. 23 is a perspective view showing a configuration of a first movable frame.
Figure 24:
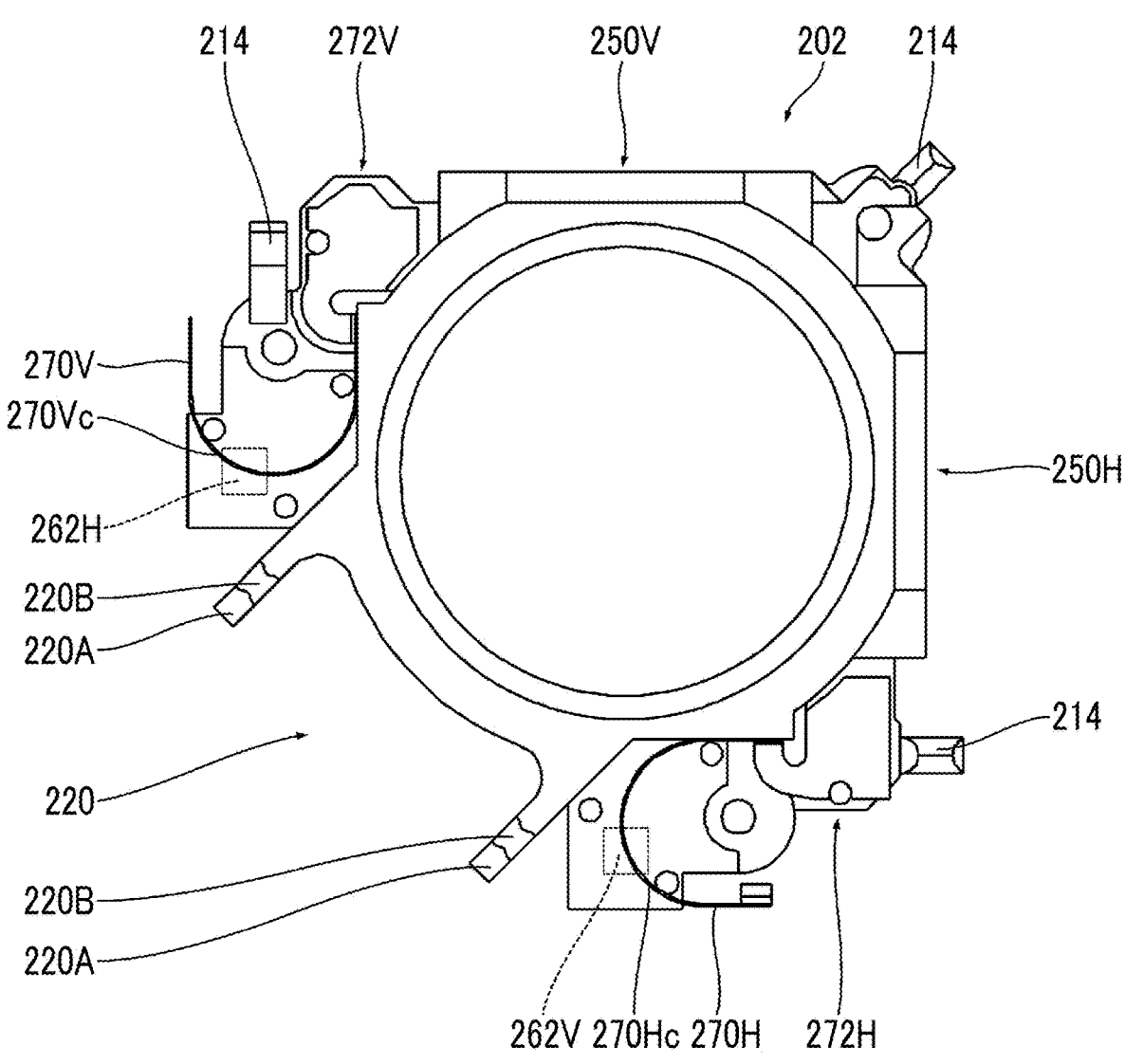
FIG. 24 is a front view of the first movable frame.

In addition, FIG. 21 is a perspective view showing the configuration of the first base frame. FIG. 22 is a front view of the first base frame. FIG. 23 is a perspective view showing the configuration of the first movable frame. FIG. 24 is a front view of the first movable frame.

The OIS unit 200 includes the first movable frame 202 that is a movable member holding the second lens group G2 that is a shake-correction lens, the first base frame 204 that is a base member holding the first movable frame 202 such that the first movable frame 202 is movable in a plane orthogonal to the optical axis Z, a drive mechanism that drives the first movable frame 202, and a position detection mechanism that detects the position of the first movable frame 202.

Note that, the first base frame 204 includes cam pins (not shown) at three positions on an outer peripheral portion. The cam pins are fitted to a linear movement groove (not shown)

that the first fixed cylinder 12 includes and a cam groove (not shown) that the cam cylinder 14 includes. Accordingly, in a case where the cam cylinder 14 is rotated, the first base frame 204 moves forward and backward along the optical axis Z.

Holding Structure for First Movable Frame

The first movable frame 202 is movably held with three rigid balls 206A to 206C interposed between the first movable frame 202 and the first base frame 204. The rigid balls 206A to 206C are examples of rolling bodies. The first base frame 204 includes rigid ball holding portions 208A to 208C that respectively hold the rigid balls 206A to 206C. The rigid ball holding portions 208A to 208C are provided at three positions on a circumference around the optical axis. Each of the rigid ball holding portions 208A to 208C is composed of a circular recess portion in which the rigid balls 206A to 206C are rollably accommodated. The first movable frame 202 is pressed to abut the three rigid balls 206A to 206C held by the rigid ball holding portions 208A to 208C and is supported to be movable in a plane orthogonal to the optical axis.

Portions of the first movable frame 202 that the rigid balls 206A to 206C abut are configured as rigid ball abutment portions and are provided on a back surface side (the image side) of the first movable frame 202. The rigid ball abutment portion is formed of a surface orthogonal to the optical axis, and a metal plate is disposed.

The first movable frame 202 is pressed to abut the rigid balls 206A to 206C by being urged toward the first base frame 204 by springs 210 which are urging members. The springs 210 are provided at three positions between the first movable frame 202 and the first base frame 204. The first base frame 204 includes base-side spring hook portions 212 provided at three positions in a circumferential direction. The first movable frame 202 includes movable-side spring hook portions 214 provided at three positions in the circumferential direction corresponding to the base-side spring hook portions 212. One end of each spring 210 is hooked on the base-side spring hook portion 212 and the other end is hooked on the movable-side spring hook portion 214, so that the springs 210 are attached between the first movable frame 202 and the first base frame 204. Since the springs 210 are attached, the first movable frame 202 is urged toward the first base frame 204. As a result, the first movable frame 202 is pressed to abut the rigid balls 206A to 206C and is movably held in a plane orthogonal to the optical axis.

A rolling prevention mechanism that prevents the first movable frame 202 from rolling is further provided between the first movable frame 202 and the first base frame 204. Rolling is rotation in a plane orthogonal to the optical axis. The rolling prevention mechanism is a mechanism that prevents the first movable frame 202 from rotating in a plane orthogonal to the optical axis.

The rolling prevention mechanism is mainly composed of a swinging block 216 which is a swinging member swingably supported by the first base frame 204, a guide shaft (second shaft) 218 provided at the swinging block 216, and a sliding portion 220 provided at the first movable frame 202.

Figure 25:
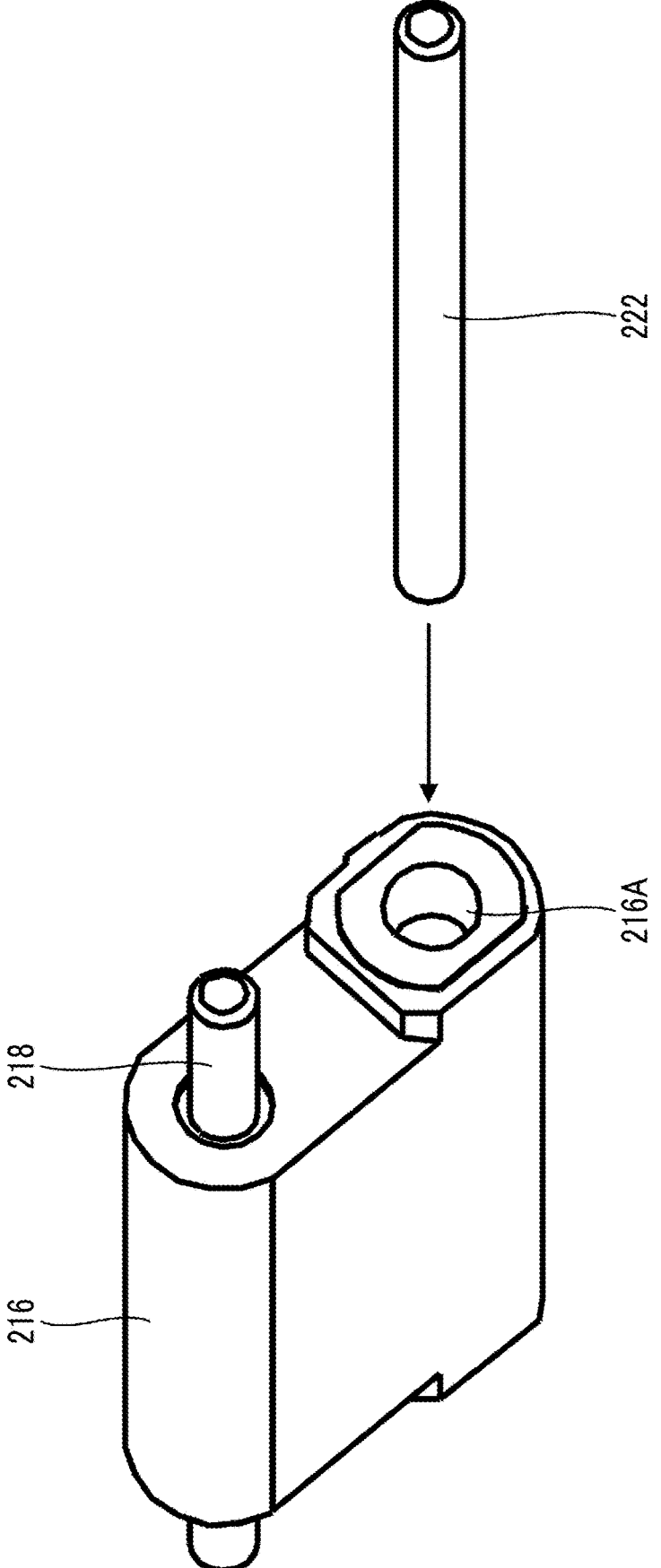
FIG. 25 is a perspective view showing a configuration of a swinging block.

FIG. 25 is a perspective view showing the configuration of the swinging block.

The swinging block 216 has a flat block-like shape and includes the guide shaft 218 provided at a distal end thereof.

The swinging block 216 includes a bearing hole (a first hole) 216A provided at a proximal end portion. A support shaft (a first shaft) 222 is inserted through the bearing hole 216A. The swinging block 216 is supported by the first base frame 204 to be swingable with the support shaft 222 as an axis.

The first base frame 204 includes a swinging block attachment portion 224. As shown in FIGS. 21 and 22, the swinging block attachment portion 224 includes a pair of shaft support portions (first shaft support portions) 224A. Each of the pair of shaft support portions 224A is configured as a plate-shaped protrusion portion and includes a shaft mounting hole (a second hole) 224B that is coaxial with the shaft support portion 224A. The support shaft 222 is inserted into the shaft mounting holes 224B and both end portions thereof are supported by the shaft support portions 224A. Accordingly, the support shaft 222 is attached to the swinging block attachment portion 224.

Note that, the support shaft 222 is inserted into the shaft mounting holes 224B of the shaft support portions 224A from an outer peripheral portion of the first base frame 204. Therefore, the outer peripheral portion of the first base frame 204 is provided with support shaft mounting opening portions 226 disposed at positions facing the shaft mounting holes 224B. The support shaft 222 is inserted into the shaft mounting holes 224B of the shaft support portions 224A through the support shaft mounting opening portions 226.

The support shaft 222 attached to the swinging block attachment portion 224 is disposed to be orthogonal to the optical axis Z. Therefore, the swinging block 216 is supported to be swingable around an axis orthogonal to the optical axis Z.

The guide shaft 218 has a round bar-like shape and is fixed and attached to a distal end portion of the swinging block 216. Both ends of the guide shaft 218 attached to the swinging block 216 are disposed to project from both ends of the swinging block 216. Further, the guide shaft 218 attached to the swinging block 216 is disposed to be parallel with the support shaft 222. Therefore, in a case where the swinging block 216 is attached to the first base frame 204, the swinging block 216 is disposed to be orthogonal to the optical axis Z.

As shown in FIGS. 23 and 24, the sliding portion 220 includes a pair of arm portions 220A. Each of the arm portions 220A includes a U-shaped guide groove portion 220B provided at a distal end thereof. The second lens group G2 is supported to be slidable along the guide shaft 218 with the guide groove portions 220B fitted to the guide shaft 218.

According to the rolling prevention mechanism configured as described above, the first movable frame 202 is supported to be slidable, via the sliding portion 220, with respect to the guide shaft 218 that is swingably supported via the swinging block 216, so that rotation of the first movable frame 202 is prevented. Accordingly, the first movable frame 202 is held to be movable in a plane orthogonal to the optical axis Z without rolling.

Meanwhile, as shown in FIG. 23, in the case of the rolling prevention mechanism of the present embodiment, each of the guide groove portions 220B of the sliding portion 220 has a shape that is open toward a front surface side (the object side) of the first movable frame 202. A direction in which the guide groove portions 220B are open is a direction in which the first movable frame 202 is separated from the first base frame 204 in the optical axis direction. Therefore, in a case where the guide shaft 218 is fitted to the guide groove portions 220B, the guide shaft 218 is positioned ahead of the guide groove portions 220B (on the object side) as shown in FIGS. 18 and 19. Since the guide shaft 218 is fitted in such a manner, the guide shaft 218 functions as a member that prevents the first movable frame 202 from falling off. That is, the guide shaft 218 has a function of restricting the first movable frame 202 from moving in a direction away from the first base frame 204 (in a case where the first movable frame 202 moves in the direction away from the first base frame 204, the guide groove portions 220B abut the guide shaft 218 so that movement in the direction away from the first base frame 204 is restricted).

As described above, the rolling prevention mechanism of the present embodiment not only prevents the first movable frame 202 from rolling, but also has a function of preventing the first movable frame 202 from falling off.

Note that, the OIS unit 200 of the present embodiment further includes a fall-off prevention pin 228, which is a restricting member, for the purpose of preventing the first movable frame 202 from falling off.

The fall-off prevention pin 228 is composed of a columnar pin. As shown in FIGS. 18 and 19, the fall-off prevention pin 228 is attached to an inner peripheral portion of the first base frame 204. On the inner peripheral portion of the first base frame 204, a pin attachment portion 230 is provided at a position at which the fall-off prevention pin 228 is attached. The pin attachment portion 230 is composed of a recess portion to which a proximal end portion of the fall-off prevention pin 228 is fitted. The fall-off prevention pin 228 is attached to the first base frame 204 with the proximal end portion fitted to the pin attachment portion 230 and screwed with a screw 232 from an outer peripheral side of the first base frame 204.

The fall-off prevention pin 228 attached to the first base frame 204 is disposed to project from the inner peripheral portion of the first base frame 204 in the inner diameter direction.

In addition, the fall-off prevention pin 228 attached to the first base frame 204 is disposed ahead of the first movable frame 202 mounted to the first base frame 204 (on the object side). Accordingly, forward movement of the first movable frame 202 is restricted by the fall-off prevention pin 228, so that the first movable frame 202 is prevented from falling off.

As described above, the OIS unit 200 according to the present embodiment includes two fall-off prevention mechanisms with respect to the first movable frame 202. The two fall-off prevention mechanisms (in other words, the rolling prevention mechanism and the fall-off prevention pin 228) are disposed at positions (so-called opposite angular positions) facing each other with the optical axis Z interposed therebetween (the swinging block 216 of the rolling prevention mechanism and the fall-off prevention pin 228 are disposed at positions facing each other with the optical axis Z interposed therebetween). Accordingly, it is possible to more effectively prevent the first movable frame 202 from falling off.

Drive Mechanism for First Movable Frame

The first movable frame 202 is driven by two actuators and is moved in a first direction (a v-direction) and a second direction (an h-direction) in a plane orthogonal to the optical axis Z. The first direction and the second direction are directions orthogonal to each other.

In the case of the OIS unit 200 of the present embodiment, two voice coil motors are used to move the first movable frame 202 in the first direction and the second direction. More specifically, the first movable frame 202 is moved in the first direction (v-direction) by a first voice coil motor 250V which is a first motor and the first movable frame 202 is moved in the second direction (h-direction) by a second voice coil motor 250H which is a second motor.

Figure 26:
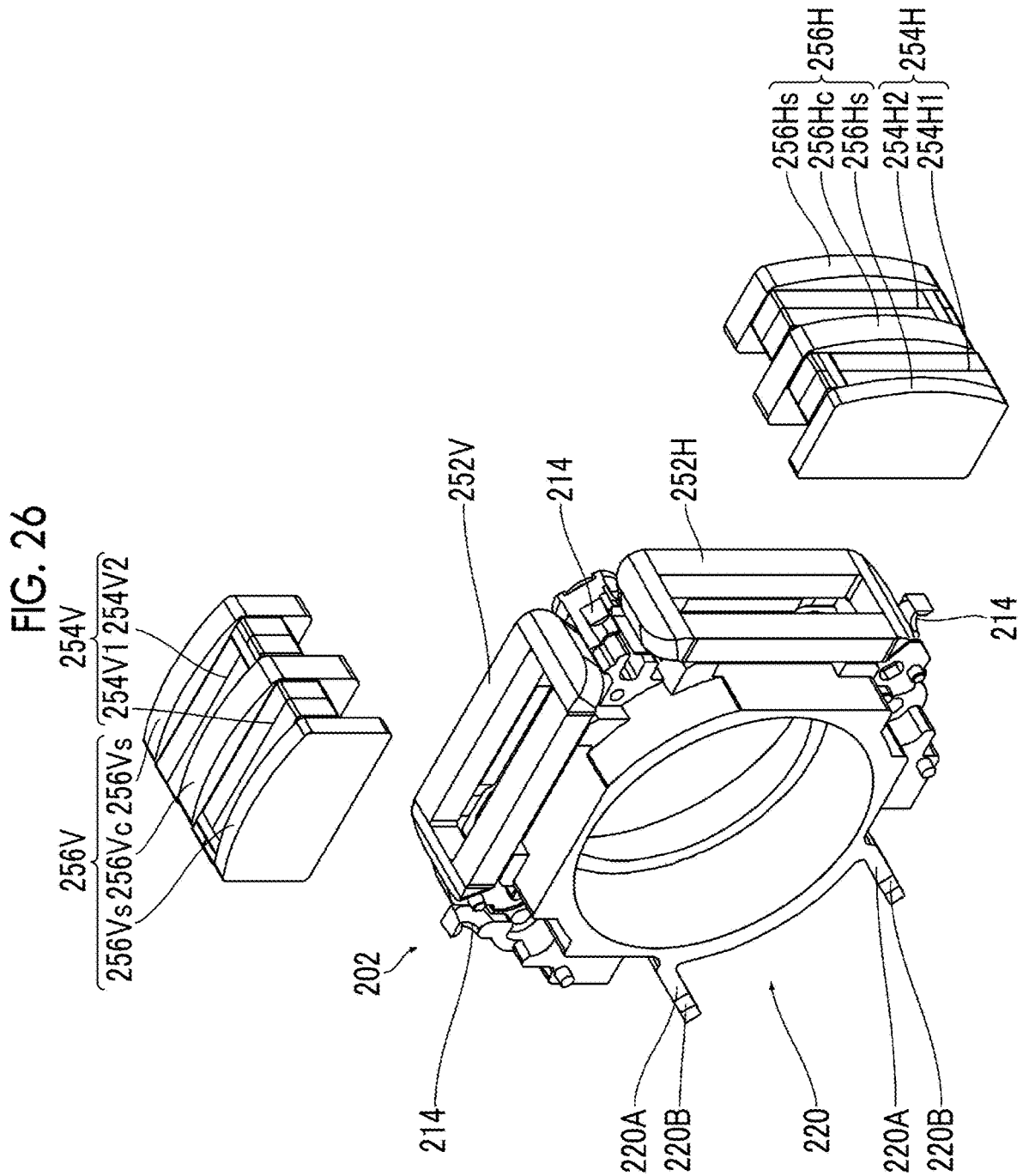
FIG. 26 is a perspective view showing schematic configurations of a first voice coil motor and a second voice coil motor.

FIG. 26 is a perspective view showing schematic configurations of the first voice coil motor and the second voice coil motor.

The first voice coil motor 250V and the second voice coil motor 250H are composed of coils 252V and 252H, magnets 254V and 254H, and yokes 256V and 256H, respectively.

In the case of the OIS unit 200 of the present embodiment, the coils 252V and 252H are provided on the first movable frame 202 on the movable side and the magnets 254V and 254H and the yokes 256V and 256H are attached to the first base frame 204 on a fixed side. That is, in the case of the OIS unit 200 of the present embodiment, the first voice coil motor 250V and the second voice coil motor 250H are composed of moving coil type voice coil motors.

As shown in FIGS. 23 and 24, the first movable frame 202 includes a first coil attachment portion 240V to which the coil 252V of the first voice coil motor 250V is attached and a second coil attachment portion 240H to which the coil 252H of the second voice coil motor 250H is attached.

Figure 27:
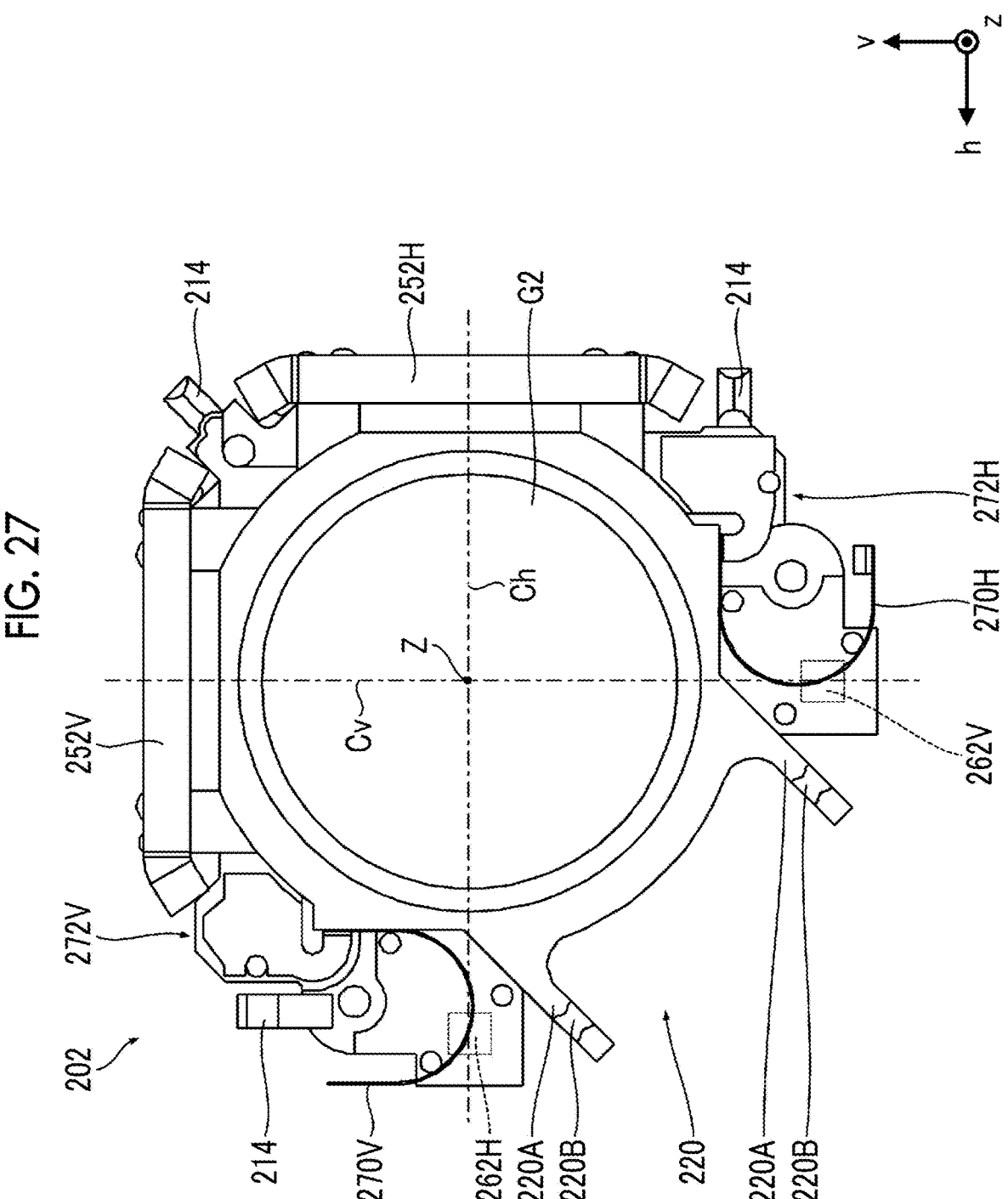
FIG. 27 is a front view of the first movable frame with coils attached thereto.

FIG. 27 is a front view of the first movable frame with the coils attached thereto.

As shown in the drawing, the coil 252V of the first voice coil motor 250V is disposed such that an axis Cv that passes through the center of an inner periphery (an air-core portion) of the coil 252V passes through the optical axis Z and is orthogonal to the optical axis Z. In addition, the coil 252H of the second voice coil motor 250H is disposed such that an axis Ch that passes through the center of an inner periphery (an air-core portion) of the coil 252H passes through the optical axis Z and is orthogonal to the optical axis Z. Since the coils 252V and 252H are disposed with respect to the first movable frame 202 such that the axes Cv and Ch of the coils 252V and 252H are orthogonal to the optical axis Z as described above, compactness in the radial direction can be realized.

As shown in FIG. 26, the magnet 254V and the yoke 256V of the first voice coil motor 250V are integrated with each other as one unit. The magnet 254V is composed of a first magnet 254V1 and a second magnet 254V2. Each of the first magnet 254V1 and the second magnet 254V2 has a block-like shape. The yoke 256V is composed of one center yoke (a first yoke) 256Vc and two side yokes (a second yoke and a third yoke) 256Vs. Each of the center yoke 256Vc and the side yokes 256Vs has a flat plate-like shape and is formed of a magnetic material (for example, iron). The first magnet 254V1 and the second magnet 254V2 are disposed to be respectively interposed between the center yoke 256Vc and the side yokes 256Vs. The same poles of the first magnet 254V1 and the second magnet 254V2 are disposed to face each other. In the present embodiment, the N poles are disposed to face each other (the N poles are disposed close to the center yoke 256Vc and the S poles are disposed close to the side yokes 256Vs. The magnet 254V and the yoke 256V integrated with each other form a shape with an E-shaped cross section. That is, the yoke 256V is disposed to project from the magnet 254V.

In the present embodiment, the shape of an outer peripheral portion of the yoke 256V is an arc shape. Here, the outer peripheral portion is a portion that is disposed on an outer peripheral side of the first base frame 204 in a case where the yoke 256V is attached to the first base frame 204. The shape of the outer peripheral portion of the yoke 256V is a shape along an outer periphery of the first base frame 204 (that is, an arc shape). Therefore, in a case where the yoke 256V is attached to the first base frame 204, the yoke 256V is disposed such that an edge surface of the outer peripheral portion of the yoke 256V is substantially flush with the outer periphery of the first base frame 204.

The magnet 254H and the yoke 256H of the second voice coil motor 250H also have the same configurations as described above. That is, the magnet 254H and the yoke 256H are integrated with each other as one unit. In addition, the magnet 254H is composed of a first magnet 254H1 and a second magnet 254H2 and the yoke 256H is composed of one center yoke (a first yoke) 256Hc and two side yokes (a second yoke and a third yoke) 256Hs.

As described above, the magnets 254V and 254H and the yokes 256V and 256H are attached to the first base frame 204. As shown in FIGS. 20 and 21, the first base frame 204 includes a first unit attachment portion 258V to which the unit composed of the magnet 254V and the yoke 256V of the first voice coil motor 250V is attached and a second unit attachment portion 258H to which the unit composed of the magnet 254H and the yoke 256H of the second voice coil motor 250H is attached. The first unit attachment portion 258V is disposed at a position facing the coil 252V of the first voice coil motor 250V mounted to the first movable frame 202 with respect to the first base frame 204 to which the first movable frame 202 is mounted. The second unit attachment portion 258H is disposed at a position facing the coil 252H of the second voice coil motor 250H mounted to the first movable frame 202 with respect to the first base frame 204 to which the first movable frame 202 is mounted. The first unit attachment portion 258V and the second unit attachment portion 258H are configured as openings into which the units composed of the magnets 254V and 254H and the yokes 256V and 256H are fitted, respectively.

In a case where the unit composed of the magnet 254V and the yoke 256V is attached to the first unit attachment portion 258V after the first movable frame 202 is mounted to the first base frame 204, the center yoke 256Vc is disposed to be accommodated in a state where the center yoke 256Vc does not come into contact with an inner peripheral portion of the coil 252V. In addition, a pair of the side yokes 256Vs is disposed such that an outer periphery of the coil 252V is interposed therebetween in a state where the outer periphery does not come into contact with the side yokes 256Vs. Accordingly, in a case where a voltage is applied to the coil 252V, the first movable frame 202 moves in the first direction (the v-direction) in a plane orthogonal to the optical axis Z.

In addition, in a case where the unit composed of the magnet 254H and the yoke 256H is attached to the second unit attachment portion 258H after the first movable frame 202 is mounted to the first base frame 204, a center yoke 256Hc is disposed to be accommodated in a state where the center yoke 256Hc does not come into contact with an inner peripheral portion of the coil 252H. In addition, a pair of the side yokes 256Hs is disposed such that an outer periphery of the coil 252H is interposed therebetween in a state where the outer periphery does not come into contact with the side yokes 256Hs. Accordingly, in a case where a voltage is applied to the coil 252H, the first movable frame 202 moves in the second direction (the h-direction) in a plane orthogonal to the optical axis Z.

The drive mechanism of the first movable frame 202 is configured as described above. The first movable frame 202 moves in the first direction (the v-direction) in a plane orthogonal to the optical axis Z in a case where the first voice coil motor 250V is driven. In addition, the first movable frame 202 moves in the second direction (the h-direction) in a plane orthogonal to the optical axis Z in a case where the second voice coil motor 250H is driven.

Meanwhile, in the case of the drive mechanism of the present embodiment, the coils 252V and 252H of the voice coil motors are disposed such that the axes Cv and Ch are orthogonal to the optical axis Z, so that compactness in the radial direction is realized.

However, in a case where the coils 252V and 252H are disposed in such a manner, the yokes 256V and 256H are disposed to collide with the coils 252V and 252H in a case where the first movable frame 202 falls off. Particularly, the center yokes 256Vc and 256Hc disposed on inner peripheral portions of the yokes 256V and 256H are disposed to collide with the inner peripheral portions of the coils 252V and 252H.

However, in the case of the OIS unit 200 of the present embodiment, as described above, the fall-off prevention mechanisms are provided with respect to the first movable frame 202. Therefore, there is no probability that the first movable frame 202 falls off and the OIS unit 200 can be used safely. Particularly, in the case of the OIS unit 200 of the present embodiment, the rolling prevention mechanism also serves as the fall-off prevention mechanism. Therefore, it is possible to prevent the first movable frame 202 from falling off without increasing the number of components.

Position Detection Mechanism of First Movable Frame

The position of the first movable frame 202 in the first direction (the v-direction) and the position of the first movable frame 202 in the second direction (the h-direction) are detected based on a point at which the second lens group G2 is positioned on the optical axis Z. The position in the first direction is detected by a first position detection sensor 260V. The position in the second direction is detected by a second position detection sensor 260H. In the OIS unit 200 of the present embodiment, both the first position detection sensor 260V and the second position detection sensor 260H are composed of hall sensors (hall elements). The hall sensor is a magnetic sensor and detects the position of an object in combination with a position detection magnet. In the OIS unit 200 of the present embodiment, the first base frame 204 includes the first position detection sensor 260V and the second position detection sensor 260H composed of the hall sensors and the first movable frame 202 includes position detection magnets 262V and 262H. Note that, the position detection magnet 262V for the first position detection sensor 260V will be referred to as the first position detection magnet 262V, and the position detection magnet 262H for the second position detection sensor 260H will be referred to as the second position detection magnet 262H so that the position detection magnets are distinguished from each other.

As shown in FIG. 22, the first base frame 204 includes a first position detection sensor attachment portion 264V provided at a position at which the first position detection sensor 260V is installed and a second position detection sensor attachment portion 264H provided at a position at which the second position detection sensor 260H is installed. The first position detection sensor attachment portion 264V is composed of a rectangular opening portion and the first position detection sensor 260V is positioned and attached with the first position detection sensor 260V fitted to the opening portion. Similarly, the second position detection sensor attachment portion 264H is composed of a rectangular opening portion and the second position detection sensor 260H is positioned and attached with the second position detection sensor 260H fitted to the opening portion.

The first position detection sensor 260V is disposed on a v-axis by being attached to the first position detection sensor attachment portion 264V. The v-axis is an axis that passes through the optical axis Z and is parallel to the first direction (the v-direction). In addition, the first position detection sensor 260V is attached to the first position detection sensor attachment portion 264V, so that the first position detection sensor 260V is disposed at a position facing the first voice coil motor 250V with the optical axis Z interposed therebetween.

The second position detection sensor 260H is disposed on an h-axis by being attached to the second position detection sensor attachment portion 264H. The h-axis is an axis that passes through the optical axis Z and is parallel to the second direction (the h-direction). In addition, the second position detection sensor 260H is attached to the second position detection sensor attachment portion 264H, so that the second position detection sensor 260H is disposed at a position facing the second voice coil motor 250H with the optical axis Z interposed therebetween.

As shown in FIG. 24, each of the first position detection magnet 262V and the second position detection magnet 262H is attached to the first movable frame 202. The positions of attachment are positions facing the first position detection sensor 260V and the second position detection sensor 260H with certain gaps provided therebetween in a case where the first movable frame 202 is mounted to the first base frame 204. More specifically, the first position detection magnet 262V is disposed at a position that coincides with (including a range of positions substantially coinciding with) the center of the first position detection sensor 260V in a case where the second lens group G2 is positioned on the optical axis Z. In addition, the second position detection magnet 262H is disposed at a position that coincides with the center of the second position detection sensor 260H in a case where the second lens group G2 is positioned on the optical axis Z.

According to the above-described configuration, in a case where the first movable frame 202 moves in the first direction (the v-direction), the position thereof (the position thereof in the first direction with respect to the optical axis Z) is detected by the first position detection sensor 260V. In addition, in a case where the first movable frame 202 moves in the second direction (the h-direction), the position thereof (the position thereof in the second direction with respect to the optical axis Z) is detected by the second position detection sensor 260H.

Disposition of Rigid Ball Holding Portions

As described above, in the OIS unit 200 of the present embodiment, the first movable frame 202 is movably held by the first base frame 204 via the three rigid balls 206A to 206C. The three rigid balls 206A to 206C are held by the three rigid ball holding portions 208A to 208C that the first base frame 204 includes. In the related art, the rigid ball holding portions 208A to 208C are disposed on the same cross section orthogonal to the optical axis Z. That is, in the related art, the rigid ball holding portions 208A to 208C are disposed at positions that are separated from an edge surface of the first base frame 204 by the same distance in the optical axis direction.

Meanwhile, in the case of the OIS unit 200 of the present embodiment, the three rigid ball holding portions 208A to 208C are disposed at different positions for realization of compactness. Specifically, as shown in FIG. 21, two of the three rigid ball holding portions 208A to 208C are disposed at the same cross-sectional position (the position of a cross section orthogonal to the optical axis Z), and the remaining one of the three rigid ball holding portions 208A to 208C is disposed at a different cross-sectional position.

Hereinafter, the rigid ball holding portion 208A will be referred to as the first rigid ball holding portion 208A, the rigid ball holding portion 208B will be referred to as the second rigid ball holding portion 208B, and the rigid ball holding portion 208C will be referred to as the third rigid ball holding portion 208C so that the three rigid ball holding portions 208A to 208C are distinguished from each other, and the disposition thereof will be described.

As shown in FIG. 22, the first rigid ball holding portion 208A is a rigid ball holding portion disposed close to the first position detection sensor attachment portion 264V. In addition, the second rigid ball holding portion 208B is a rigid ball holding portion that is disposed close to the second position detection sensor attachment portion 264H.

Here, in a case where the rigid ball holding portions and the position detection sensor attachment portions are disposed close to each other, there is a problem as follows. That is, there is a problem that the rigid ball abutment portions provided on the first movable frame 202 side come into contact with the position detection sensor attachment portions in a case where the first movable frame 202 is driven. In order to avoid such a problem, it is necessary to secure a sufficient distance between the rigid ball holding portions and the position detection sensor attachment portions. However, in a case where a sufficient distance is secured between the rigid ball holding portions and the position detection sensor attachment portions, there is a problem that the size of the unit is made large.

Therefore, in the case of the OIS unit 200 of the present embodiment, the rigid ball holding portions that are disposed close to the position detection sensor attachment portions are disposed at the same cross-sectional positions as the position detection sensor attachment portions. That is, as shown in FIG. 22, the first rigid ball holding portion 208A and the second rigid ball holding portion 208B are disposed at the same cross-sectional positions as the first position detection sensor attachment portion 264V and the second position detection sensor attachment portion 264H. Even in a case where the position detection sensor attachment portions and the rigid ball holding portions are disposed close to each other, it is possible to prevent the rigid ball abutment portions from coming into contact with the position detection sensor attachment portions.

On the other hand, the third rigid ball holding portion 208C is disposed between the first voice coil motor 250V and the second voice coil motor 250H in a cross section orthogonal to the optical axis Z. In order to dispose the third rigid ball holding portion 208C at the same cross-sectional position as the first rigid ball holding portion 208A and the second rigid ball holding portion 208B, it is necessary to shift the positions of the first voice coil motor 250V and the second voice coil motor 250H in the optical axis direction. However, in a case where the positions of the first voice coil motor 250V and the second voice coil motor 250H are shifted in the optical axis direction, there is a problem that size of the unit is made large in the optical axis direction.

Therefore, the third rigid ball holding portion 208C is disposed at a cross-sectional position different from those of the first rigid ball holding portion 208A and the second rigid ball holding portion 208B.

Figure 28:
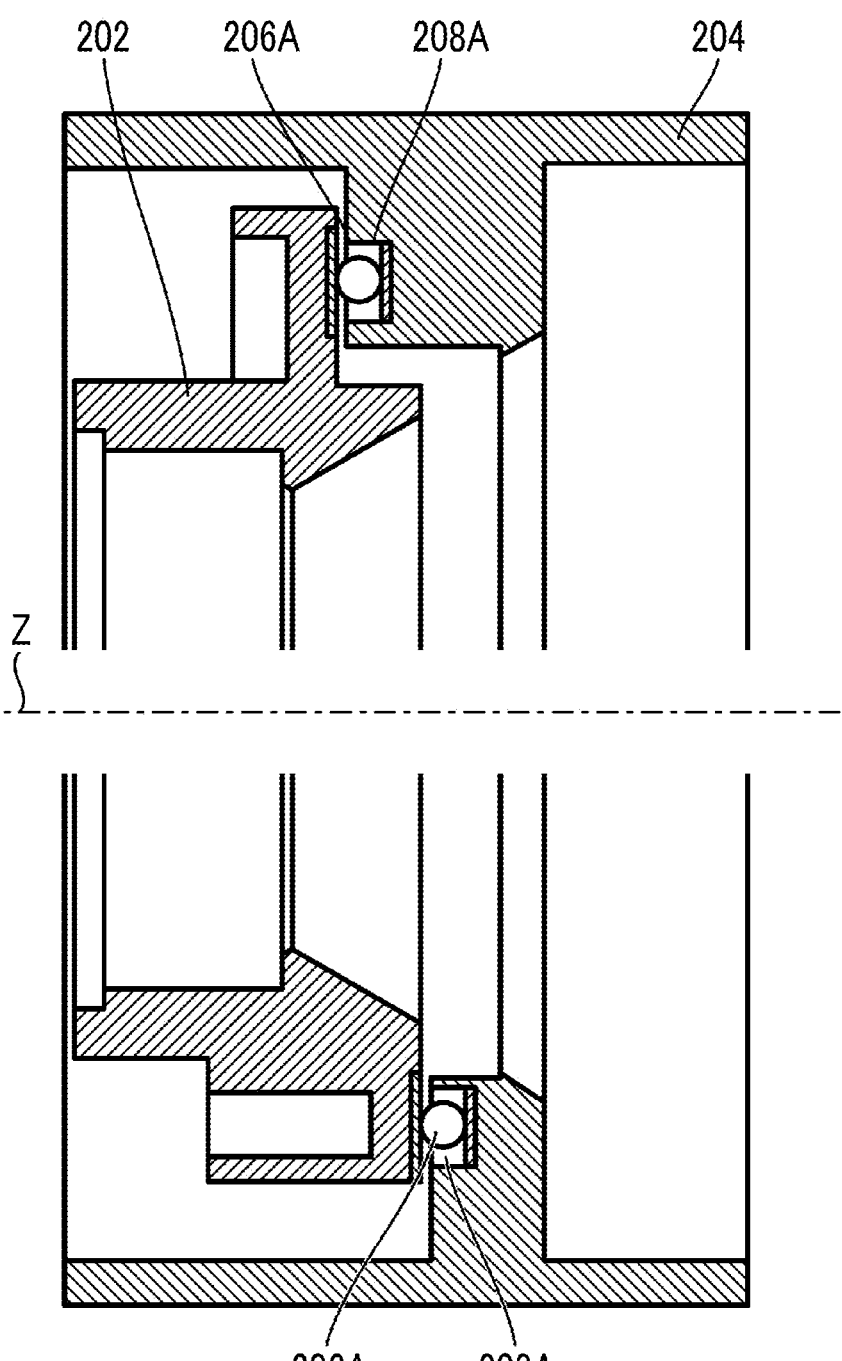
FIG. 28 is an explanatory view of a relationship between disposition of a first rigid ball holding portion and disposition of a third rigid ball holding portion.

FIG. 28 is an explanatory view of a relationship between the disposition of the first rigid ball holding portion and the disposition of the third rigid ball holding portion. In the drawing, the upper part shows a cross section showing the installation position of the first rigid ball holding portion 208A, and the lower part shows a cross section showing the installation position of the third rigid ball holding portion 208C.

As shown in the figure, the first rigid ball holding portion 208A is disposed on the object side which is ahead of the third rigid ball holding portion 208C. Such a position is the same as the cross-sectional position of the first position detection sensor attachment portion 264V. In addition, the second rigid ball holding portion 208B is disposed at the same cross-sectional position as the first rigid ball holding portion 208A.

As described above, in the case of the OIS unit 200 of the present embodiment, the disposition of the three rigid ball holding portions 208A to 208C in the optical axis direction is adjusted so that compactness of the unit is realized.

Note that, in the present embodiment, a configuration in which the first position detection sensor attachment portion 264V and the second position detection sensor attachment portion 264H are disposed at the same cross-sectional position. However, a configuration in which the first position detection sensor attachment portion 264V and the second position detection sensor attachment portion 264H are disposed at different cross-sectional positions may also be adopted. In this case, the rigid ball holding portions that are disposed close to the respective position detection sensor attachment portions are disposed such that a rigid ball holding portion is disposed at the same cross-sectional position as a position detection sensor attachment portion corresponding thereto. Note that, the meaning of the same cross-sectional positions includes a range of cross-sectional positions acceptable as substantially the same cross-sectional positions.

Disposition of Flexible Printed Circuit

As described above, in the OIS unit 200 of the present embodiment, the first movable frame 202 is driven by the moving coil type voice coil motors. In this case, supply of power to the coils is performed by means of flexible printed circuits (FPCs). The flexible printed circuits are disposed while being bent such that the driving of the first movable frame 202 is not influenced.

In the case of the OIS unit 200 in the related art, power is supplied to the two voice coil motors by means of a common flexible printed circuit.

However, in the case of a configuration in which power is supplied to the two voice coil motors by means of the common flexible printed circuit, there is a problem that the degree of freedom in designing other constituent elements is lowered, which results in an increase in size of the unit.

Therefore, in the case of the OIS unit 200 of the present embodiment, power is supplied to the two voice coil motors by means of different flexible printed circuits. That is, the flexible printed circuits are separately disposed with respect to the two voice coil motors.

Specifically, as shown in FIG. 27, supply of power to the coil 252V of the first voice coil motor 250V is performed by means of a first flexible printed circuit 270V. Meanwhile, supply of power to the coil 252H of the second voice coil motor 250H is performed by means of a second flexible printed circuit 270H different from the first flexible printed circuit 270V.

Figure 29:
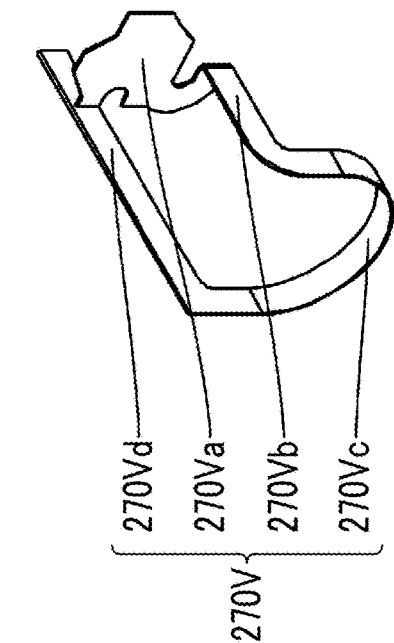
FIG. 29 is a perspective view showing configurations of a first flexible printed circuit and a second flexible printed circuit.
Figure 30:
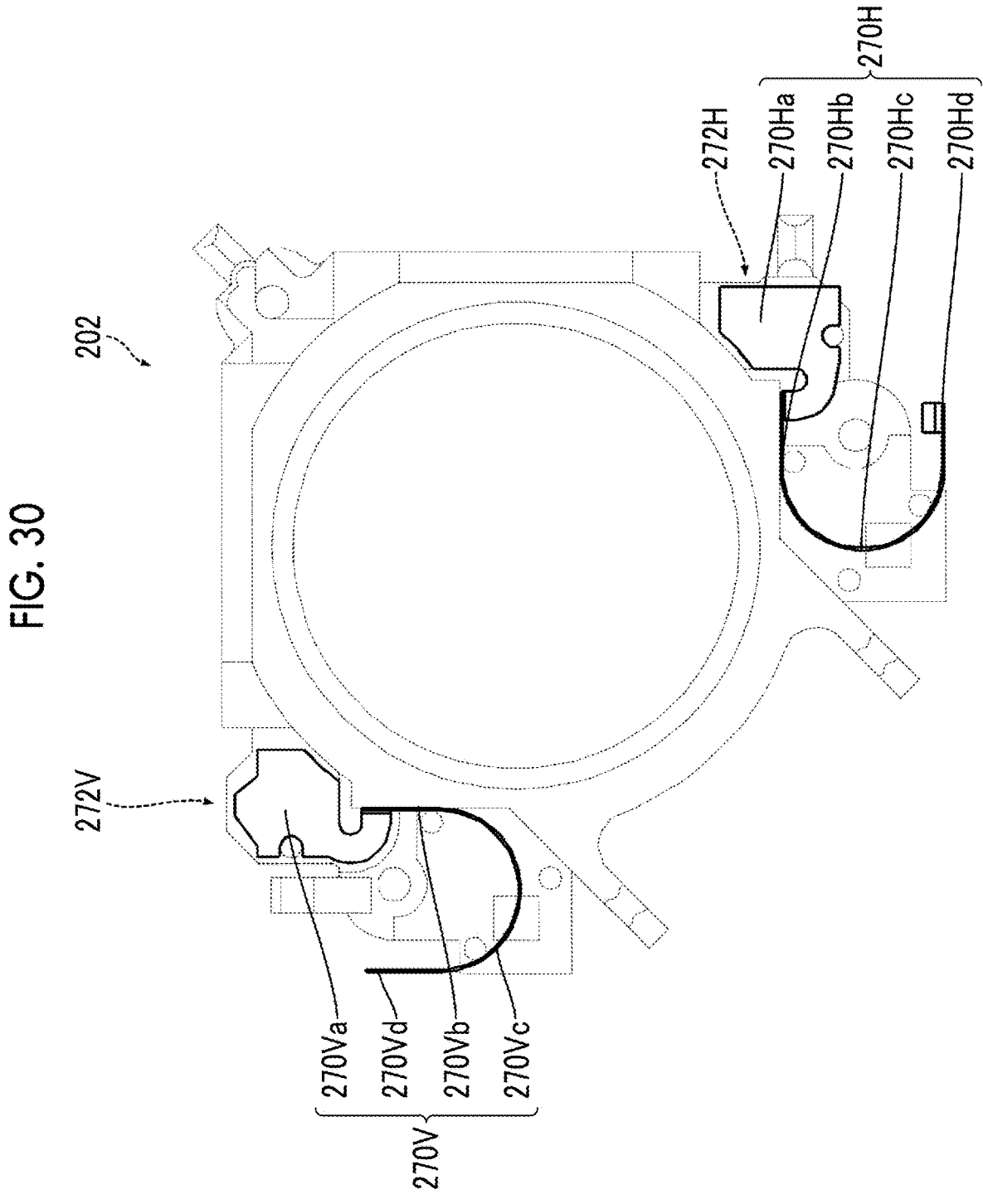
FIG. 30 is a front view showing the configurations of the first flexible printed circuit and the second flexible printed circuit.

FIG. 29 is a perspective view showing the configurations of the first flexible printed circuit and the second flexible printed circuit. In addition, FIG. 30 is a front view showing the configurations of the first flexible printed circuit and the second flexible printed circuit.

As shown in FIG. 29, the first flexible printed circuit 270V includes a fixed portion 270Va, a first linear portion 270Vb that extends forward (to the object side) along the optical axis direction from the fixed portion 270Va, an arc-shaped bent portion 270Vc that extends in a direction orthogonal to the optical axis from a distal end of the first linear portion 270Vb, and a second linear portion 270Vd that extends rearward (to the object side) along the optical axis from a distal end of the bent portion 270Vc.

Similarly, the second flexible printed circuit 270H includes a fixed portion 270Ha, a first linear portion 270Hb that extends forward (to the object side) along the optical axis direction from the fixed portion 270Ha, an arc-shaped bent portion 270Hc that extends in a direction orthogonal to the optical axis from a distal end of the first linear portion 270Hb, and a second linear portion 270Hd that extends rearward (to the object side) along the optical axis from a distal end of the bent portion 270Hc.

The fixed portions 270Va and 270Ha are portions that are fixed and attached to the first movable frame 202. As shown in FIG. 30, the first movable frame 202 includes a first flexible printed circuit attachment portion 272V for attachment of the fixed portion 270Va of the first flexible printed circuit 270V and a second flexible printed circuit attachment portion 272H for attachment of the fixed portion 270Ha of the second flexible printed circuit 270H. The first flexible printed circuit attachment portion 272V is provided in the vicinity of the installation position of the coil 252V of the first voice coil motor 250V. The second flexible printed circuit attachment portion 272H is disposed in the vicinity of the installation position of the coil 252H of the second voice coil motor 250H.

The bent portion 270Vc of the first flexible printed circuit 270V attached to the first movable frame 202 is disposed at a position (a so-called opposite angular position) facing the coil 252H of the second voice coil motor 250H with the optical axis Z interposed therebetween. Meanwhile, the bent portion 270Hc of the second flexible printed circuit 270H is disposed at a position (a so-called opposite angular position) facing the coil 252V of the first voice coil motor 250V with the optical axis Z interposed therebetween.

In addition, the respective bent portions 270Vc and 270Hc of the first flexible printed circuit 270V and the second flexible printed circuit 270H attached to the first movable frame 202 are disposed while being bent in directions orthogonal to the optical axis Z. Accordingly, the movement of the first movable frame 202 can be absorbed.

As described above, in the case of the OIS unit 200 of the present embodiment, power is supplied to the two voice coil motors by means of different flexible printed circuits. Accordingly, a degree of freedom in designing the unit can be ensured, and thus compactness of the unit can be realized.

Note that, although the bent portions 270Vc and 270Hc are bent in the directions orthogonal to the optical axis Z in the present embodiment, a configuration in which the bent portions 270Vc and 270Hc are bent in the optical axis direction may also be adopted. In this case as well, the same effect can be achieved.

Assembly of OIS Unit

The OIS unit 200 according to the present embodiment is assembled through a procedure as follows.

First, the fifth lens group G5, the coil 252V of the first voice coil motor 250V, the coil 252H of the second voice coil motor 250H, the first flexible printed circuit 270V, and the second flexible printed circuit 270H are mounted to the first movable frame 202. The coil 252V of the first voice coil motor 250V is electrically connected to the first flexible printed circuit 270V via the fixed portion 270Va of the first flexible printed circuit 270V since the first flexible printed circuit 270V is mounted to the first movable frame 202. In addition, the coil 252H of the second voice coil motor 250H is electrically connected to the second flexible printed circuit 270H via the fixed portion 270Va of the second flexible printed circuit 270H since the second flexible printed circuit 270H is mounted to the first movable frame 202.

Next, the first movable frame 202 to which a lens or the like is attached is mounted to the first base frame 204. In the assembly of the first movable frame 202, first, the rigid balls 206A to 206C are attached to the three rigid ball holding portions 208A to 208C. Next, the first movable frame 202 is mounted to the first base frame 204 such that the rigid balls 206A to 206C are interposed therebetween. Next, the springs 210 are mounted between the first movable frame 202 and the first base frame 204 and the first movable frame 202 and the first base frame 204 are integrated with each other. Accordingly, the first movable frame 202 is held to be movable with respect to the first movable frame 202.

Next, the swinging block 216 is attached to the first base frame 204. The swinging block 216 is attached to the swinging block attachment portion 224 that the first base frame 204 includes. The attachment is performed from the front surface side (the object side) of the first base frame 204. In this case, the guide shaft 218 provided at the distal end of the swinging block 216 is fitted to the guide groove portions 220B of the sliding portion 220 that the first movable frame 202 includes. Thereafter, the support shaft 222 is inserted through the bearing hole (the second hole) 216A provided at the proximal end portion of the swinging block 216 and the shaft mounting holes 224B provided at the pair of shaft support portions 224A of the swinging block attachment portion 224 so that the swinging block 216 is integrated with the first base frame 204. Thereby, the swinging block 216 is supported to be swingable with the support shaft 222 as an axis. The support shaft 222 is mounted through the support shaft mounting opening portions 226 provided at the outer peripheral portion of the first base frame 204.

Since the swinging block 216 is attached, the first base frame 204 is restricted from rolling. In addition, the first base frame 204 is also prevented from falling off. That is, the guide shaft 218 restricts movement in the optical axis direction to prevent the first base frame 204 from falling off.

Next, the fall-off prevention pin 228 is attached to the first base frame 204. The fall-off prevention pin 228 is positioned at a predetermined position with the proximal end portion thereof fitted to the pin attachment portion 230 provided at the first base frame 204. The positioned fall-off prevention pin 228 is screwed with the screw 232 from the outer peripheral side of the first base frame 204 so that the fall-off prevention pin 228 is fixed. The fall-off prevention pin 228 attached to the first base frame 204 is disposed ahead of the first base frame 204 (on the object side) and restricts the forward movement of the first movable frame 202 in the optical axis direction to prevent the first base frame 204 from falling off.

Next, the units composed of the magnets 254V and 254H and the yokes 256V and 256H of the first voice coil motor 250V and the second voice coil motor 250H are attached to the first base frame 204. The unit composed of the magnet 254V and the yoke 256V of the first voice coil motor 250V is attached to the first unit attachment portion 258V of the first base frame 204. In addition, the unit composed of the magnet 254H and the yoke 256H of the second voice coil motor 250H is attached to the second unit attachment portion 258H of the first base frame 204.

Since the unit composed of the magnet 254V and the yoke 256V of the first voice coil motor 250V is attached to the first unit attachment portion 258V, the center yoke 256Vc is disposed to be accommodated in the inner peripheral portion of the coil 252V on the first movable frame 202 side. In addition, the pair of side yokes 256Vs is disposed such that the outer periphery of the coil 252V is interposed therebetween. In addition, since the unit composed of the magnet 254H and the yoke 256H of the second voice coil motor 250H is attached to the second unit attachment portion 258H, the center yoke 256Hc is disposed to be accommodated in the inner peripheral portion (the air-core portion) of the coil 252H on the first movable frame 202 side. In addition, the pair of the side yokes 256Hs is disposed such that the outer periphery of the coil 252H is interposed.

As a result, the assembly of the OIS unit 200 is finished.

Modification Example of OIS Unit

Modification Example of Voice Coil Motor

In the above-described embodiment, the voice coil motors are disposed in postures in which the axes of the coils are orthogonal to the optical axis. However, the voice coil motors may be disposed in postures in which the axes of the coils are parallel to the optical axis. However, for realization of compactness (particularly, compactness in the radial direction) of the unit, it is preferable that the voice coil motors are disposed in postures in which the axes of the coils are orthogonal to the optical axis as in the case of the OIS unit 200 in the above-described embodiment.

Modification Example of Unit Composed of Yoke and Magnet

Figure 31:
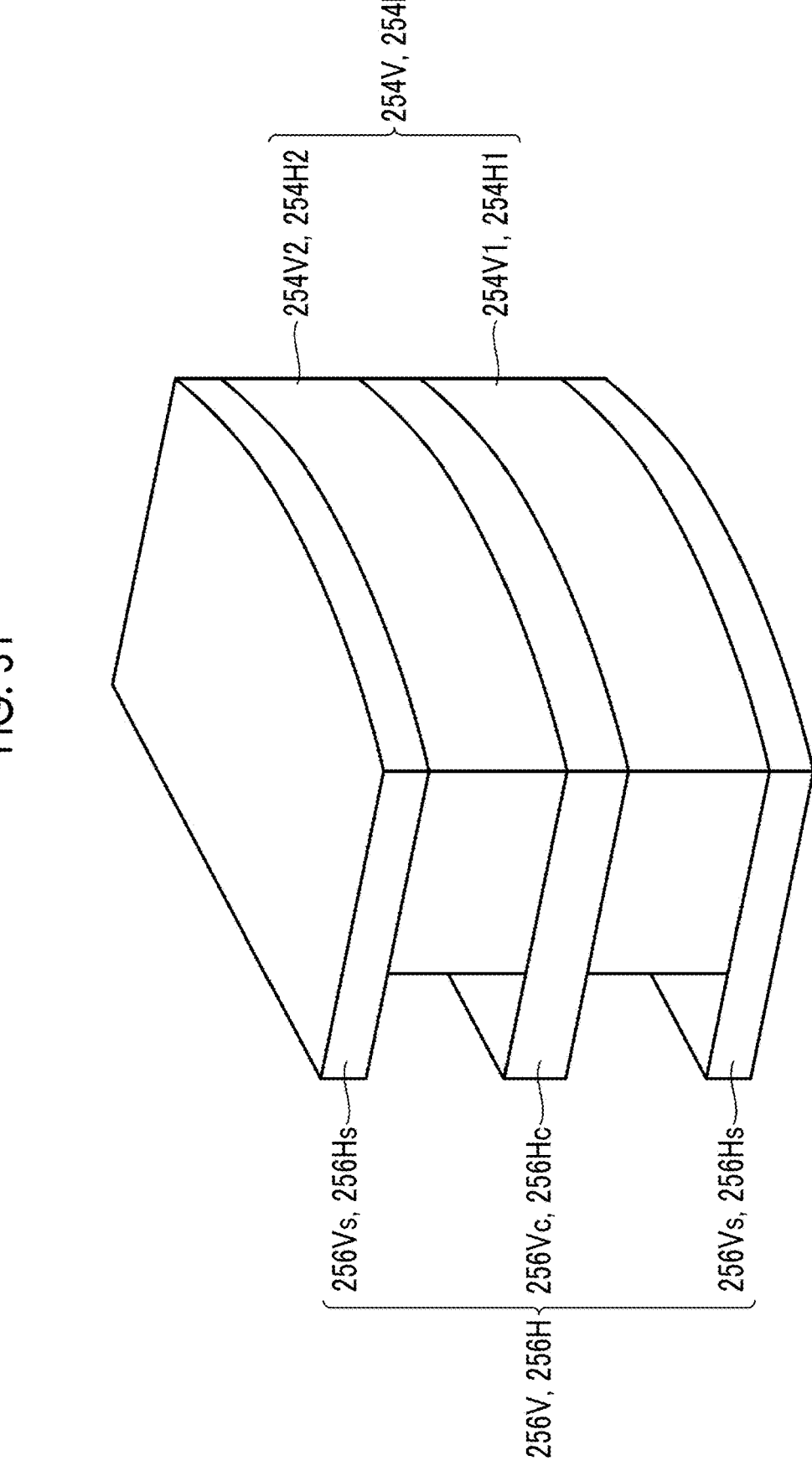
FIG. 31 is a perspective view of a modification example of a unit composed of a magnet and a yoke.

FIG. 31 is a perspective view of a modification example of the unit composed of the magnet and the yoke.

In the case of the OIS unit 200 according to the embodiment described above, the shapes of the outer peripheral portions (portions that are positioned on an outer peripheral side in the case of attachment to the first base frame 204) of the yokes 256V and 256H are arc shapes along the shape of the outer periphery of the first base frame 204.

As shown in FIG. 31, it is preferable that the outer peripheral portions of the magnets 254V and 254H also have arc shapes. That is, it is preferable that portions that are positioned on the outer peripheral side in the case of attachment to the first base frame 204 have arc shapes along the shape of the outer periphery of the first base frame 204. Accordingly, thrust can be increased without a change in unit size.

Figure 32:
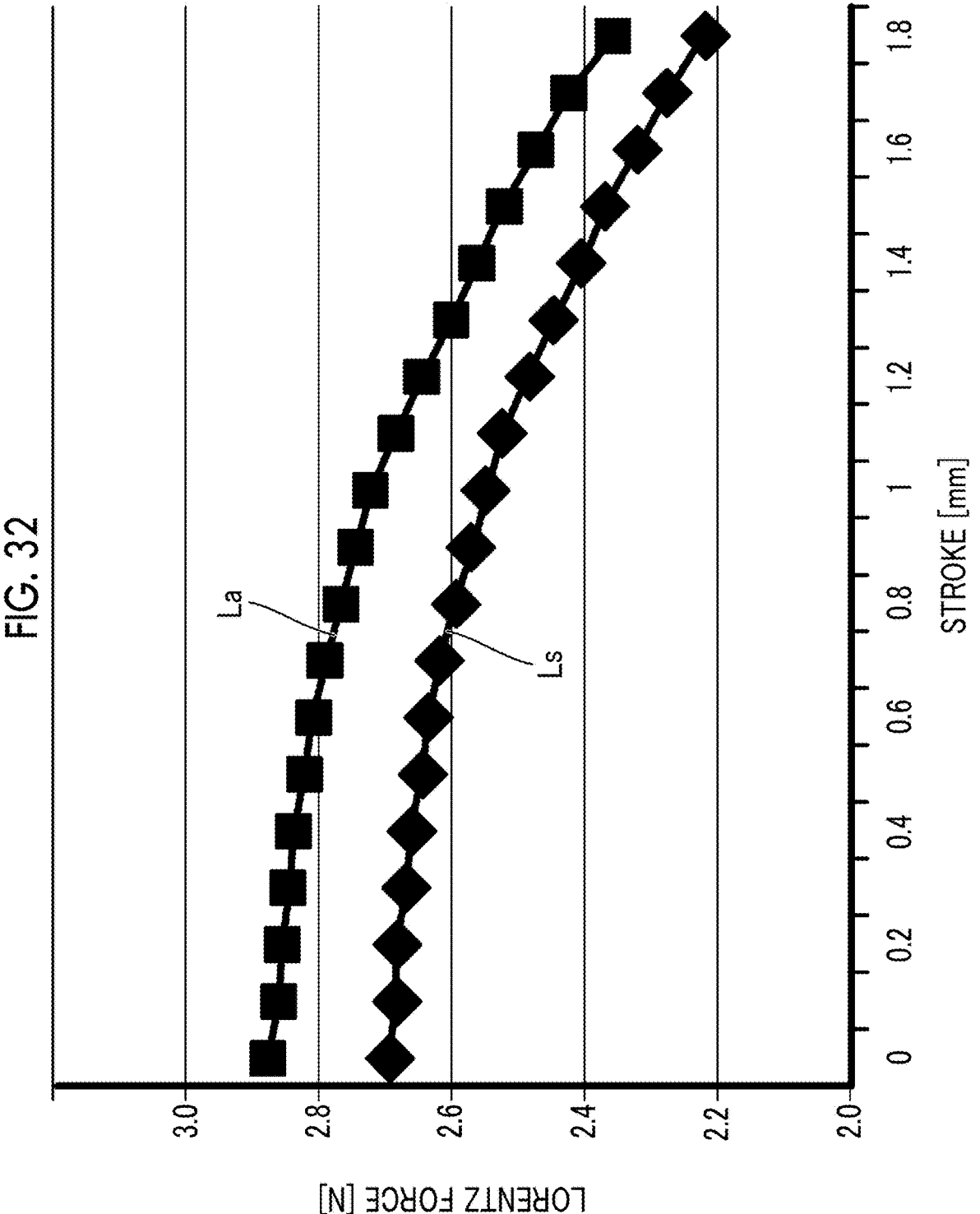
FIG. 32 is a graph about comparison between a Lorentz force generated in a case where the shapes of outer peripheral portions of magnets are linear shapes and a Lorentz force generated in a case where the shapes of the outer peripheral portions of the magnets are arc shapes.

FIG. 32 is a graph about comparison between a Lorentz force generated in a case where the shapes of the outer peripheral portions of the magnets are linear shapes and a Lorentz force generated in a case where the shapes of the outer peripheral portions of the magnets are arc shapes. In the drawing, the horizontal axis represents a stroke and the vertical axis represents a Lorentz force.

The reference numeral "Ls" represents a graph about a Lorentz force generated in a case where the shapes of the outer peripheral portions of the magnets are linear shapes. The reference numeral "La" represents a graph about a Lorentz force generated in a case where the shapes of the outer peripheral portions of the magnets are arc shapes.

As shown in the drawing, by forming the outer peripheral portions of the magnets in arc shapes, it is possible to increase thrust in comparison with a case where the outer peripheral portions have linear shapes.

Since the outer peripheral portions of the magnets are formed in arc shapes, edge surfaces of the outer peripheral portions of the magnets are disposed to be substantially flush with the outer periphery of the first base frame 204 in a case where the magnets are attached to the first base frame 204.

Other Embodiments

Application to Other Optical Devices

In the above-described embodiment, a case where the present invention is applied to a lens barrel of an interchangeable lens of an interchangeable lens camera has been described as an example. However, the application of the present invention is not limited thereto. The present invention can also be applied to a lens barrel of an integrated-lens camera. Examples of the camera include various cameras such as a silver halide camera, a video camera, a cine-camera, a TV camera, and a surveillance camera in addition to a digital camera. In addition, the camera is not limited to a camera configured as a single camera and examples thereof also include a camera incorporated into another device such as a smartphone or a personal computer. The present invention can also be applied to a lens barrel of an optical device such as a microscope or a telescope instead of the camera.

Application to Image Sensor Shifting Type Camera Shake-Correction Mechanism The technology related to the OIS unit can also be applied to an image sensor shifting type camera shake-correction mechanism. The image sensor shifting type camera shake-correction mechanism is a mechanism in which an image sensor (an imaging element) is moved in accordance with a camera shake so that camera shake correction is performed.

APPENDIX

Furthermore, appendixes as follows will be disclosed in relation to the above-described embodiment.

Appendix 1

A camera shake-correction device including:
a movable member that holds a camera shake-correction lens or an image sensor;
a base member that supports the movable member such that the movable member is movable in a plane orthogonal to an optical axis;
a plurality of rolling bodies that are provided between the movable member and the base member;
an urging member that urges the base member toward the movable member;
a first motor that drives the movable member in a first direction in the plane orthogonal to the optical axis;
a second motor that drives the movable member in a second direction orthogonal to the first direction in the plane orthogonal to the optical axis;

a first shaft that is provided at the movable member and that is disposed to be orthogonal to the optical axis;
a swinging member of which a proximal end portion is swingably supported by the first shaft;
a second shaft that is provided at a distal end portion of the swinging member and that is disposed to be parallel with the first shaft;
a sliding portion that is provided at the movable member and that slides along the second shaft; and
a restricting member that is provided at the base member and that restricts movement of the movable member in a direction away from the base member;
in which the sliding portion includes a groove portion that is open in a direction in which the movable member is separated from the base member, and
the second shaft is fitted to the groove portion and is slidably supported.

Appendix 2

The camera shake-correction device described in Appendix 1,
in which the first motor and the second motor are composed voice coil motors including coils, magnets, and yokes,
the coils are provided at the movable member, and
the magnets and the yokes are provided at the base member.

Appendix 3

The camera shake-correction device described in Appendix 2,
in which the coil is disposed such that an axis of the coil is orthogonal to the optical axis.

Appendix 4

The camera shake-correction device described in Appendix 3,
in which a portion of the yoke is disposed inside the coil.

Appendix 5

The camera shake-correction device described in Appendix 4,
in which the magnet is composed of a first magnet and a second magnet of which the same poles are disposed to face each other,
the yoke is composed of a first yoke, a second yoke, and a third yoke,
the first magnet is disposed between the first yoke and the second yoke,
the second magnet is disposed between the second yoke and the third yoke, and
the second yoke is disposed inside the coil.

Appendix 6

The camera shake-correction device described in any one of Appendixes 3 to 5,
in which shapes of outer peripheries of the magnet and the yoke in the plane orthogonal to the optical axis are arc shapes along a circle around the optical axis.

Appendix 7

The camera shake-correction device described in any one of Appendixes 2 to 6, further including:

a first flexible printed circuit connected to the coil of the first motor; and a second flexible printed circuit connected to the coil of the second motor, in which the first flexible printed circuit and the second flexible printed circuit are separately disposed.

Appendix 8

The camera shake-correction device described in Appendix 7, in which the first flexible printed circuit is disposed while being bent at a position facing the second motor with the optical axis interposed therebetween in the plane orthogonal to the optical axis, and the second flexible printed circuit is disposed while being bent at a position facing the first motor with the optical axis interposed therebetween in the plane orthogonal to the optical axis.

Appendix 9

The camera shake-correction device described in Appendix 8, in which the first flexible printed circuit and the second flexible printed circuit are disposed while being bent in directions orthogonal to the optical axis.

Appendix 10

The camera shake-correction device described in any one of Appendixes 1 to 9, in which the base member includes a pair of first shaft support portions provided with first holes, both end portions of the first shaft is inserted into the first holes so that the first shaft is held by the first shaft support portion, the proximal end portion of the swinging member includes a second hole through which the first shaft is inserted, and and the swinging member is swingably supported by the first shaft with the first shaft inserted through the second hole.

Appendix 11

The camera shake-correction device described in any one of Appendixes 1 to 10, in which the swinging member and the restricting member are disposed at positions facing each other with the optical axis interposed therebetween in the plane orthogonal to the optical axis.

Appendix 12

The camera shake-correction device described in Appendix 1, in which at least one of the rolling bodies is disposed at a position different from positions of the other rolling bodies in a direction along the optical axis.

Appendix 13

The camera shake-correction device described in Appendix 12, further comprising:

a first position detection sensor that detects a position of the movable member with respect to the base member in the first direction; and a second position detection sensor that detects a position of the movable member with respect to the base member in the second direction, in which the rolling body disposed close to the first position detection sensor and the rolling body disposed close to the second position detection sensor are disposed at positions different from a position of the other rolling body.

Appendix 14

A camera shake-correction device including:

a movable member that holds a camera shake-correction lens or an image sensor;

a base member that supports the movable member such that the movable member is movable in a plane orthogonal to an optical axis;

a plurality of rolling bodies that are provided between the movable member and the base member;

an urging member that urges the base member toward the movable member;

a first motor that is composed of a voice coil motor including a coil, a magnet, and a yoke and that drives the movable member in a first direction in the plane orthogonal to the optical axis; and a second motor that is composed of a voice coil motor including a coil, a magnet, and a yoke and that drives the movable member in a second direction orthogonal to the first direction in the plane orthogonal to the optical axis, in which the first motor and the second motor are disposed such that axes of the coils are orthogonal to the optical axis, and portions of the yokes are disposed inside the coils.

Appendix 15

The camera shake-correction device described in Appendix 14, in which the magnet is composed of a first magnet and a second magnet of which the same poles are disposed to face each other, the yoke is composed of a first yoke, a second yoke, and a third yoke, the first magnet is disposed between the first yoke and the second yoke, the second magnet is disposed between the second yoke and the third yoke, and the second yoke is disposed inside the coil.

Appendix 16

The camera shake-correction device described in any one of Appendixes 14 to 15, in which shapes of outer peripheries of the magnet and the yoke in the plane orthogonal to the optical axis are arc shapes along a circle around the optical axis.

Appendix 17

A camera shake-correction device including:

a movable member that holds a camera shake-correction lens or an image sensor;

a base member that supports the movable member such that the movable member is movable in a plane orthogonal to an optical axis;

a plurality of rolling bodies that are provided between the movable member and the base member;

an urging member that urges the base member toward the movable member;

a first motor that is composed of a voice coil motor including a coil, a magnet, and a yoke and that drives the movable member in a first direction in the plane orthogonal to the optical axis;

a second motor that is composed of a voice coil motor including a coil, a magnet, and a yoke and that drives the movable member in a second direction orthogonal to the first direction in the plane orthogonal to the optical axis;

a first flexible printed circuit connected to the coil of the first motor; and a second flexible printed circuit connected to the coil of the second motor, in which the first flexible printed circuit and the second flexible printed circuit are separately disposed.

Appendix 18

The camera shake-correction device according to Appendix 17, in which the first flexible printed circuit is disposed while being bent at a position facing the second motor with the optical axis interposed therebetween in the plane orthogonal to the optical axis, and the second flexible printed circuit is disposed while being bent at a position facing the first motor with the optical axis interposed therebetween in the plane orthogonal to the optical axis.

Appendix 19

The camera shake-correction device according to Appendix 18, in which the first flexible printed circuit and the second flexible printed circuit are disposed while being bent in directions orthogonal to the optical axis.

Appendix 20

A camera shake-correction device including:

a movable member that holds a camera shake-correction lens or an image sensor;

a base member that supports the movable member such that the movable member is movable in a plane orthogonal to an optical axis;

a plurality of rolling bodies that are provided between the movable member and the base member;

an urging member that urges the base member toward the movable member;

a first motor that drives the movable member in a first direction in the plane orthogonal to the optical axis; and a second motor that drives the movable member in a second direction orthogonal to the first direction in the plane orthogonal to the optical axis, in which at least one of the rolling bodies is disposed at a position different from positions of the other rolling bodies in a direction along the optical axis.

Appendix 21

The camera shake-correction device according to Appendix 20, further comprising:

a first position detection sensor that detects a position of the movable member with respect to the base member in the first direction; and a second position detection sensor that detects a position of the movable member with respect to the base member in the second direction, in which the rolling body disposed close to the first position detection sensor and the rolling body disposed close to the second position detection sensor are disposed at positions different from a position of the other rolling body.

EXPLANATION OF REFERENCES

1: interchangeable lens
2: mount
3: focus ring
4: zoom ring
5: stop ring
10: lens barrel
12: first fixed cylinder
14: cam cylinder
16: moving cylinder
18: second fixed cylinder
20: mount base member
22: first lens group holding frame
24: seventh lens group holding frame
30: stop unit
100: focus unit
102: second base frame
102F: second base frame front frame
102R: second base frame rear frame
104: second movable frame
106: third lens group holding portion
108: fourth lens group holding portion
110: sixth lens group holding portion
112: main shaft
114: sub shaft
116: main sliding portion
116A: hole of main sliding portion
118: sub sliding portion
118A: groove of sub sliding portion
120: voice coil motor
122: coil of voice coil motor
124A to 124D: magnetic force applying unit of voice coil motor
124A: first magnetic force applying unit of voice coil motor
124B: second magnetic force applying unit of voice coil motor
124C: third magnetic force applying unit of voice coil motor
124D: fourth magnetic force applying unit of voice coil motor
126: magnet of voice coil motor
128: yoke of voice coil motor
128I: inner yoke portion of yoke
128Ia: surfaces facing coil at inner yoke portion
128O: outer yoke portion of yoke
130A to 130D: magnetic force applying unit holding portions
132: light screen
134: photo interrupter
136: magnetic scale
138: MR sensor
200: OIS unit
202: first movable frame

204: first base frame
206A: rigid ball
206B: rigid ball
206C: rigid ball
208A to 208C: rigid ball holding portion
208A: first rigid ball holding portion
208B: second rigid ball holding portion
208C: third rigid ball holding portion
210: spring
212: base-side spring hook portion
214: movable-side spring hook portion
216: swinging block
216A: bearing hole of swinging block
218: guide shaft
220: sliding portion of first movable frame
220A: arm portion of sliding portion
220B: guide groove portion of sliding portion
222: support shaft
224: swinging block attachment portion
224A: shaft support portion
224B: shaft mounting hole of shaft support portion
226: support shaft mounting opening portion
228: fall-off prevention pin
230: pin attachment portion
232: screw
240V: first coil attachment portion
240H: second coil attachment portion
250V: first voice coil motor
250H: second voice coil motor
252V: coil of first voice coil motor
252H: coil of second voice coil motor
254V: magnet of first voice coil motor
254V1: first magnet of first voice coil motor
254V2: second magnet of first voice coil motor
254H: magnet of second voice coil motor
254H1: first magnet of second voice coil motor
254H2: second magnet of second voice coil motor
256V: yoke of first voice coil motor
256Vc: center yoke of first voice coil motor
256Vs: side yoke of first voice coil motor
256H: yoke of second voice coil motor
256Hc: center yoke of second voice coil motor
256Hs: side yoke of second voice coil motor
258V: first unit attachment portion
258H: second unit attachment portion
260V: first position detection sensor
260H: second position detection sensor
262H, 262V: position detection magnet
262V: first position detection magnet
262H: second position detection magnet
264V: first position detection sensor attachment portion
264H: second position detection sensor attachment portion
270V: first flexible printed circuit
270Va: fixed portion of first flexible printed circuit
270Vb: first linear portion of first flexible printed circuit
270Vc: bent portion of first flexible printed circuit
270Vd: second linear portion of first flexible printed circuit
270H: second flexible printed circuit
270Ha: fixed portion of second flexible printed circuit
270Hb: first linear portion of second flexible printed circuit
270Hc: bent portion of second flexible printed circuit
270Hd: second linear portion of second flexible printed circuit
272V: first flexible printed circuit attachment portion

272H: second flexible printed circuit attachment portion
G1: first lens group
G2: second lens group
G3: third lens group
G4: fourth lens group
G5: fifth lens group
G6: sixth lens group
G7: seventh lens group
Z: optical axis
Cv: axis passing through center of inner periphery of coil of first voice coil motor
Ch: axis passing through center of inner periphery of coil of second voice coil motor
L1: first straight line (straight line passing through magnetic scale and optical axis Z)
L2: second straight line (straight line orthogonal to surfaces of inner yoke portion and outer yoke portion that face each other)
L3: third straight line (straight line passing through main shaft and optical axis Z)
ZM: disposition range of magnet of voice coil motor
α1: disposition angle (angle formed between straight line S1 and first straight line L1)
α2: disposition angle (angle formed between straight line S2 and first straight line L1)
α3: disposition angle (angle formed between straight line S3 and first straight line L1)
α4: disposition angle (angle formed between straight line S4 and first straight line L1)
β1: disposition angle (angle formed between straight line S1 and third straight line L3)
β2: disposition angle (angle formed between straight line S4 and third straight line L3)
β3: disposition angle (angle formed between straight line S2 and third straight line L3)
β4: disposition angle (angle formed between straight line S3 and third straight line L3)
θ1: installation angle (angle formed between second straight line L2 and first straight line L1)
θ2: installation angle (angle formed between second straight line L2 and first straight line L1)

What is claimed is:

1. A camera shake-correction device comprising:
a movable member that holds a camera shake-correction lens or an image sensor;
a base member that supports the movable member such that the movable member is movable in a plane orthogonal to an optical axis;
a plurality of rolling bodies that are provided between the movable member and the base member;
an urging member that urges the base member toward the movable member;
a first motor that drives the movable member in a first direction in the plane orthogonal to the optical axis;
a second motor that drives the movable member in a second direction orthogonal to the first direction in the plane orthogonal to the optical axis;
a first shaft that is provided at the movable member and that is disposed to be orthogonal to the optical axis;
a swinging member of which a proximal end portion is swingably supported by the first shaft;
a second shaft that is provided at a distal end portion of the swinging member and that is disposed to be parallel with the first shaft;
a sliding portion that is provided at the movable member and that slides along the second shaft; and a restricting member that is provided at the base member and that restricts movement of the movable member in a direction away from the base member, wherein:

the sliding portion includes a groove portion that is open in a direction in which the movable member is separated from the base member; and the second shaft is fitted to the groove portion and is slidably supported.

2. The camera shake-correction device according to claim 1, wherein:

each of the first motor and the second motor is composed of a voice coil motor including a coil, a magnet, and a yoke;

the coil is provided at the movable member; and the magnet and the yoke are provided at the base member.

3. The camera shake-correction device according to claim 2, wherein the coil is disposed such that an axis of the coil is orthogonal to the optical axis.

4. The camera shake-correction device according to claim 3, wherein a portion of the yoke is disposed inside the coil.

5. The camera shake-correction device according to claim 4, wherein:

the magnet is composed of a first magnet and a second magnet of which the same poles are disposed to face each other;

the yoke is composed of a first yoke, a second yoke, and a third yoke;

the first magnet is disposed between the first yoke and the second yoke;

the second magnet is disposed between the second yoke and the third yoke; and the second yoke is disposed inside the coil.

6. The camera shake-correction device according to claim 3, wherein shapes of outer peripheries of the magnet and the yoke in the plane orthogonal to the optical axis are arc shapes along a circle around the optical axis.

7. The camera shake-correction device according to claim 2, further comprising:

a first flexible printed circuit connected to the coil of the first motor; and a second flexible printed circuit connected to the coil of the second motor, wherein the first flexible printed circuit and the second flexible printed circuit are separately disposed.

8. The camera shake-correction device according to claim 7, wherein:

the first flexible printed circuit is disposed while being bent at a position facing the second motor with the optical axis interposed therebetween in the plane orthogonal to the optical axis; and the second flexible printed circuit is disposed while being bent at a position facing the first motor with the optical axis interposed therebetween in the plane orthogonal to the optical axis.

9. The camera shake-correction device according to claim 8, wherein the first flexible printed circuit and the second flexible printed circuit are disposed while being bent in directions orthogonal to the optical axis.

10. The camera shake-correction device according to claim 1, wherein:

the base member includes a pair of first shaft support portions provided with first holes;

both end portions of the first shaft are inserted into the first holes so that the first shaft is held by the first shaft support portion;

the proximal end portion of the swinging member includes a second hole through which the first shaft is inserted; and the swinging member is swingably supported by the first shaft with the first shaft inserted through the second hole.

11. The camera shake-correction device according to claim 1, wherein the swinging member and the restricting member are disposed at positions facing each other with the optical axis interposed therebetween in the plane orthogonal to the optical axis.

12. The camera shake-correction device according to claim 1, wherein at least one of the rolling bodies is disposed at a position different from positions of the other rolling bodies in a direction along the optical axis.

13. The camera shake-correction device according to claim 12, further comprising:

a first position detection sensor that detects a position of the movable member with respect to the base member in the first direction; and a second position detection sensor that detects a position of the movable member with respect to the base member in the second direction, wherein the rolling body disposed close to the first position detection sensor and the rolling body disposed close to the second position detection sensor are disposed at positions different from a position of the other rolling body.

* * * * *